US008016196B2

(12) United States Patent
Meier et al.

(10) Patent No.: US 8,016,196 B2
(45) Date of Patent: Sep. 13, 2011

(54) DECODER BOARD FOR AN OPTICAL READER UTILIZING A PLURALITY OF IMAGING FORMATS

(75) Inventors: Timothy P. Meier, Camillus, NY (US); Robert C. Gardiner, Fayetteville, NY (US); Jeffrey Dean Harper, Charlotte, NC (US); John Izzo, Auburn, NY (US); Thomas J. Koziol, Camillus, NY (US); Andrew Longacre, Jr., Skaneateles, NY (US); John A. Pettinelli, Jr., Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 12/754,368

(22) Filed: Apr. 5, 2010

(65) Prior Publication Data

US 2010/0187310 A1 Jul. 29, 2010

Related U.S. Application Data

(60) Continuation of application No. 11/442,666, filed on May 26, 2006, now Pat. No. 7,690,572, which is a division of application No. 10/339,439, filed on Jan. 9, 2003, now Pat. No. 7,086,596.

(51) Int. Cl.
*G06K 7/10* (2006.01)
(52) U.S. Cl. .............................. 235/462.01; 235/472.01
(58) Field of Classification Search ............ 235/462.01–462.45, 472.01, 472.02, 472.03
See application file for complete search history.

(56) References Cited

U.S. PATENT DOCUMENTS

| 4,097,847 A | 6/1978 | Forsen et al. |
| 4,538,060 A | 8/1985 | Sakai et al. |
| 4,542,528 A | 9/1985 | Sanner et al. |
| 4,721,849 A | 1/1988 | Davis et al. |
| 4,758,717 A | 7/1988 | Shepard et al. |
| 4,760,248 A | 7/1988 | Swartz et al. |
| 4,818,847 A | 4/1989 | Hara et al. |

(Continued)

FOREIGN PATENT DOCUMENTS

EP 456095 A2 11/1991

(Continued)

OTHER PUBLICATIONS

International Preliminary Examination Report for Application No. PCT/US03/17516 dated Aug. 23, 2005.

(Continued)

*Primary Examiner* — Thien M Le
(74) *Attorney, Agent, or Firm* — Hestin Rothenberg Farley & Mesiti P.C.

(57) ABSTRACT

The invention relates to a microprocessor-based decoder board for an optical reader having in one embodiment a plurality of imaging modules that provide frames of image data having a plurality of formats. In one method for operating the decoder board of the invention, and a multiple imaging module reader comprising the decoder board, a frame of image data captured by a selected imaging module is decoded. The decoder board determines the format of the frame of image data from information about which of the plurality of imaging modules provided the frame of image data or from information about the frame of image data, activates as necessary a command to prepare the decoder board to decode the frame of image data according to the format provided by the imaging module, and performs the decoding.

10 Claims, 26 Drawing Sheets

US 8,016,196 B2

Page 2

U.S. PATENT DOCUMENTS

| | | |
|---|---|---|
| 4,825,058 A | 4/1989 | Poland |
| 4,841,132 A | 6/1989 | Kajitani et al. |
| 4,877,949 A | 10/1989 | Danielson et al. |
| 4,930,848 A | 6/1990 | Knowles |
| 4,945,216 A | 7/1990 | Tanabe et al. |
| 4,964,167 A | 10/1990 | Kunizawa et al. |
| 4,983,818 A | 1/1991 | Knowles |
| 5,019,699 A | 5/1991 | Koenck |
| 5,099,110 A | 3/1992 | Shepard et al. |
| 5,168,149 A | 12/1992 | Dvorkis et al. |
| 5,216,233 A | 6/1993 | Main et al. |
| 5,223,701 A | 6/1993 | Batterman et al. |
| 5,235,167 A | 8/1993 | Dvorkis et al. |
| 5,272,323 A | 12/1993 | Martino |
| 5,280,165 A | 1/1994 | Dvorkis et al. |
| 5,304,787 A | 4/1994 | Wang |
| 5,311,001 A | 5/1994 | Joseph et al. |
| 5,313,053 A | 5/1994 | Koenck et al. |
| 5,317,136 A | 5/1994 | Hasegawa et al. |
| 5,331,176 A | 7/1994 | Sant'Anselmo et al. |
| 5,354,977 A * | 10/1994 | Roustaei ............... 235/462.11 |
| 5,367,151 A | 11/1994 | Dvorkis et al. |
| 5,373,148 A | 12/1994 | Dvorkis et al. |
| 5,378,883 A | 1/1995 | Batterman et al. |
| 5,404,002 A | 4/1995 | Tang |
| 5,408,081 A | 4/1995 | Barkan |
| 5,410,141 A | 4/1995 | Koenck et al. |
| 5,412,198 A | 5/1995 | Dvorkis |
| 5,418,357 A | 5/1995 | Inoue et al. |
| 5,420,411 A | 5/1995 | Salatto, Jr. et al. |
| 5,478,997 A | 12/1995 | Bridgelall et al. |
| 5,479,000 A | 12/1995 | Dvorkis et al. |
| 5,486,944 A | 1/1996 | Bard et al. |
| 5,504,316 A | 4/1996 | Bridgelall et al. |
| 5,504,367 A | 4/1996 | Arackellian et al. |
| 5,543,610 A | 8/1996 | Bard et al. |
| 5,552,592 A | 9/1996 | Dvorkis et al. |
| 5,557,095 A | 9/1996 | Clark et al. |
| 5,561,283 A | 10/1996 | Dvorkis et al. |
| 5,576,529 A | 11/1996 | Koenck et al. |
| 5,579,487 A | 11/1996 | Meyerson et al. |
| 5,581,067 A | 12/1996 | Grosfeld et al. |
| 5,581,070 A | 12/1996 | Dvorkis et al. |
| 5,585,616 A | 12/1996 | Roxby et al. |
| 5,589,679 A | 12/1996 | Dvorkis et al. |
| 5,591,955 A | 1/1997 | Laser |
| 5,598,007 A | 1/1997 | Bunce et al. |
| 5,600,119 A | 2/1997 | Dvorkis et al. |
| 5,621,371 A | 4/1997 | Dvorkis et al. |
| 5,637,856 A | 6/1997 | Bridgelall et al. |
| 5,648,650 A | 7/1997 | Sugifune et al. |
| 5,682,029 A | 10/1997 | Dvorkis et al. |
| 5,691,528 A | 11/1997 | Wyatt et al. |
| 5,693,929 A | 12/1997 | Dvorkis et al. |
| 5,696,607 A | 12/1997 | Yamana et al. |
| 5,698,835 A | 12/1997 | Dvorkis et al. |
| 5,703,349 A | 12/1997 | Meyerson et al. |
| 5,705,799 A | 1/1998 | Li |
| 5,714,746 A | 2/1998 | Dvorkis et al. |
| 5,717,195 A | 2/1998 | Feng et al. |
| 5,717,221 A | 2/1998 | Li et al. |
| 5,736,726 A | 4/1998 | VanHorn et al. |
| 5,739,518 A | 4/1998 | Wang |
| 5,750,975 A | 5/1998 | Myerson et al. |
| 5,756,981 A * | 5/1998 | Roustaei et al. ......... 235/462.42 |
| 5,763,863 A | 6/1998 | Grosfeld et al. |
| 5,763,864 A | 6/1998 | O'Hagan et al. |
| 5,767,500 A | 6/1998 | Cordes et al. |
| 5,773,810 A | 6/1998 | Hussey et al. |
| 5,780,831 A | 7/1998 | Seo et al. |
| 5,784,102 A | 7/1998 | Hussey et al. |
| 5,786,582 A | 7/1998 | Roustaei et al. |
| 5,801,371 A | 9/1998 | Kahn et al. |
| 5,802,179 A | 9/1998 | Yamamoto et al. |
| 5,814,827 A | 9/1998 | Katz |
| 5,818,528 A | 10/1998 | Roth et al. |
| 5,821,518 A | 10/1998 | Sussmeier et al. |
| 5,821,521 A | 10/1998 | Bridgelall et al. |
| 5,825,006 A | 10/1998 | Longacre, Jr. et al. |
| 5,825,013 A | 10/1998 | Dvorkis et al. |
| 5,825,617 A | 10/1998 | Kochis et al. |
| 5,837,986 A | 11/1998 | Barile et al. |
| 5,848,064 A | 12/1998 | Cowan |
| 5,850,078 A | 12/1998 | Giordano et al. |
| 5,859,417 A | 1/1999 | Dvorkis et al. |
| 5,859,970 A | 1/1999 | Pleso |
| 5,861,615 A | 1/1999 | Bridgelall et al. |
| 5,872,354 A | 2/1999 | Hanson |
| 5,874,720 A | 2/1999 | Dvorkis et al. |
| 5,877,487 A | 3/1999 | Tani et al. |
| 5,880,542 A | 3/1999 | Leary et al. |
| 5,886,338 A | 3/1999 | Arackellian et al. |
| 5,894,348 A | 4/1999 | Bacchi et al. |
| 5,900,613 A | 5/1999 | Koziol et al. |
| 5,900,617 A | 5/1999 | Dvorkis et al. |
| 5,905,251 A | 5/1999 | Knowles |
| 5,917,173 A | 6/1999 | Dvorkis et al. |
| 5,918,194 A | 6/1999 | Banaska et al. |
| 5,920,061 A | 7/1999 | Feng |
| 5,923,025 A | 7/1999 | Dvorkis et al. |
| 5,925,872 A | 7/1999 | Wyatt et al. |
| 5,929,418 A | 7/1999 | Ehrhart et al. |
| 5,942,741 A | 8/1999 | Longacre, Jr. et al. |
| 5,945,659 A | 8/1999 | Dvorkis et al. |
| 5,949,056 A | 9/1999 | White |
| 5,984,188 A | 11/1999 | Dvorkis et al. |
| 5,988,506 A | 11/1999 | Schaham et al. |
| 5,988,508 A | 11/1999 | Bridgelall et al. |
| 5,992,744 A | 11/1999 | Smith et al. |
| 6,000,619 A | 12/1999 | Reddersen et al. |
| 6,015,088 A | 1/2000 | Parker et al. |
| 6,053,408 A | 4/2000 | Stoner |
| 6,056,200 A | 5/2000 | Dvorkis et al. |
| 6,115,678 A | 9/2000 | Lieb et al. |
| 6,123,261 A | 9/2000 | Roustaei |
| 6,123,263 A | 9/2000 | Feng |
| 6,155,490 A | 12/2000 | Ackley |
| 6,155,491 A | 12/2000 | Dueker et al. |
| 6,164,546 A | 12/2000 | Kumagai et al. |
| 6,179,208 B1 | 1/2001 | Feng |
| 6,189,788 B1 | 2/2001 | Sherman et al. |
| 6,199,044 B1 | 3/2001 | Ackley et al. |
| 6,213,397 B1 | 4/2001 | Rando |
| 6,223,988 B1 | 5/2001 | Batterman et al. |
| 6,227,450 B1 | 5/2001 | Blake et al. |
| 6,283,372 B1 | 9/2001 | Li |
| 6,330,973 B1 | 12/2001 | Bridgelall et al. |
| 6,347,163 B2 | 2/2002 | Roustaei |
| 6,348,773 B1 | 2/2002 | Dvorkis et al. |
| 6,389,182 B1 | 5/2002 | Ihara et al. |
| 6,412,697 B1 | 7/2002 | Bridgelall et al. |
| 6,419,633 B1 * | 7/2002 | Robinson et al. ............. 600/443 |
| 6,439,461 B2 | 8/2002 | Dvorkis et al. |
| 6,488,209 B1 | 12/2002 | Hunt et al. |
| 6,491,223 B1 | 12/2002 | Longacre, Jr. et al. |
| 6,491,225 B1 | 12/2002 | Dvorkis et al. |
| 6,497,368 B1 | 12/2002 | Friend et al. |
| 6,505,778 B1 | 1/2003 | Reddersen et al. |
| 6,507,864 B1 | 1/2003 | Klein et al. |
| 6,527,180 B1 | 3/2003 | Dvorkis et al. |
| 6,539,422 B1 | 3/2003 | Hunt et al. |
| 6,575,370 B1 | 6/2003 | Dvorkis et al. |
| 6,578,766 B1 | 6/2003 | Parker et al. |
| 6,585,160 B2 | 7/2003 | Dvorkis et al. |
| 6,602,194 B2 * | 8/2003 | Roundhill et al. ............. 600/443 |
| 6,616,042 B1 | 9/2003 | Gofman et al. |
| 6,637,658 B2 * | 10/2003 | Gardiner et al. ......... 235/462.45 |
| 6,708,866 B2 | 3/2004 | Holman et al. |
| 6,714,983 B1 | 3/2004 | Koenck et al. |
| 6,715,685 B2 | 4/2004 | Dvorkis |
| 6,732,915 B1 | 5/2004 | Nelson et al. |
| 6,732,933 B2 | 5/2004 | Waxelbaum |
| 6,869,016 B2 | 3/2005 | Waxelbaum |
| 6,874,689 B2 | 4/2005 | Blake et al. |
| 7,055,747 B2 | 6/2006 | Havens et al. |
| 7,086,596 B2 | 8/2006 | Meier et al. |
| 7,090,132 B2 | 8/2006 | Havens et al. |

| | | |
|---|---|---|
| 7,195,164 B2 | 3/2007 | Patel |
| 7,296,751 B2 * | 11/2007 | Barber et al. ............ 235/462.43 |
| 7,389,929 B2 | 6/2008 | Havens et al. |
| 7,500,614 B2 * | 3/2009 | Barber et al. ............ 235/462.43 |
| 7,690,572 B2 | 4/2010 | Meier et al. |
| 2003/0222147 A1 | 12/2003 | Havens et al. |
| 2004/0020990 A1 * | 2/2004 | Havens et al. ............ 235/472.01 |
| 2004/0164165 A1 * | 8/2004 | Havens et al. ............ 235/462.43 |

FOREIGN PATENT DOCUMENTS

| | | |
|---|---|---|
| EP | 517957 A2 | 12/1992 |
| EP | 540781 A2 | 5/1993 |
| EP | 590537 A2 | 4/1994 |
| EP | 653723 A2 | 5/1995 |
| EP | 690404 A2 | 1/1996 |
| EP | 730241 A2 | 9/1996 |
| EP | 818750 A2 | 1/1998 |
| EP | 910032 A2 | 4/1999 |
| EP | 974924 A2 | 1/2000 |
| EP | 999514 A1 | 5/2000 |
| EP | 1079466 A2 | 2/2001 |
| EP | 1128315 A1 | 8/2001 |
| EP | 1310903 A1 | 5/2003 |
| GB | 2128549 A | 5/1984 |
| JP | 2002150215 A | 5/2002 |
| JP | 04330583 B2 | 9/2009 |
| WO | WO-9708647 | 3/1997 |
| WO | WO-9728512 A1 | 8/1997 |
| WO | WO-01/26036 A2 * | 4/2001 |
| WO | WO-02073953 A2 | 9/2002 |
| WO | WO-03102858 A1 | 12/2003 |

OTHER PUBLICATIONS

International Search Report for Application No. PCT/US03/17516 dated Sep. 23, 2003.

International Search Report for Application No. PCT/US03/17516 dated Sep. 30, 2003.

U.S. Appl. No. 60/437,959, filed Jan. 3, 2003, priority of which is claimed in U.S. Appl. No. 10/425,694, filed Apr. 29, 2003, 25 pages.

U.S. Appl. No. 5,637,857, Jun. 1997, Dvorkis et al. (withdrawn).

Written Opinion for Application No. PCT/US03/17516 dated Apr. 1, 2005.

* cited by examiner

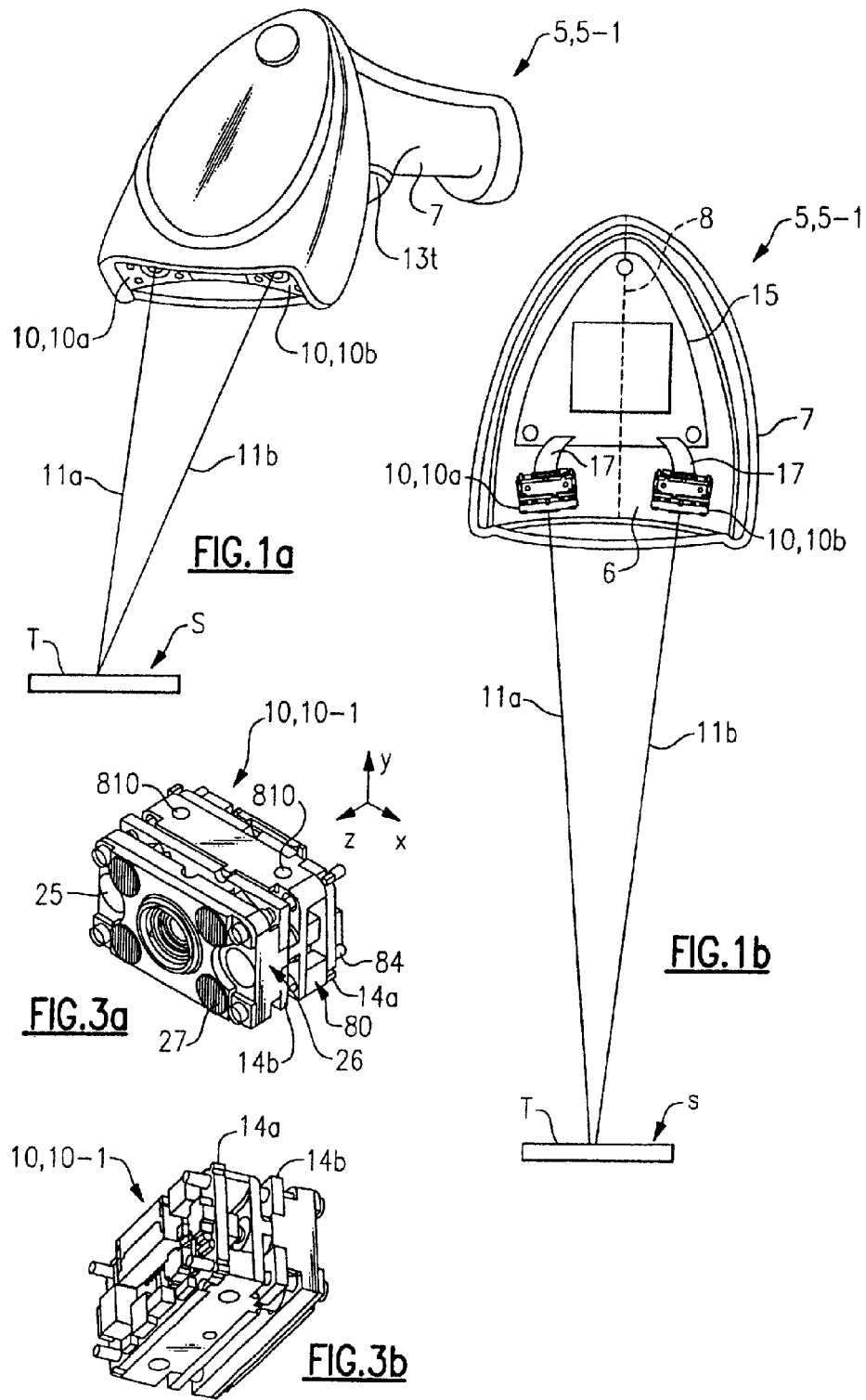

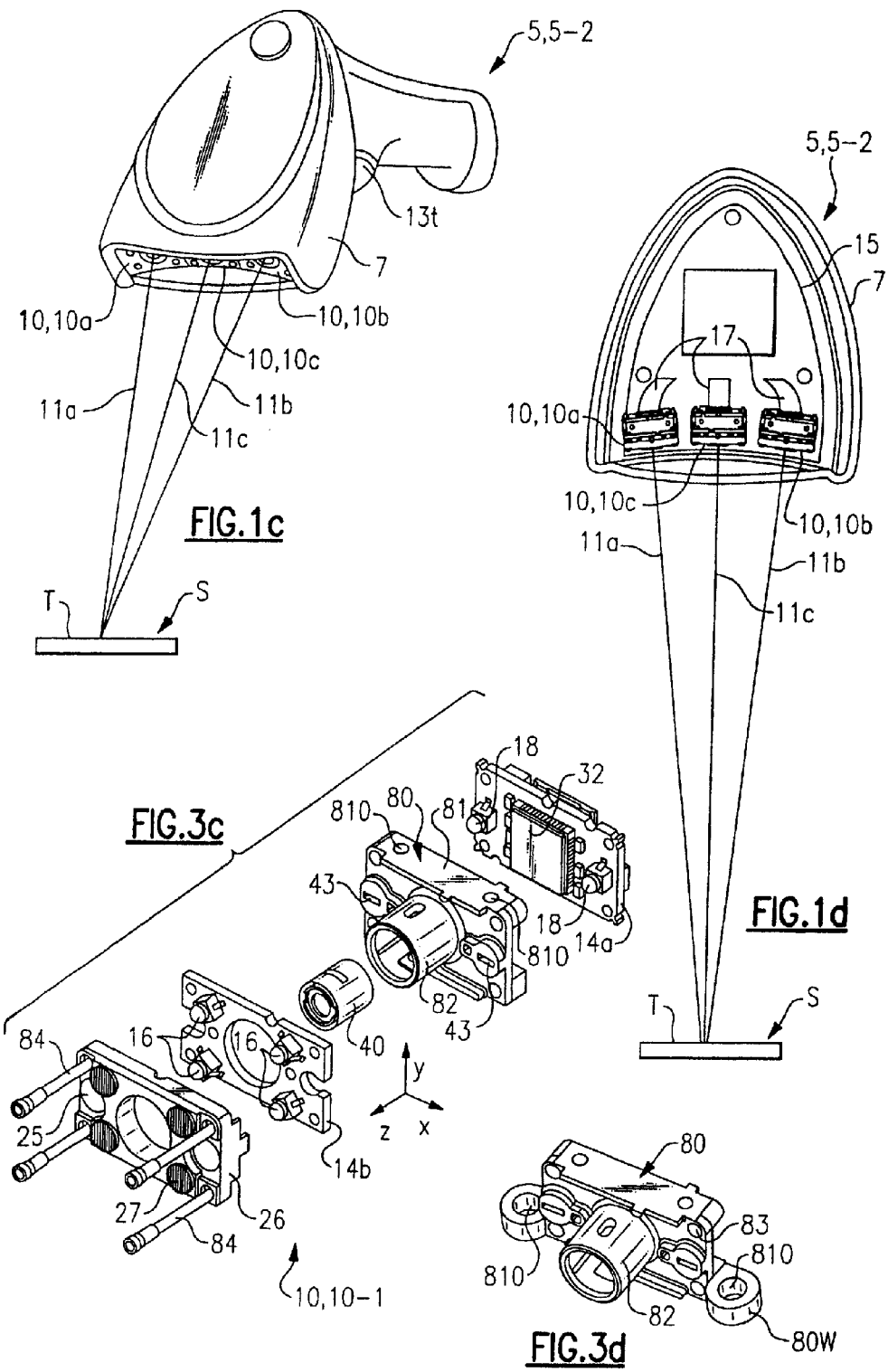

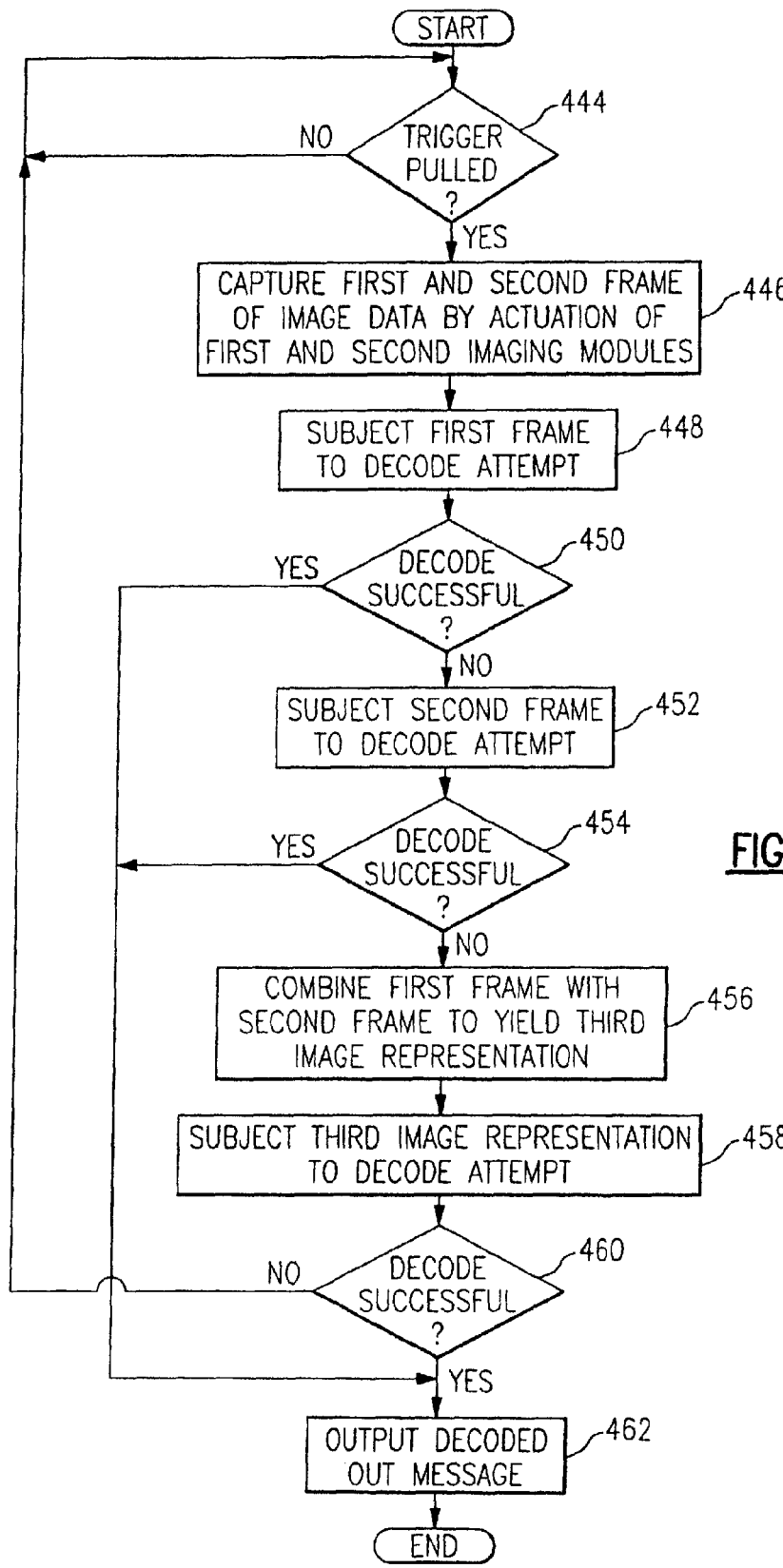

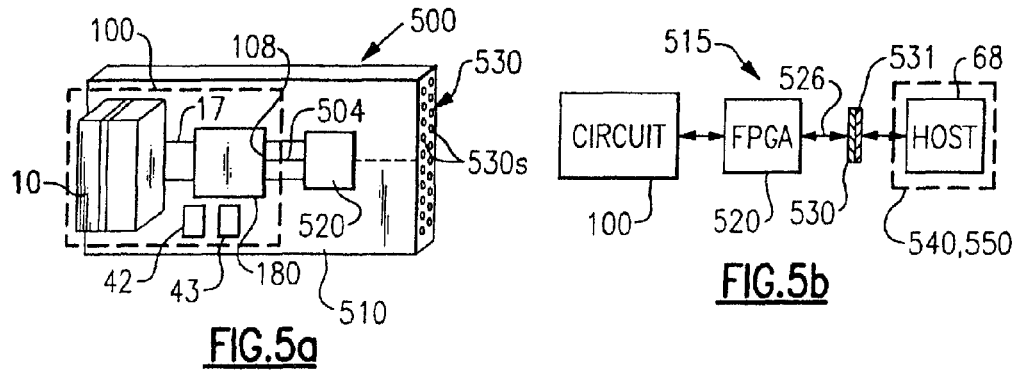
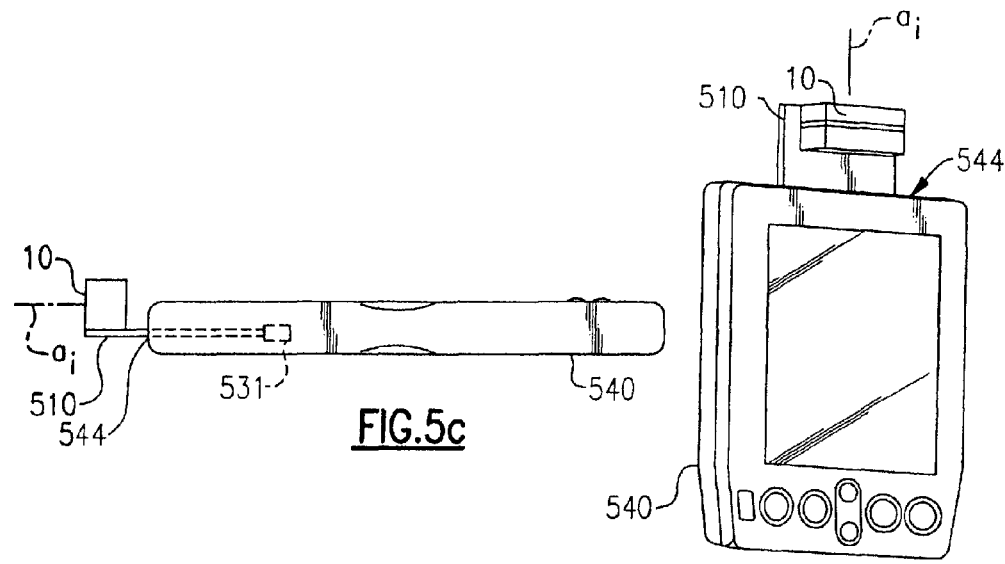
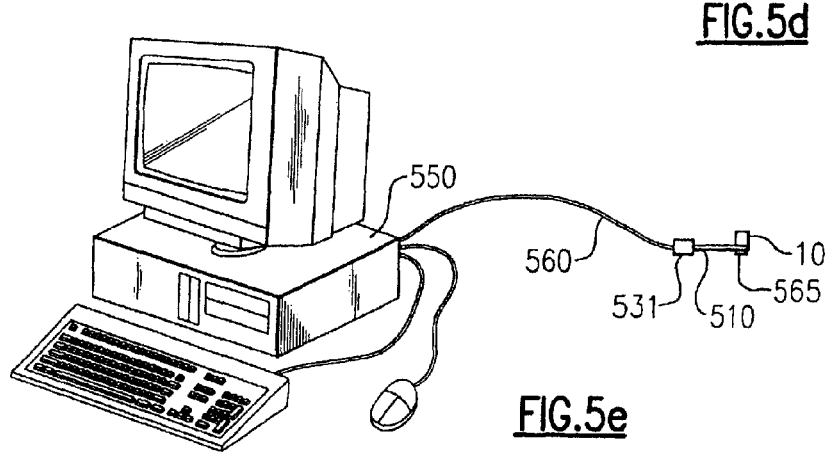

DECODER BOARD FOR AN OPTICAL READER UTILIZING A PLURALITY OF IMAGING FORMATS

CROSS REFERENCE TO RELATED APPLICATIONS

This application is a continuation of U.S. patent application Ser. No. 11/442,666, filed May 26, 2006 entitled "Decoder Board For An Optical Reader Utilizing A Plurality Of Imaging Formats" which is a divisional of U.S. patent application Ser. No. 10/339,439 filed Jan. 9, 2003, entitled "Decoder Board For An Optical Reader Utilizing A Plurality Of Imaging Formats" (now U.S. Pat. No. 7,086,596), which is incorporated herein by reference. This application is related to the applications enumerated below, all of which are being filed with the United States Patent and Trademark Office on Jan. 9, 2003, and all of which are subject to assignment to the same assignee of this application, the disclosure of each of which is incorporated herein by reference in its entirety: U.S. patent application Ser. No. 10/339,275, entitled "Housing for an Optical Reader" (now U.S. Pat. No. 7,147,162); U.S. patent application Ser. No. 10/339,424 (now abandoned), entitled "Optical Reader System Comprising Digital Conversion" (U.S. Patent Publication No. 2004/0004128); U.S. patent application Ser. No. 10/339,004 (now abandoned), entitled "Analog-to-Digital Converter with Automatic Range and Sensitivity Adjustment" (U.S. Patent Publication No. 2004/0134988); U.S. patent application Ser. No. 10/339,061 (now abandoned), entitled "Manufacturing Methods for a Decoder Board for an Optical Reader Utilizing a Plurality of Imaging Formats" (U.S. Patent Publication No. 2003/0222144); and U.S. patent application Ser. No. 10/339,281 (now abandoned), entitled "Optical Reader Having Position Responsive Decode Launch Circuit" (U.S. Patent Publication No. 2003/0168512).

FIELD OF THE INVENTION

The invention relates to optical readers in general and particularly to a decoder board for an optical reader that employs one of a plurality of image sensor devices that provide a plurality of data formats.

BACKGROUND OF THE INVENTION

Decodable indicia such as bar codes and OCR decodable characters are finding increased use in an ever expanding variety of applications. For example, bar codes are being applied to paper substrate surfaces, plastic bags, glass, and directly on finished articles. Decodable indicia that can be applied deliberately to objects include a variety of formats, comprising geometrical features (e.g., one-dimensional (1D) symbols, two-dimensional (2D) symbols), and features of tonality and/or color (e.g., symbols comprising gray scales and symbols comprising colors). Decodable indicia can also occur naturally, for example in the form of biometric indicia such as fingerprints, retinal patterns, facial features and the like. Some of these natural indicia may also be applied, deliberately or inadvertently, to other surfaces, for example as fingerprints.

Often, different types of decodable indicia require imaging modules that provide different data formats. The term "imaging module" is intended in one embodiment to describe the image sensor device itself. The sensor when disposed within a housing, and including, as required, imaging optics, lenses, filters and the like, and electronic circuitry used to operate the image sensor device or used in conjunction with the image sensor device, is referred to as an optical reader. Historically, one type of decoder module has been used with imaging modules providing data having a first format (for example, 1D data), and another type of decoder module has been used with imaging modules providing data having a second format (for example, 2D data). In general, the computational power required to decode more densely encoded decodable indicia causes decoder modules suitable for such decoding to be relatively expensive as compared to decoder modules with only sufficient computational power to decode less complex decodable indicia. This relationship is generally referred to as a "price-performance trade-off."

A number of problems in imaging different decodable indicia arise because of the circumstances of use of the decodable indicia. For example, where decodable symbols or characters have been applied to particularly reflective "shiny" surfaces (such as glass, plastic, or metallic surfaces), "specular reflection" decode failures have been observed. "Specular reflection" occurs where a light ray incident on a highly reflective (mirror) surface is reflected at an angle substantially equal to an angle of incidence measured with respect to a direction that is substantially normal to the surface. In optical readers, light sources are positioned to emit light along a path closely adjacent a centrally located imaging axis. An optical reader light is directed at a reflective target and, therefore, the illumination light tends to be reflected secularly in the direction of the reader's photodetector elements. Specular reflection can result in the captured image data failing to exhibit adequate contrast between dark and light markings of a decodable indicia. With the increased miniaturization of optical readers, light sources for illuminating a target are being positioned in closer proximity with a photodetector element of the reader, thereby rendering the modem reader more susceptible to specular reflection read failures.

The proliferation of the use of decodable markings has brought to light additional problems with presently available optical readers. It has become more common to encode more information into single decodable indicia, e.g. with use of "high density" bar codes, to affix more than one decodable indicia in need of decoding, possibly having different formats, onto an article or package, and to make bar codes wider so that they can encode more information. "High density" bar codes are best decoded with the use of a high resolution optical reader which is configured to have a short "best focus" position. Extra wide bar codes and scenes having more than one bar code are best decoded with use of readers having a longer best focus position. Commercially available optical readers cannot easily read high density extra wide decodable symbols or multiple symbols from a scene which are encoded in high density.

There is a need for an optical reader which can decode a variety of different formats of image data, so as render it impervious to decode failures resulting from specular reflection, and which is adapted to read large or multiple high density decodable symbols, possibly having a plurality of formats, formed on a target.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIGS. 1a-1i illustrate exemplary embodiments of optical readers comprising a microprocessor-based decoder module according to the invention;

FIGS. 4a-4c are flow diagrams depicting exemplary methods of practicing the invention;

FIGS. 5a-5e illustrate exemplary optical readers that embody features of the invention;

DETAILED DESCRIPTION OF THE INVENTION

Figure 1E:
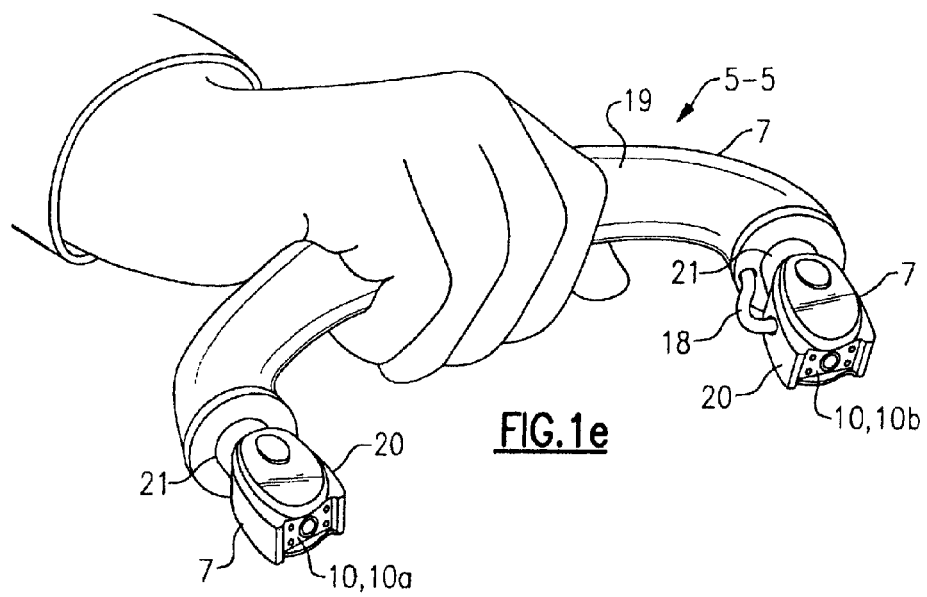

In one aspect, the invention relates to a circuit component for an optical reader. The optical reader utilizes a selected one of a one-dimensional (1D) imaging module and a two-dimensional (2D) imaging module. The circuit component comprises a microprocessor-based decoder module that, when operative, decodes a frame of image data provided by a selected one of the one-dimensional (1D) imaging module and the two-dimensional (2D) imaging module. The decoding is responsive to information selected from one of information relating to the selected imaging module and information relating to the frame of image data.

In one embodiment, the information relating to the selected imaging module comprises at least one of a bus address of the module, an ID code of the module, a model identifier of the module, and an electrical characteristic of the module. The microprocessor-based decoder module, when operative, determines which of the 1D imaging module and the 2D imaging module provides a particular frame of image data. Alternatively, the microprocessor-based decoder module, when operative, decodes the frame of image data according to the determination of which imaging module provided the frame. The information relating to the frame of image data comprises information representing a frame size, information identifying a frame format, information identifying a word size, and information identifying a source of the frame.

In one embodiment, the microprocessor-based decoder module decodes the frame of image data in a time period less than or equal one second. In a more preferred embodiment, the time period is less than or equal to $\frac{1}{30}$th of a second. In a still more preferred embodiment, the time period is less than or equal to $\frac{1}{270}$th of a second.

In one embodiment, the microprocessor-based decoder module comprises a microprocessor, a random access memory (RAM), and a read only memory (ROM). In one embodiment, the microprocessor-based decoder module comprises at least one of a field programmable gate array (FPGA), a programmable logic device (PLD), a complex programmable logic device (CPLD), and an application-specific integrated circuit (ASIC). In one embodiment, the microprocessor-based decoder module comprises an integrated circuit device having integrated therein a microprocessor, an analog-to-digital converter, a digital-to-analog converter, a direct memory access (DMA) channel, a bi-directional communication line for communication with an imaging module, and a channel for data receipt from an imaging module. In one embodiment, the integrated circuit device comprises a selected one of a semiconductor, an optical material, and a photonic bandgap material.

In one embodiment, the invention includes an optical reader comprising the circuit component.

In another aspect, the invention features, a method of decoding a frame of image data. The frame of image data has one of a 1D format and a 2D format. The method comprises the steps of providing at least one imaging module selected from a one-dimensional (1D) imaging module and a two-dimensional (2D) imaging module; acquiring a frame of image data in the selected imaging module; communicating the frame of image data to a microprocessor-based decoder module; determining the format of the frame of image data; as necessary, activating at least one command to prepare the microprocessor-based decoder module to decode the communicated frame of image data; and decoding the communicated frame of imaging data accordingly.

In one embodiment, the format of the frame of image data is determined in response to one of information about the selected imaging module that acquired the communicated frame of imaging data, and information about the frame of image data.

In one embodiment, the decoding step comprises converting 2D image data to at least one 1D representation of image data.

In one embodiment, the decoding step further comprises converting the at least one 1D representation of image data to transition location information. In one embodiment, the steps of converting 2D image data to at least one 1D representation of image data, and converting the at least one 1D representation of image data to transition location information are performed iteratively.

In one embodiment, the step of determining which of the 1D and the 2D imaging modules acquired the communicated frame further comprises evaluating a parameter characteristic of one of the 1D and the 2D imaging modules. In one embodiment, the decoding step further comprises executing a selected one of at least one computer instruction which when operating on a computer decodes a frame of image data acquired by the 1D imaging module and at least one computer instruction which when operating on a computer decodes a frame of image data acquired by the 2D imaging module. In one embodiment, the at least one computer instruction which when operating on a computer decodes a frame of image data acquired by the 1D imaging module comprises a plurality of computer instructions executed in sequence. In one embodiment, the at least one computer instruction which when operating on a computer decodes a frame of image data acquired by the 2D imaging module comprises a plurality of computer instructions executed in sequence.

In one embodiment, a time period of less than or equal to one second elapses in performing the steps of determining which of the selected imaging modules acquired the communicated frame of imaging data; as necessary, activating at least one command to prepare the microprocessor-based decoder module to decode the communicated frame of image data; and decoding the communicated frame of imaging data accordingly. In a preferred embodiment, the time period is less than or equal to $1/30$th of a second. In a more preferred embodiment, the time period is less than or equal to $1/270$th of a second.

In another aspect, the invention relates to a computer program, recorded on a machine-readable medium. The computer program, when operative on a programmable computer, performs the steps of receiving a frame of image data acquired by a selected one of a 1D imaging module and a two-dimensional (2D) imaging module; determining which of the selected imaging modules acquired the received frame of imaging data; and decoding the frame of imaging data accordingly.

In one embodiment, the decoding step comprises converting 2D image data to at least one 1D representation of image data. In one embodiment, the decoding step further comprises converting the at least one 1D representation of image data to transition location information. In one embodiment, the steps of converting 2D image data to at least one 1D representation of image data, and converting the at least one 1D representation of image data to transition location information are performed iteratively. In one embodiment, the invention includes an optical reader comprising the computer program.

In yet another aspect, the invention features a computer program, recorded on a machine-readable medium. The computer program comprises a module that receives a frame of image data acquired by a selected one of a 1D imaging module and a two-dimensional (2D) imaging module; a module that determines which of the selected imaging modules acquired the received frame of imaging data; and a module that decodes the frame of imaging data accordingly.

In one embodiment, the invention includes a dynamically linked library module for communicating information from the computer program to the selected imaging module. In another embodiment, the invention includes a dynamically linked library module for communicating image data from the selected imaging module to the module of the computer program that receives a frame of image data. In a further embodiment, the invention includes an optical reader comprising the computer program.

In a further aspect, the invention relates to a circuit board component for an optical reader. The optical reader utilizes at least one of a one-dimensional (1D) imaging module and a two-dimensional (2D) imaging module. The circuit board comprises a circuit board substrate having at least one plane of electrical connecting structures thereon; and an integrated circuit comprising a microprocessor-based decoder mounted on and electrically connected to the circuit board substrate to form a circuit board component, that, when operative, decodes a frame of image data provided by a selected one of the one-dimensional (1D) imaging module and the two-dimensional (2D) imaging module.

In one embodiment, the circuit board component further comprises a connector in electrical communication with the integrated circuit. The connector provides the ability to demountably electrically connect the integrated circuit and at least one of the 1D imaging module and the 2D imaging module.

In one embodiment, the circuit board component further comprises at least one of the 1D imaging module and the 2D imaging module.

In one embodiment, the invention includes an optical reader comprising the circuit board component.

In yet another aspect, the invention features an electrical component for an optical reader. The optical reader utilizes at least one of a one-dimensional (1D) imaging module and a two-dimensional (2D) imaging module. The electrical component comprises means for, when operative, decoding a frame of image data provided by a selected one of the one-dimensional (1D) imaging module and the two-dimensional (2D) imaging module.

In one embodiment, the electrical component further comprises connector means, in electrical communication with the electrical component that provides the ability to demountably electrically connect the electrical component and at least one of the 1D imaging module and the 2D imaging module.

In one embodiment, the electrical component further comprises at least one of the 1D imaging module and the 2D imaging module. In another embodiment, the invention includes an optical reader comprising the electrical component.

The foregoing and other objects, aspects, features, and advantages of the invention will become more apparent from the following description and from the claims.

Imaging modules that provide different formats of image data are useful in obtaining images of decodable indicia having different attributes, such as the geometrical, tonal, and color attributes described above. The present invention provides a microprocessor-based decoder module for decoding data in a selected format of a plurality of formats as provided by a selected one of a plurality of different types of imaging modules. In one embodiment, the microprocessor-based decoder module is useful for decoding data in a selected format of a plurality of formats as provided by a selected one of a plurality of different types of imaging modules in hand held optical readers. Other uses will be apparent to those of ordinary skill from the description of the microprocessor-based decoder module presented herein.

Exemplary embodiments of microprocessor-based decoder modules that accept and decode a frame of image data in any of a plurality of formats are described below. The image data is provided by a selected one of a plurality of sensors or imaging modules at least two of which provide a frame of image data in a format different from the format of the image data provided by the other, recognizing that only one such sensor need be available for use at any particular time. As will be apparent from the description herein, in some embodiments, a plurality of sensors can be available simultaneously, while in other embodiments, a single selected sensor is available. In either circumstance, a microprocessor-based decoder module according to the invention can determine how to decode a specific image frame that is received from an active sensor. The sensors can include, but are not limited to, 1D imaging modules, 2D imaging modules, gray scale imaging modules, color imaging modules, and biometric imaging modules. Optical readers comprising such microprocessor-based decoder modules are also described herein.

There are many benefits that flow from the use of a microprocessor-based decoder module of the kind described and claimed herein. Some of the benefits relate to improvements in business methods, including such advantages as: having fewer models of parts that need to be manufactured, inventoried, and made available for product assembly and maintenance; having fewer models of parts for which personnel need to be trained, thereby improving manufacturing efficiency, maintenance efficiency, and improved knowledge and familiarity of the personnel of the features and required practices associated with a lesser number of models of parts that are handled more frequently; and opportunities to obtain advantageous commercial terms (e.g., volume discounts, better service, and the like) as a consequence of ordering larger quantities of components or parts used in making a specific quantity of a single model of a product as compared to lesser quantities of particular components required if the total same number of units were to be produced in a plurality of discrete models each using different components or parts.

Additional business method benefits can accrue from the use of a single microprocessor-based decoder module that can be "personalized" or "reprogrammed" to accept and decode frames of image data having different formats from a plurality of different sensors. By way of example, some of the advantages that can accrue include: the ability to add additional sensor models and types as such sensors are developed, including sensors having formats that may be new and/or different from existing formats, through the ability to provide a dynamically linked library module (e.g., a .dll or .ocx module) that provides either or both of communicating information from a computer program operating on the microprocessor-based decoder module to the imaging module, and communicating image data from the imaging module to a module of the computer program operating on the microprocessor-based decoder module that receives a frame of image data; quickly and conveniently switching operation from a first sensor providing a frame of image data of a first format to a second sensor providing a frame of image data of a second format by the simple expedient of redirecting the microprocessor-based decoder module to use a different computer program and/or a different dynamically linked library module; and improved ease of testing and troubleshooting products during manufacture through the use of a test facility comprising one or more of the microprocessor-based decoder modules, that duplicates the operation of a particular microprocessor-based decoder module with any of the sensors intended for use therewith, thereby permitting the pre-assembly testing of components, and eliminating "rework" of products that are faulty.

Embodiments of optical readers having more than one imaging module are shown in FIGS. 1*a*-1*i*. In FIGS. 1*a*-1*b* a gun style optical reader 5-1 is shown including first and second imaging modules 10*a* and 10*b* incorporated in housing 7. Imaging modules 10 can be of the type shown in FIGS. 3*a*-3*d*. Imaging module 10, 10-1 as shown in FIGS. 3*a* and 3*c* includes a support assembly 80 having a containment section 81 and a retainer section 82, a first circuit board 14*a* carrying an image sensor 32, a second circuit board 14*b*, illumination LEDs 16 aiming LEDs 18, an optical plate 26 carrying aiming and illumination optics 25, 27, and support posts 84 holding the various components of the module together. In another embodiment, an imaging module can comprise as little as the image sensor 32 alone. Image sensor 32 can comprise a substantially linear array of picture elements (pixels), which can be for example a 1×N array (e.g., 1×3500), or an M×N pixel array that has an aspect ratio that is close to 1×N, for example 2×2000 (e.g., M/N=0.001), 5×2500 (e.g., M/N=0.002), or even 20×2000 (e.g., M/N=0.01). Further details of imaging module 10-1 are described in application Ser. No. 10/092,789 filed Mar. 7, 2002 entitled "Optical Reader Imaging Module," (now U.S. Patent Publication No. 2003/0029917) which is hereby incorporated herein by reference in its entirety. As indicated by FIGS. 3*a* and 3*b* imaging modules 10 can be built as a modularly installable self-contained unit. That is, module 10 can be assembled into the packaged form shown in FIGS. 3*a* and 3*b* at an assembly location prior to being installed in a cavity defined by reader housing 7.

Imaging module 10 can be screw mounted on any rigid member within housing 7 in the manner described in application Ser. No. 10/092,789 filed Mar. 7, 2002, entitled: "Optical Reader Imaging Module," (now U.S. Patent Publication No. 2003/0029917) incorporated herein by reference above. Module 10 can include screw holes 810 for facilitating mounting of module 10 on a rigid member. As indicated by support assembly 80 of FIG. 3*d*, support assembly 80 can include wings 80*w* having screw holes 810. Reader 5 can include a main circuit board 15 or "mother board" which includes control circuit circuitry as described in detail in connection with FIGS. 2*a*-2*j*. In one embodiment, as indicated by reader 5-2 of FIG. 1*d*, a plurality of imaging modules 10 can be mounted to a rigid member provided by a common main circuit board 15. Imaging modules 10 can be interfaced with mother board 15 with use flex strip connectors 17 known in the art.

Module 10*a* and module 10*b* are disposed in a common cavity 6. A wall 8 formed in housing 7 dividing cavity 6 into two spaces would not create two separate cavities since cavity 6 of reader 5-1 would still be delimited by the common outer peripheral wall of housing 7.

Incorporating more than one imaging module 10 in an optical reader housing 7 yields a number of advantages. One benefit is that the presence of a plurality of imaging modules 10 of different types permits a single optical reader to capture images from different kinds of decodable indicia.

As another example, if an attempt to decode a decodable indicia by capturing and subjecting to decoding an image captured via actuation of first module 10*a* fails, a second decoding attempt can be made by capturing and subjecting to decoding image captured via actuation of second imaging module 10*b*. Further, reader 5 can be actuated to capture and subject to decoding a frame of image data captured by actuation of an image sensor 32 of a first module 10a and illumination LEDs 16 of a second imaging module 10b. The spacing between illumination LEDs 16 of a second module 10b and an image sensor 32 of a first imaging module 10a renders the frame of image data capture by the described method substantially impervious to specular reflection image degradation.

In addition, image data of several frames captured by actuation of several different imaging modules can be combined, by one of several possible image frame combination methods, to yield a larger frame of image data. The larger image representation is yielded by combining multiple frames of image data and can be subjected to decoding, thereby facilitating decoding of larger decodable indicia or multiple decodable indicia printed over a large area of a target substrate. Specular reflection avoidance and frame image combination methods will be described in greater detail herein.

In the embodiment of FIGS. 1c and 1d, reader 5-2 comprises three imaging modules including a first imaging module 10a, second imaging module 10b and third imaging module 10c each having a respective imaging axis 11a, 11b, and 11c. Like reader 5-1 (FIGS. 1a and 1b) the imaging axes of reader 5-2 of FIGS. 1c and 1d are in converging relation. In other embodiments, the axes can be in parallel relation or in diverging relation. Configuring reader 5-2 so that modules 10 are in converging relation assures that each of a reader's imaging modules (10a, 10b, and 10c in reader 5-2) are positioned to capture images corresponding to substantially the same area of a target substrate. Accordingly, as will be explained in further detail herein readers 5-1 and 5-2 as shown in FIGS. 1a-1d are particularly well suited for reducing specular reflection misreads.

Figure 1I:
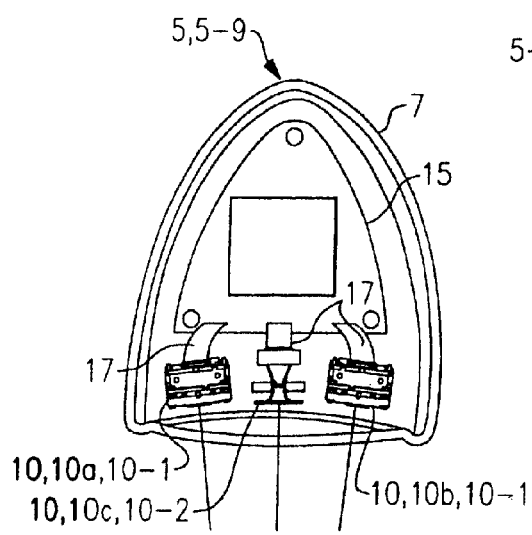
Figure 1F:
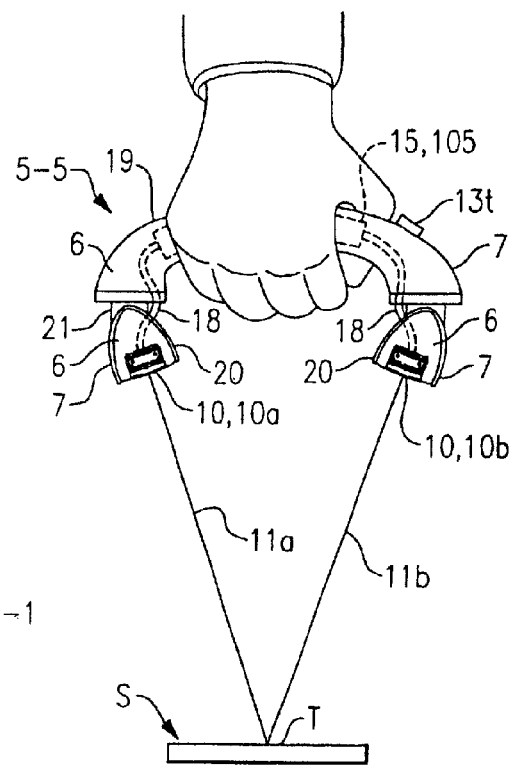

Referring now to FIGS. 1e and 1f, dumbbell style multiple imaging module optical reader 5-5 is described.

Dumbbell reader 5-5 is a reader including three housing portions 7 and each defining a cavity 6. Reader 5-5 of FIGS. 1e and 1f includes a central handle 19 which supports a pair of laterally disposed head sections 20. Handle 19 may include a thumb-actuated trigger 13t. Installed in each head section 20 is an imaging module 10 which may be of the type described in connection with FIGS. 3a-3d. Imaging module 10 of reader 5-5 as in the case of readers 5-1, 5-2, 5-3, and 5-4 may be screw mounted on any rigid member within head sections 20. Head sections 20 of housing 7 are mounted to the major body of housing 7 by ball and socket type connectors 21. Ball and socket connectors 21 may be provided, for example, by a ball and socket connector of a type available from R-A-M Mounting Systems, Inc. of Chandler Ariz. Ball and socket connectors 21 may include mechanical detent mechanisms providing feel feedback as to the position of head section 20 so that a user may click head sections 20 into one or more normally defined positions. Flexible cable 18 as shown in FIGS. 1e and 1f can be disposed to provide electrical communication between modules 10 and a main circuit board 15 within a cavity defined by a handle portion of housing 7. Main circuit board 15 of reader 5-5 may carry components of a multiple module electrical circuit, e.g. circuit 105 described with reference to FIG. 2f.

Figure 1G:
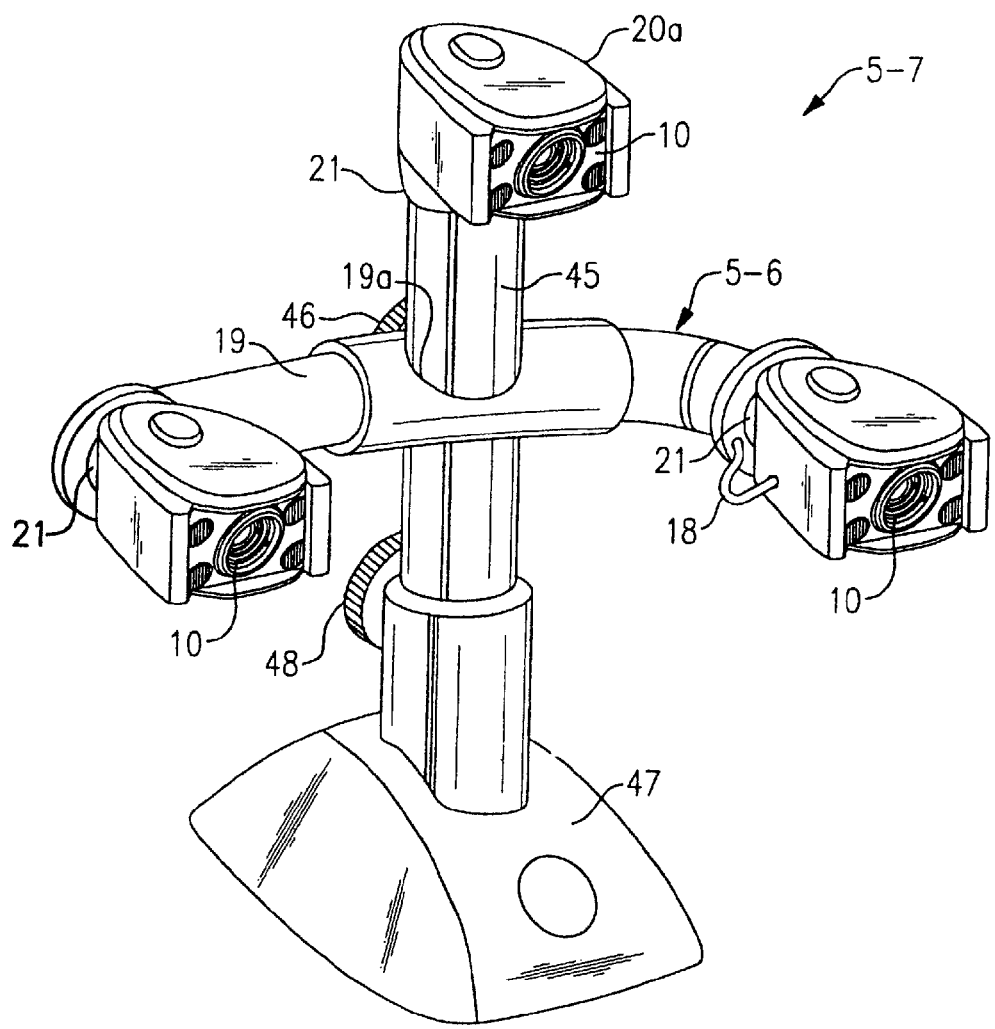
Figure 1H:
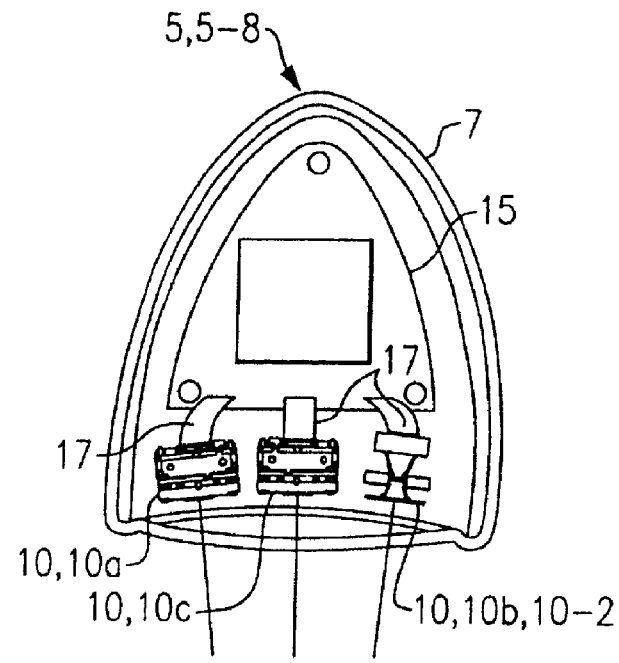

In the embodiment of FIG. 1g, handle 19 of dumbbell style reader 5-7 includes a central aperture 19a which is fittable about post 45. Handle 19 includes knob actuated bolt 46 for securing dumbbell style reader 5-6 against post 45. Post 45 in the embodiment of FIG. 1g is part of a presentation style reader 5-7 which, in addition to including detachable dumbbell style reader 5-6 further includes stand 47 including knob actuated bolt 48 for enabling a vertical position of post 45 to be adjusted, and top head section 20a disposed at a top of post 45. Head section 20a may be mounted to post 45 with use of ball and socket connector 21. Dumbbell style optical reader 5-6 may be removed from post 45 so that dumbbell style reader 5-6 can be used in a hand held mode. For realization of a hand held mode, knob actuated bolt 48 is loosened and post 45 is removed from stand 47. Knob actuated bolt 46 is then loosened and dumbbell style reader 5-6 is removed from post 45 to allow hand held use.

A dumbbell style reader e.g. 5-5 and 5-6 is particularly well suited for use in applications wherein specular reflection read failures can be expected. In the example of FIG. 1f, dumbbell style reader 5-5 is shown in a mode wherein head sections 20 are canted in a position such that imaging axes 11a and 11b of module 10a and module 10b are in converging relation and positioned so the imaging modules 10a and 10b generate image data corresponding to substantially the same scene at a target substrate, S, when reader 5-5 is at certain reader-to-target distance. If module 10a is positioned with respect to a reflective target T such that specular reflection from target T results in a decode failure, a frame of image data captured by actuation of illumination light sources 16 and an image sensor 32 of second module 10b can be subjected to a second decoding attempt. In addition, an expectedly specular reflection-free frame of image data can be captured by actuation of image sensor 32 of first imaging module 10a in combination with actuation of illumination of second imaging module 10b in place of illumination from first imaging module. The term "target" herein refers to subject matter (e.g. decodable indicia) presently in a field or view of at least one module of reader 5. The term "target substrate" refers to a member (e.g. a piece of paper, an equipment part) bearing subject matter to which reader may be directed.

Figure 3E:
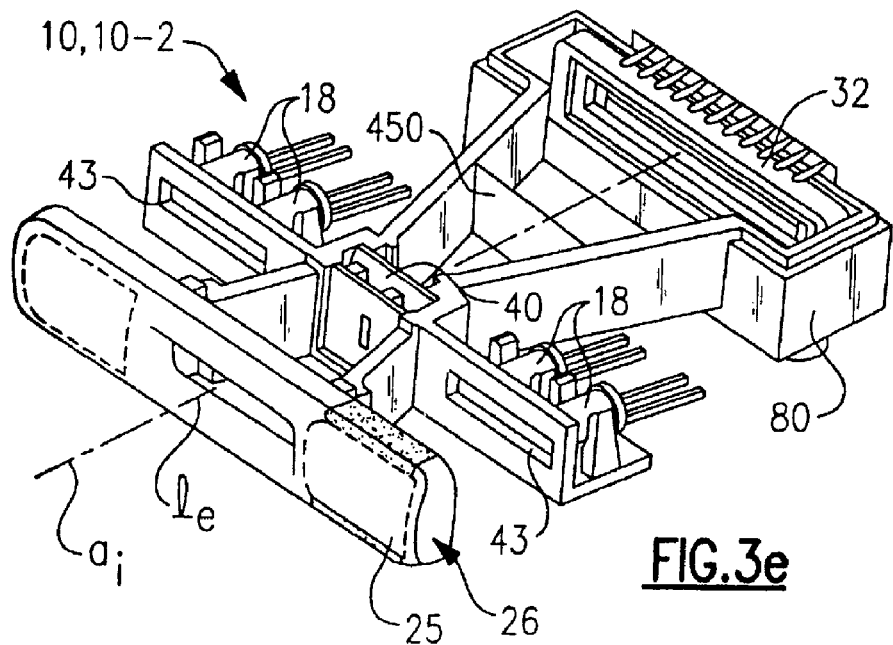
FIGS. 3a-3d are drawings that illustrate the features of imaging modules that are useful for practicing the invention.

The multiple imaging module optical readers as shown in FIGS. 1a-1c include 2D imaging modules, which may be for example Model IT 4200, Model IT 4250, or Model IT 4000 imaging modules of the type available from Hand Held Products, Inc. of Skaneateles Falls, N.Y. It will be understood that a 1D imaging module having a 1D image sensor can replace a 2D imaging module of any of the readers shown. An example of a 1D imaging module which can be incorporated in any one of readers 5-1, 5-2, 5-3, 5-4, 5-5, 5-6, and 5-7 is shown in FIG. 3e. Imaging module 10-2 includes a 1D image sensor 32, a support assembly or frame 80, imaging optics 40, illumination light sources 18, and illumination optics including lens 25 carried by plate 26 and aiming apertures 43. Further details of an exemplary 1D imaging module are described in U.S. Pat. No. 6,119,939, entitled "Optical Assembly For Bar Code Scanner," which is hereby incorporated herein by reference in its entirety. In an image sensor array based 1D imaging module e.g. module 10-2 illumination and aiming light sources are normally provided by the same light sources which project a single illumination pattern which also serves as an aiming pattern. However, a 1D imaging module can also include light sources which project different illumination and aiming patterns. An imaging module of the invention can also comprise a laser diode based 1D imaging engine including a single photodetector, a laser diode and means for sweeping the laser beam projected by the laser diode across a target area. It will be understood that other sensors or imaging modules (not shown), for example gray scale imaging modules, color imaging modules, and biometric imaging modules known in the imaging arts can be substituted for one or both of a 1D imaging module and a 2D imaging module, or provided in addition to one or both of a 1D imaging module and a 2D imaging module, as will be described below in greater detail.

Reader 5-9 of FIG. 1i is an exemplary illustration of an optical reader having a plurality of imaging modules, one of which provides a frame of image data that has a format different from the format of a frame of image data provided by another imaging module. In the embodiment shown in FIG. 1i, center module 10c of reader 5-9 is a 1D imaging module while laterally disposed modules 10a and 10b are 2D modules. Configuring reader 5-9 so that reader 5-9 includes a center 1D imaging module 10c, 10-2 and laterally disposed 2D imaging modules 10-1 provides certain advantages, as recited above. Reader 5-9 can provide frames of image data having two different formats captured from decodable indicia of different types. Reader 5-9 can be programmed in accordance with a decode operation control program wherein a reader (1) first captures and subjects to decoding an image captured via actuation of first imaging module 10c, and if the decoding attempt fails, (2) automatically captures and subjects to decoding a second image captured via actuation of an image sensor and illumination of one of laterally disposed 2D modules 10a and 10b. In an alternative embodiment, any of 1D module 10c, 2D module 10a, and 2D module 10b can be selected and activated as the module of choice to provide a frame of image data.

One-dimensional bar code symbols are more common than 2D bar code symbols. Further, 1D bar code symbols are generally decoded more quickly and more accurately by capturing and processing 1D slice image data captured via actuation of a 1D image sensor than capturing and processing 2D image data captured via actuation of a 2D image sensor. Still further, an imaging axis 11c of center imaging module 10c disposed in a gun-style housing 7 can more readily be aligned with an indicia of a target, T, than lateral imaging modules 10a and 10b. Accordingly, it can be seen that reader 5-9 programmed in accordance with the above-described decode program is a reader which is both mechanically configured and programmed for optimization of the decoding of 1D symbols, while still having the capacity to decode matrix 2D symbols where matrix 2D symbols are present within a target, T.

In other embodiments, the decodable indicia may have attributes of geometry (e.g., one or two dimensional decodable indicia such as barcodes, two-dimensional codes, alphanumeric symbols, and the like), attributes of tone, such as black-and-white (two tone, or 1-bit tonality), or gray scale (e.g., from three to as many as $2^N$ tones, where the exponent N is an integer greater than 1, or N-bit tonality), attributes of color (e.g., having a an optical appearance characterized as being within a narrow spectral region of the electromagnetic spectrum, such as red, green, or blue, or combinations thereof). In still other embodiments, the decodable indicia can have attributes relating to biometric features, such as fingerprints, retinal patterns, facial features, and the like.

Figure 2A:
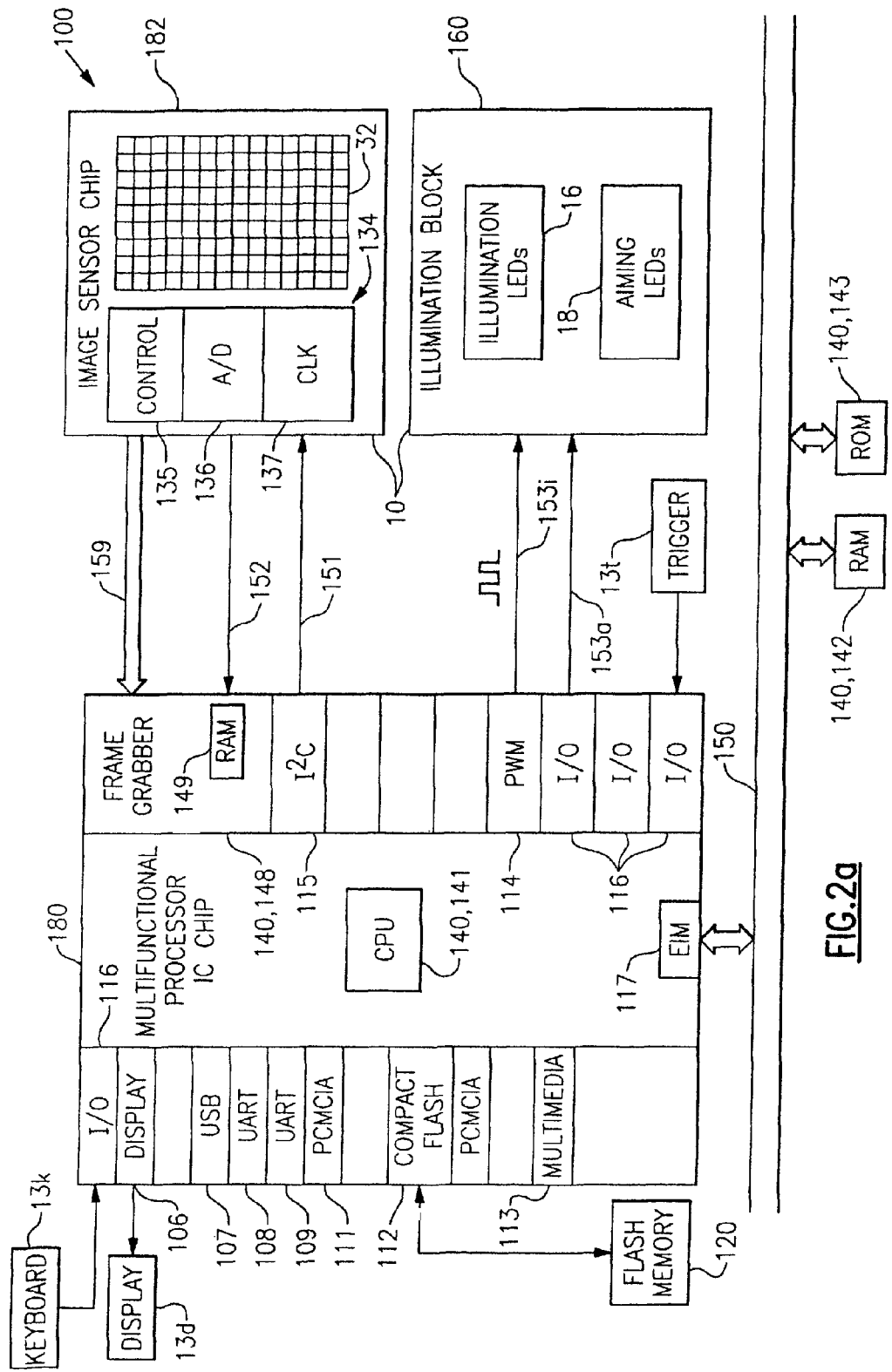
FIGS. 2a-2f illustrate exemplary embodiments of microprocessor-based decoder modules according to the invention.
Figure 2B:
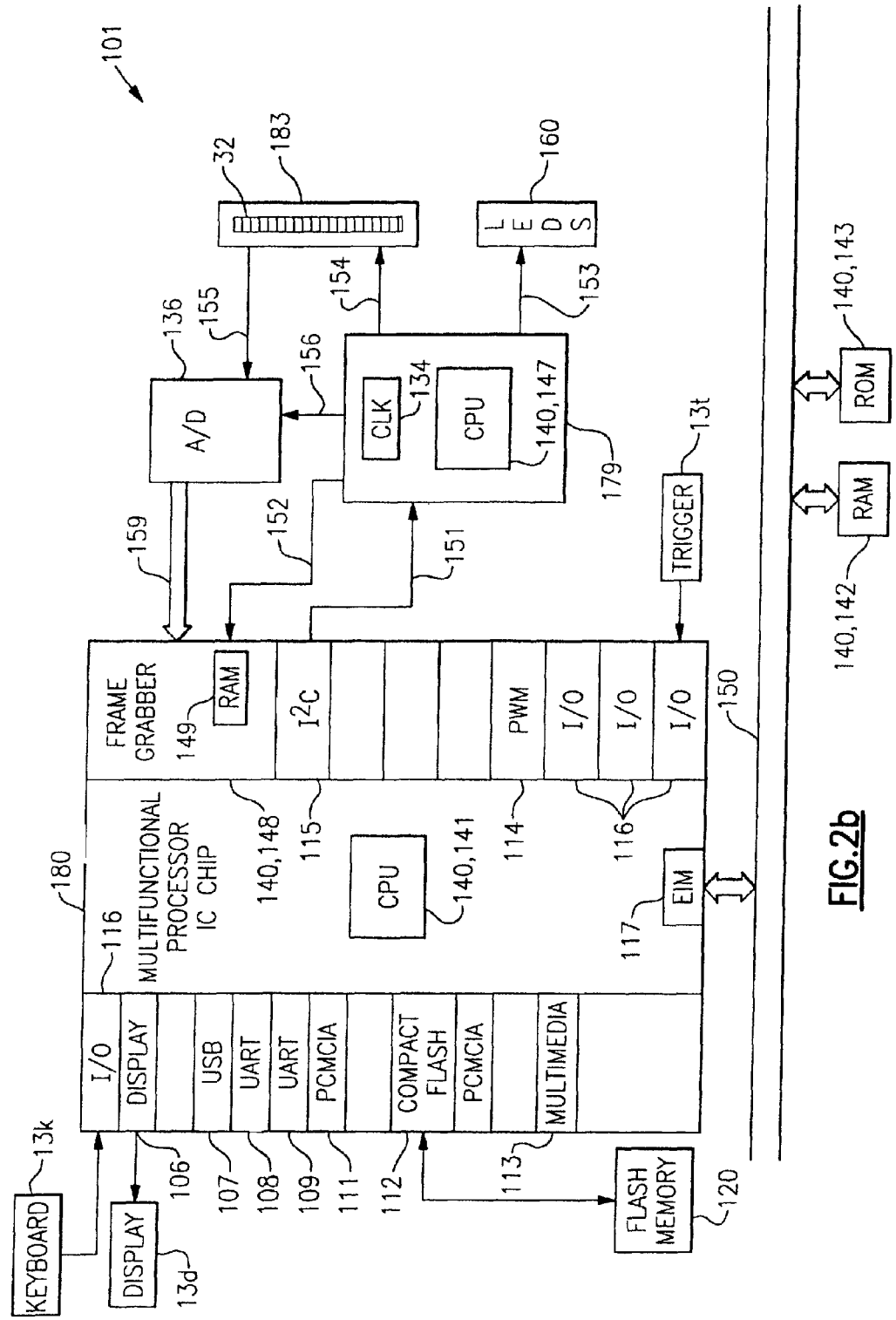

Various electrical circuits 100, 101, 102, 103, 104, and 105 which can be utilized to control optical readers are shown and described with reference to FIGS. 2a, 2b, 2c, 2d, 2e, and 2f. While the present invention relates in one aspect to optical readers having more than one imaging module, FIGS. 2a and 2b show electrical circuits for operating optical readers having a single imaging module. Numerous principles of circuit operation discussed in relation to circuits 100, 101 are incorporated into multiple imaging module electrical circuits 102, 103, 104, 105 discussed in relation to FIGS. 2c-2f.

In FIG. 2a a block diagram of an optical reader electrical circuit is shown having a multi-functional processor IC chip 180 including an integrated frame grabber block 148. Electrical circuit 100 shown in FIG. 2a can be utilized for control of a single 2D imaging module optical reader as is shown for example in U.S. application Ser. No. 09/954,081 filed Sep. 17, 2001, entitled "Optical Reader Having Image Parsing Mode," (now U.S. Pat. No. 6,561,428) which is hereby incorporated herein by reference in its entirety. In the specific embodiment of FIG. 2a, electrical circuit 100 includes a control circuit 140 comprising CPU 141, system RAM 142 and system ROM 143 and frame grabber block 148. Electrical circuit 100 further includes an image sensor 32 typically provided by a photosensitive array and an illumination block 160 having illumination LEDs 16 and aiming LEDs 18 as shown in the physical form view of FIGS. 3a-3c. Image sensor 32 of FIG. 2a is shown as being provided by a 2D photo diode array. If a 1D image sensor replaces image sensor 32, then aiming LEDs 18 and illumination LEDs 16 may be constituted by one set of LEDs. In the embodiment shown, image sensor 32 incorporated in an image sensor IC chip 182 which typically further includes an image sensor electrical circuit block 134. Image sensor electrical block 134 includes control circuit 135 for controlling image sensor 32, an A/D conversion circuit 136, for converting analog signals received from image sensor 32 into digital form and integrated clock 137 sometimes referred to as an oscillator.

In the embodiment shown in FIG. 2a, CPU 141 and frame grabber block 148 are incorporated in a multi-functional IC chip 180 which in addition to including CPU 141 includes numerous other integrated hardware components. Namely, multifunctional IC chip 180 may include a display control block 106, several general purpose I/O ports 116, several interface blocks such as a USB circuit block 107 and a UART block 108 for facilitating RS 232 communications, a UART block 109 for facilitating infra-red communications (including communication according to standards promulgated by the INFRARED DATA ASSOCIATION$_7$ (IrDA$_7$), a trade association for defining infrared standards), and a pulse width modulation (PWM) output block 110. Multi-functional processor IC chip 180 can also have other interfaces such as a PCMCIA interface 111, a compact flash interface 112, and a multimedia interface 113. If reader 5 includes a display 13d, display 13d may be in communication with chip 180 via display interface 106. Trigger 13t and keypad 13k may be in communication with chip 180 via general purpose I/O interface 116. Physical form views of readers having displays and keyboards are shown for example in U.S. application Ser. No. 10/137,484, filed May 2, 2002, entitled "Optical Reader Comprising Keyboard," (now U.S. Patent Publication No. 2003/0206150) which is hereby incorporated herein by reference in its entirety. Multi-functional processor IC chip 180 may be one of an available type of multifunctional IC processor chips which are presently available such as a Dragonball MX1 IC processor chip or a Dragonball MXL IC processor chip available from Motorola, a DSC IC chip of the type available from Texas Instruments, an O-Map IC chip of the type available from Texas Instruments, or a multifunctional IC processor chip of a variety known as Clarity SOCs (e.g., system on a chip) available from Sound Vision, Inc.

In one embodiment, multi-functional processor IC chip 180 comprises components that provide at least the functions provided by a CPU 140, system RAM 142 and system ROM 143. In some embodiments, it is advantageous that microprocessor-based decoder module 180 comprises an integrated circuit device having integrated therein a microprocessor, an analog-to-digital converter, a digital-to-analog converter, a direct memory access (DMA) channel, a bi-directional communication line for communication with a sensor such as either or both of line 151 and 152, and a channel for data receipt from a sensor, such as data line 159 that brings data to frame grabber 148. The microprocessor-based IC chip 180 can comprise semiconductor materials, optical materials, and photonic bandgap materials. In some embodiments, it is advantageous that the multi-functional processor IC Chip 180 further comprise I/O 116 suitable to accept user input (for example from a keyboard 13k), interface capability for "flash" memory devices such as "Multimedia" (MMC), "Smart Media," "Compact Flash," and "Memory Stick." Other features that may be used to advantage include pulse width modulators (PWMs), serial communication channels (e.g., UARTs, SPIs, and USBs), display drivers and controllers such as for an LCD, wireless communication capability such as Bluetooth and 802.11 (a), (b), and (g)-compatible transmitter/receivers, sequence control modules such as timer banks, sensor controllers, audio generators, audio coder/decoders ("codecs"), speech synthesizers, and speech recognition hardware and/or software.

There are many ways in which the microcomputer-based decoder module can determine which imaging module provides a frame of image data or the format of a provided frame of image data. In one embodiment, the microcomputer-based decoder module uses the Inter-IC ($I^2C$) bus protocol and circuitry operating according to the protocol. As an illustrative example, for 2D imaging modules, the $I^2C$ communication link from the microcomputer-based decoder module is used to communicate directly to an imaging module. Each 2D imaging module or sensor has a unique address for $I^2C$ communication. The microcomputer-based decoder module can interrogate an address or can attempt to communicate with an address in order to communicate with a specific imaging module. If the wrong address is used for $I^2C$ communication, the $I^2C$ communication fails. In an alternative embodiment, each 2D imaging module or sensor has an "ID" register which holds a unique value that provides an identification number. A query to the ID register of the imaging module via the $I^2C$ communication link can cause the return of the ID value stored in the register. In the event that the microcomputer-based decoder module receives the correct ID value, which also implies that the $I^2C$ bus address used is correct, there is a very high probability that the correct imaging module is being addressed. In another embodiment, resistor packs connected to port pins are used to identify a specific module. In some embodiments, different auto-detection routines are used for each imaging module.

In one embodiment, the auto-detection algorithm to identify a specific imaging module cycles through each of the defined parameters (such as an $I^2C$ address and/or ID parameter) for imaging modules until a match is found. The identity of the module is determined by comparing the matching defined parameters with information in a collection of stored data, such as a lookup table in a memory. The imaging module is identified from the data in the stored data. In order to locate a specific imaging module, stored data can be interrogated to locate the $I^2C$ address and/or the ID of the imaging module, which information can be used to communicate with the selected imaging module. The stored data can include information that specifies the format of a frame of image data provided by a selected imaging module. The information about the format can be used to determine whether the then current state of the microprocessor-based decoding module is suitable for decoding the format of imaging information provided by the selected module or whether the state of microprocessor based decoding module should be adjusted, for example by loading or activating a software module, in order to correctly decode the frame of image data that is provided.

In another alternative embodiment, an FPGA can be used to perform logical or manipulative operations on a frame of imaging data. In some embodiments, the FPGA program can handle any of the different transfer types by writing to a register, or by setting or clearing one or more specified bits. Configuration of the register or of the bit(s) in response to the detection of a given image module starts the appropriate decoding algorithm for the imaging module that is detected. Alternatively, once a given imaging module is detected, the FPGA is configured with the appropriate program to decode the format of image data provided by the imaging module. In embodiments wherein the FPGA communicates in the imaging module auto-detection process, the FPGA is programmed with the appropriate configuration, and then performs the detection process. The FPGA then performs the data decoding. In some embodiments the FPGA is reprogrammed to prepare the FPGA to do the decoding. In other embodiments, adaptable circuits such as reconfigurable FPGAs or logic circuits are used.

Frame grabber block 148 of IC chip 180 replaces the function of a frame grabbing field programmable gate array (FPGA) as discussed in commonly assigned application Ser. No. 09/954,081, filed Sep. 17, 2001, entitled "Imaging Device Having Indicia-Controlled Image Parsing Mode," (now U.S. Pat. No. 6,561,428) and application Ser. No. 09/904,697, filed Jul. 13, 2001, entitled "An Optical Reader Having a Color Imager," (now U.S. Pat. No. 6,772,569) both of which are hereby incorporated herein by reference in their entirety. More particularly, frame grabber block 148 is specifically adapted collection of hardware elements programmed to carry out, at video rates or higher, the process of receiving digitized image data from image sensor chip 182 and writing digitized image data to system RAM 142 which in the embodiment shown is provided on a discreet IC chip. Frame grabber block 148 includes hardware elements preconfigured to facilitate image frame capture. Frame grabber block 148 can be programmed by a user to capture images according to a user's system design requirements. Programming options for programming frame grabber block 148 include options enabling block 148 to be customized to facilitate frame capture that varies in accordance with image sensor characteristics such as image sensor resolution, clock out rating, and fabrication technology (e.g. CCD, CMOS, CID), dimension (1D or 2D), tonality (from 1 to N-bits), color (monochrome or color), biometric features, such as fingerprints, retinal patterns, facial features, and one- and two-dimensional patterns that can provide information, such as chromatography patterns and electrophoretic patterns of mixtures of substances, including substances such as biological samples comprising DNA.

Aspects of the operation of circuit 100 when circuit 100 captures image data into RAM 140 are now described. Circuit 100 can perform a cycle of receiving a frame of image data, performing internal programming functions, and decoding the frame of image data in a time period of less than or equal to a second. In a more preferred embodiment, the circuit 100 performs the cycle in a time period of less than or equal to $\frac{1}{30}$ of a second. It is expected that in a still more preferred embodiment, the time period can be less than or equal to $\frac{1}{270}$ of a second. When trigger 13t is pulled, CPU 141, under the operation of a program stored in system ROM 143, writes an image capture enable signal to image sensor chip 182 via communication line 151. Line 151, like the remainder of communication lines described herein represents one or more physical communication lines. In the embodiment shown, wherein image sensor chip 182 is of a type available from IC Media Corp., $I^2C$ interface 115 of chip 180 is utilized to facilitate communication with chip 182 (if another image sensor chip is selected another type of interface e.g. interface 116 may be utilized). Other types of signals may be sent over line 151 during the course of image capture. Line 151 may carry, for example, timing initialization, gain setting and exposure setting signals.

When control block 135 of image sensor chip 182 receives an image capture enable instruction, control block 135 sends various signals to frame grabber block 148. Image sensor control block 135 typically sends various types of synchronization signals to frame grabber block 148 during the course of capturing frames of image data. In particular, control block 135 may send to frame grabber block 148 "start of frame signals" which inform frame grabber block 148 that chip 182 is ready to transmit a new frame of image data, "data valid window" signals which indicate periods in which a row of image data is valid, and "data acquisition clock" signals as established by clock 137 controlling the timing of image data capture operations. In the embodiment described, line 152 represents three physical communication lines, each carrying one of the above types of signals. In an alternative embodiment, vertical and horizontal synchronization signals are processed by frame grabber 148 to internally generate a data valid window signal. Frame grabber block 148 appropriately responds to the respective synchronization signals, by establishing buffer memory locations within integrated RAM 149 of block 148 for temporary storage of the image data received from image sensor chip 182 over data line 159. At any time during the capture of a frame of image data into system RAM 142, buffer RAM 149 of frame grabber block 148 may store a partial (e.g. about 0.1 to 0.8) or a full line of image data.

Referring to further aspects of electrical circuit 100, circuit 100 includes a system bus 150. Bus 150 may be in communication with CPU 141 via a memory interface such as EIM interface 117 of IC chip 180. System RAM 142 and system ROM 143 are also connected to bus 150 and in communication with CPU 141 via bus 150. In the embodiment shown, RAM 142 and ROM 143 are provided by discreet IC chips. System RAM 142 and system ROM 143 could also be incorporated into processor chip 180.

In addition to having system RAM 142, sometimes referred to as "working" RAM, electrical circuit 100 may include one or more long term storage devices. Electrical circuit 100 can include for example a "flash" memory device 120. Several standardized formats are available for such flash memory devices including: "Multimedia" (MMC), "Smart Media," "Compact Flash," and "Memory Stick." Flash memory devices are conveniently available in card structures which can be interfaced to CPU 141 via an appropriate "slot" electromechanical interface in communication with IC chip 180. Flash memory devices are particularly useful when reader 5 must archive numerous frames of image data. Electrical circuit 100 can also include other types of long term storage such as a hard drive which may be interfaced to bus 150 or to an appropriate I/O interface of processor IC chip 180.

In a further aspect of electrical circuit 100, control circuit 140 is configured to control the turning off and turning on of LEDs 16, 18 of illumination block 160. Control circuit 140 preferably controls illumination block 160 in a manner that is coordinated with the capturing of the frames of image data. Illumination LEDs 16 are typically on during at least a portion of frame capture periods. Configuring circuit 140 so that LEDs 16, 18 have off periods significantly reduces the power consumption of circuit 100.

In a further aspect of the electrical circuit 100, electrical circuit 100 can be configured so that PWM output interface 114 of IC chip 180 controls illumination LEDs of an imaging module such as illumination LEDs 16 of module 10-1 or aiming/illumination LEDs 18 of module 10-2.

In one embodiment, illumination block 160 is in communication with PWM output interface 114 and configured in such manner that LEDs 16 are turned on at a leading edge of PWM pulses output at PWM interface 114, and are turned off at falling edges of PWM pulses output at PWM interface 114. PWM interface 114 should be configured so that several pulses are generated and sent over communication line 153i during the time that a single row of pixels of image data are exposed to light prior to clocking out of pixel values corresponding to that row. Thus, illumination LEDs 16 would be turned on and off several times during the exposure period for exposing a row of pixels to light. Further, the number of pulses output by PWM output 114 during the time that a single row of pixels are exposed should not vary substantially from row to row. The pixel clock signal received at frame grabber block 148 of IC chip 180 can be utilized to generate the PWM output. It can be seen, therefore, that multifunctional IC chip 180 including frame grabber block 148 and PWM output 114 greatly simplifies the task of developing PWM signals for use in controlling illumination LEDs 16 of module 10.

In another embodiment, PWM output 114 and illumination block 160 are configured so that PWM output 114 controls the intensity of illumination, not the on time/off time of illumination. Illumination LED block 160 in such an embodiment can include a power supply circuit which is interfaced to PWM output 114 such that the PWM signal output at PWM output 114 varies the voltage or current supplied to LEDs 16.

In a further aspect of electrical circuit 100, aiming LEDs 18 of circuit 100 can be controlled by a signal transmitted by a general purpose I/O port 116 of IC chip 180 over communication line 153a. Multifunctional processor IC chip 180 can be programmed so that an aiming LED control signal 168, as is shown in the timing diagram of FIG. 2g, is caused to change to an "on" state when frame grabber block 148 completes the process of capturing a complete frame of image data. In the time line of FIG. 2g, frame exposure periods P1, P2, and P3 are plotted against an aiming LED control signal 168. Frame grabber block 148 may be configured to generate an "end of acquisition" or "end of frame" signal when frame grabber block 148 completes the process of capturing a complete frame of image data into RAM 142. When CPU 141 receives an "end of acquisition" signal, CPU 141 controls I/O port 116 to change the state of LED control signal 168. Control circuit 140 may also change the state of LED control signal 168 when generating a start of frame signal. As indicated by the time line of FIG. 2g, control circuit 140 may execute a delay prior to changing the state of signal 168. Control circuit 140 is programmed so that LED control signal 168 remains in an "ON" state known to be sufficiently short duration so as not to cause actuation of an aiming LED 18 during a succeeding frame exposure period. Configured in the manner described, aiming LEDs 18 are selectively pulsed on for a short duration during intermediate successive frame exposure periods, e.g. frame exposure periods P1 and P2.

Referring now to FIG. 2b, electrical circuit 101 is described. Electrical circuit 101 controls operation of a single imaging module optical reader comprising a low cost 1D CCD image sensor 32 incorporated on IC chip 183. Image sensor 32 of FIG. 2b may be provided for example by a Toshiba Model TCD 1304 AP linear image sensor. Further aspects of an exemplary 1D imaging module are described, for example, in application Ser. No. 09/658,811, filed Sep. 11, 2000, entitled "Optical Assembly for Barcode Scanner," (now U.S. Pat. No. 6,607,128) which is hereby incorporated herein by reference in its entirety.

Referring to aspects of electrical circuit 101 in detail, electrical circuit 101 includes a control circuit 140 which, like control circuit 140 of circuit 100 is partially incorporated in a multifunctional processor IC chip 180 including CPU 141 and a frame grabber block 148. Control circuit 140 of circuit 101 further includes system RAM 142 system ROM 143 and supplementary central processor unit (CPU) 147, integrated on processor IC chip 179. System RAM 142 and system RAM 143 are in communication with EIM interface 117 of IC chip 180 via bus 150.

Processor IC chip 179 provides control and timing operations similar to that provided by electrical block 134 of image sensor chip 182 described in FIG. 1*a*. Processor IC chip 179, in general, sends synchronization signals and digital clocking signals to IC chip 180, and sends digital clocking signals to A/D conversion circuit 136 and image sensor 32. Processor IC chip 179 of circuit 101 may be a relatively low power processor IC chip such as an 8-bit Cypress Programmable System-on-Chip™ (PSoC™) CY8C26Z33-24PZI Microcontroller processor IC chip available from Cypress Micro-Systems of Bothell, Wash.

Aspects of the operation of IC chip 179 in during the course of capturing slice image data will now be described in detail. When trigger 13*t* is pulled, CPU 141 transmits enable image capture instructions over communication line 151. In response to receipt of an image capture enable instructions received from chip 180, processor IC chip 179 performs a variety of operations. Processor IC chip 179 may send synchronization signals, such as "start of scan," "data valid window," and "data acquisition clock" signals to frame grabber block 148 via communication line 152. Processor IC chip 179 may also send timing signals and digital clocking signals (e.g. master clock, integration clear gate, and shift gate pulse) to image sensor 32. Processor IC chip 179 typically also transmits a master clock signal to A/D conversion circuit 136. Referring to further aspects of IC chip 180 of circuit 101, CPU 141 of chip 180, may also send e.g. gain setting, exposure setting, and timing initialization signals via line 151 to IC chip 179. Communication between IC chip 180 and IC chip 179 may be made via an SPI interface or I/O interface 116 of chip 180 and chip 179.

As will be explained with reference to circuit 104, shown in FIG. 2*e*, processor IC chip 179 may be replaced by a programmable logic circuit, e.g. a PLD, CPLD, or an FPGA. IC chip 179 could also be replaced by an ASIC. Electrical circuit 101 of FIG. 2*b* includes what may be termed a "digital digitizer" in that analog voltage levels transmitted by CCD image sensor 32 on line 155 are converted into gray scale pixel values by A/D converter 136 and transmitted via line 159 to frame grabber block 148. Circuit 101 could also include an analog digitizer which processes an analog signal generated by image sensor 32 to generate a two-state output signal that changes state in accordance with light-to-dark and dark-do-light transitions of the image sensor analog output signal.

Processor IC chip 179 also controls LED bank 160. LED bank 160 of a 1D image sensor reader typically includes a single bank of LEDs which simultaneously illuminates a target area and provides an aiming pattern facilitating aligning of the reader with a target indicia. LEDs 18 of 1D imaging module 10-2 like LEDs 16 of module 10-1 can be pulsed so as to reduce energy consumption by LEDs 18.

Electrical circuit 100 and electrical circuit 101 form a family of 1D and 2D optical readers electrical circuits, which may be manufactured by a single manufacturing entity wherein both of the 1D and 2D readers include the same main processor chip, namely, multifunctional processor IC chip 180. Multifunctional processor IC chip 180 of circuit 100 and circuit 101 can both be provided by e.g. a Dragonball MX1 IC chip or a Dragonball MXL IC chip of the type available from Motorola, Inc. Multifunctional processor IC chip 180 of electrical circuit 101 includes far more processing power than is necessary to provide the functionality of a 1D optical reader. Nevertheless, the inventors have discovered that the overall cost of electrical circuit 101 is reduced by incorporating frame grabbing multifunctional IC chip 180 in circuit 101, for reasons including that such incorporation reduces overall engineering cost relative to the development costs of two different 1D and 2D electrical circuits comprising two different main processor types.

Various electrical circuit architectures for operating a reader having more than one imaging module 10 are shown in FIGS. 2*c*-2*f*.

Figure 2C:
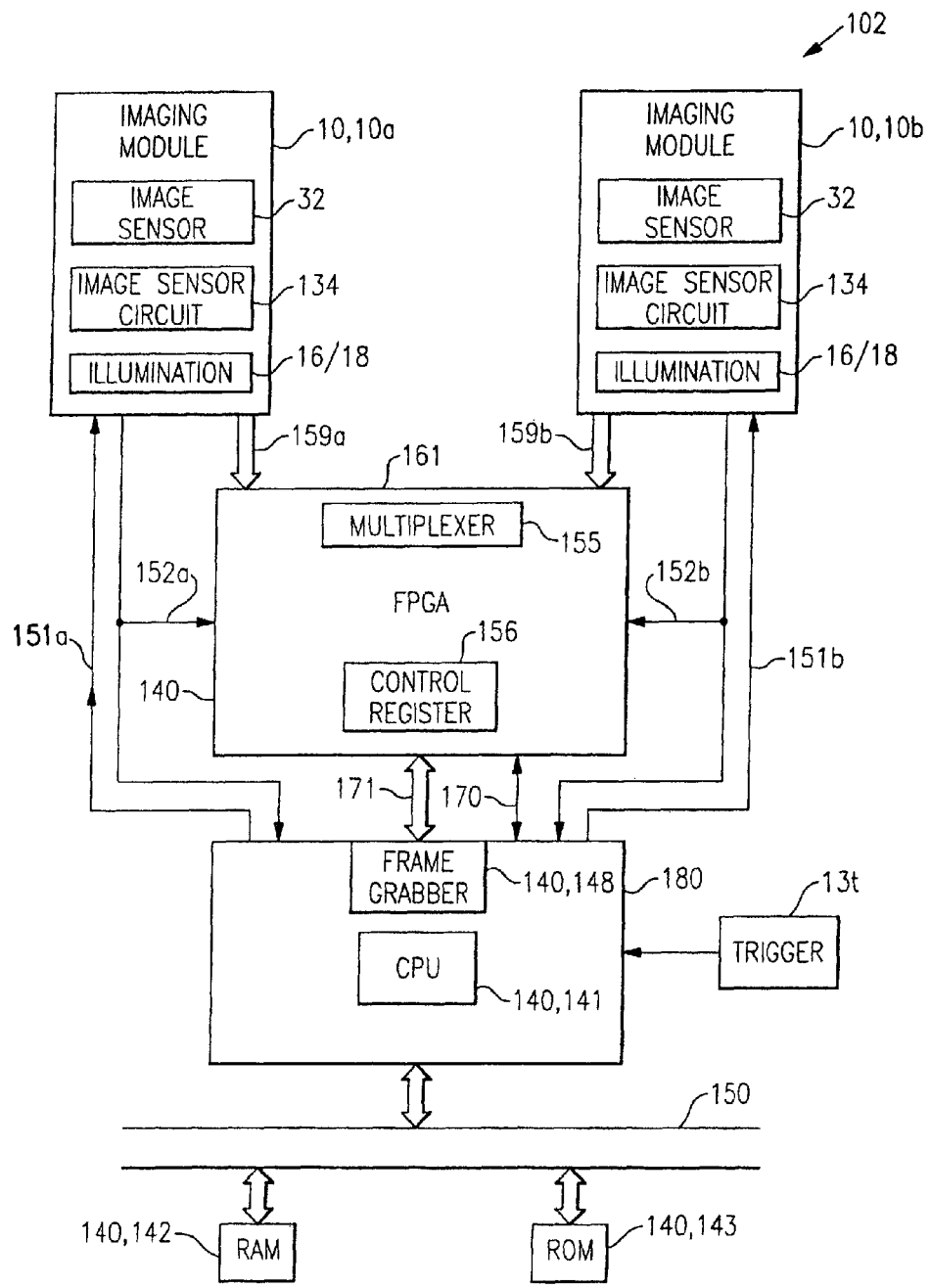

In the architecture of FIG. 2*c*, electrical circuit 102 includes a pair of imaging modules 10 and a control circuit 140. Control circuit 140 includes a field programmable gate array (FPGA) 161, a multifunctional processor IC Chip 180 including a CPU 141 and frame grabber block 148, a system RAM 142 and a system ROM 143. Processor IC chip 180 may be, for example, a Dragonball MX1 IC chip or a Dragonball MXL IC chip of the type available from Motorola, Inc. Imaging modules 10*a* and 10*b* shown in block form in FIG. 2*c* correspond to the physical 2D imaging module 10-1 shown in FIGS. 3*a*-3*c*. System RAM 142 and system ROM 143 are in communication with processor IC Chip 180 via system bus 150. In general, FPGA 161 of circuit 102 is programmed to execute a multiplexer function indicated by block 155. In response to module select signals received from multifunctional processor IC chip 180, multiplexer 155 receives image data over one of data lines 159*a*, 159*b* from a selected one of module 10*a* and module 10*b* and sends the data to frame grabber block 148 of processor IC chip 180. Multiplexer 155 can be deleted if imaging modules 10 are selected to include image sensor IC chips which generate high impedance (tristatable) synchronization signals when not actuated. In some embodiments, FPGAs described herein can be replaced by another programmable circuit. For example, a programmable logic device (PLD), a complex programmable logic device (CPLD) or another device such as an ASIC or processor chip (e.g. such as chip 179 or chip 180) can replace FPGA 161. In alternative embodiments, imaging modules can be exchanged (e.g., by physical substitution or by moving a cable connection from one socket to another socket) for other types of imaging modules. In yet other embodiments, imaging modules can be switched into or out of communication with the microprocessor-based decoder module, either manually or under computer control, thereby substituting one imaging module for another, or changing the number of imaging modules that are available at a specified time.

Referring to the operation of electrical circuit 102 in further detail, processor IC chip 180 sends an image capture enable signal to FPGA 161 via line 170 when trigger 13*t* is actuated and to an appropriate one of modules 10*a* and 10*b* via one of lines 151*a*, 151*b*. The selected module, 10*a* or 10*b*, then sends synchronization signals, and the digital clocking signals as described previously to FPGA 161 and IC chip 180, over the appropriate one of lines 152*a*, 152*b*.

FPGA 161 transmits image data to multifunctional processor IC Chip 180 over data line 171 which in turn transmits image data to RAM 142 over system bus 150. Lines 151*a*, 151*b* may carry PWM interface illumination control signals as described previously in connection with electrical circuit 100.

Figure 2D:
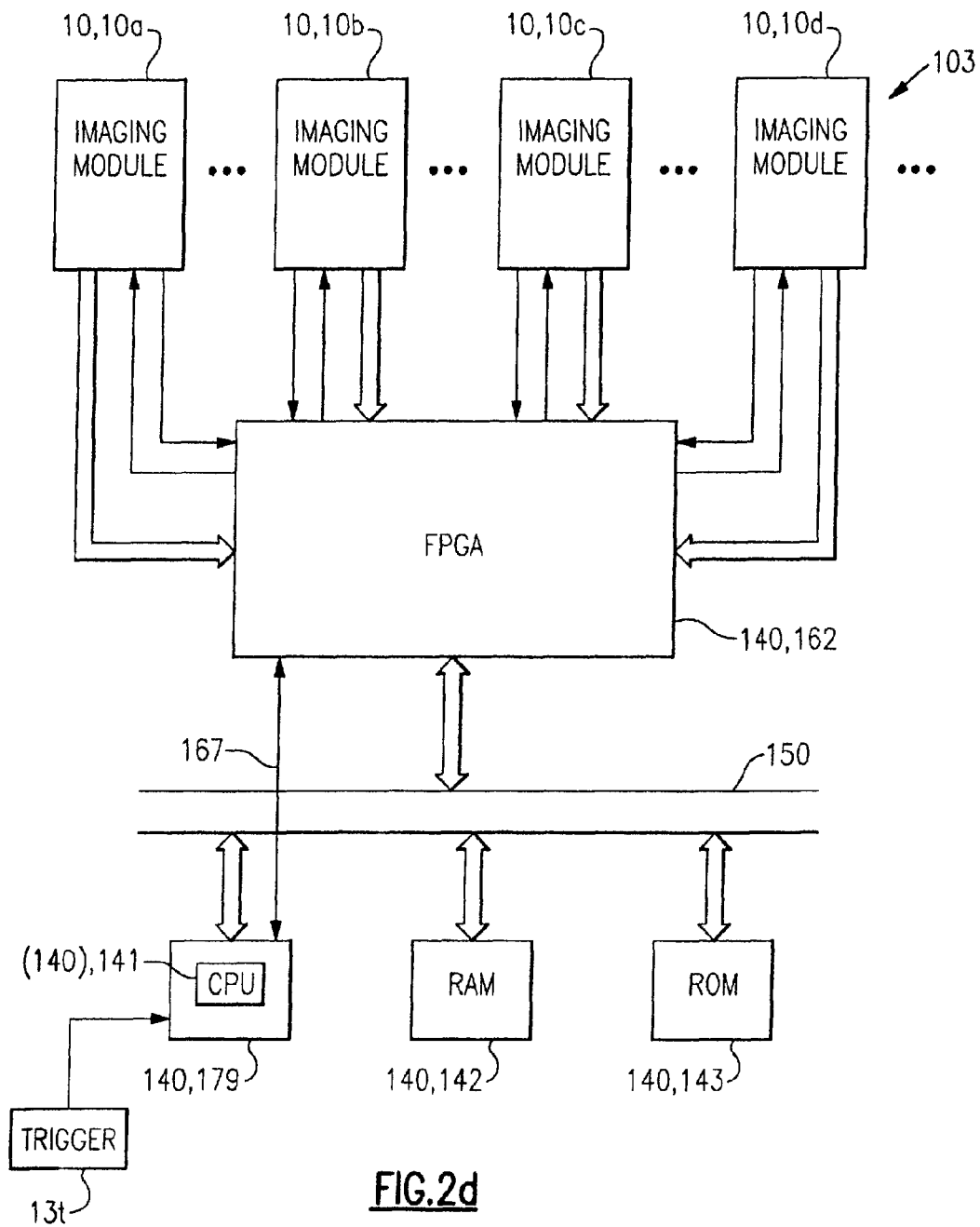

In the architecture of FIG. 2*d*, electrical circuit 103 includes a plurality of N imaging modules 10, which may be incorporated in a single housing 7, where N is an integer greater than one. Electrical circuit 103 includes a control circuit 140 having an FPGA 162, a processor IC Chip 179, a system RAM 142 and a system ROM 143. FPGA 162 is in communication with processor IC Chip 179 via system bus 150. Processor IC chip 179 and FPGA 162 are also in communication via bus arbitration communication line 167 which carries bus hand shaking (e.g. bus request, bus grant) signals.

Various embodiments of FPGA 162 are described with reference to FIGS. 2h and 2i. In the embodiment of FIG. 2h, FPGA 162c is programmed to include multiplexer block 162m, control register 162c, and a solitary frame grabber block 162f. Image capture enable signals for actuating image capture via one of a plurality of modules e.g. 10a are received at control register 162 in response to an actuation of trigger 13t. Control register 162c on receipt of an image capture enable signal sends the image capture enable signal to the selected module 10 and utilizes the signal to associate frame grabber block 162f to the selected module e.g. 10a. It will be understood that control register 162c can be adapted to send during one type of frame capture method, e.g. illumination actuation signals to a second imaging module, 10c while actuating an image sensor 32 of a first module, e.g. 10a without sending illumination actuation signals to first module 10a.

Figure 2E:
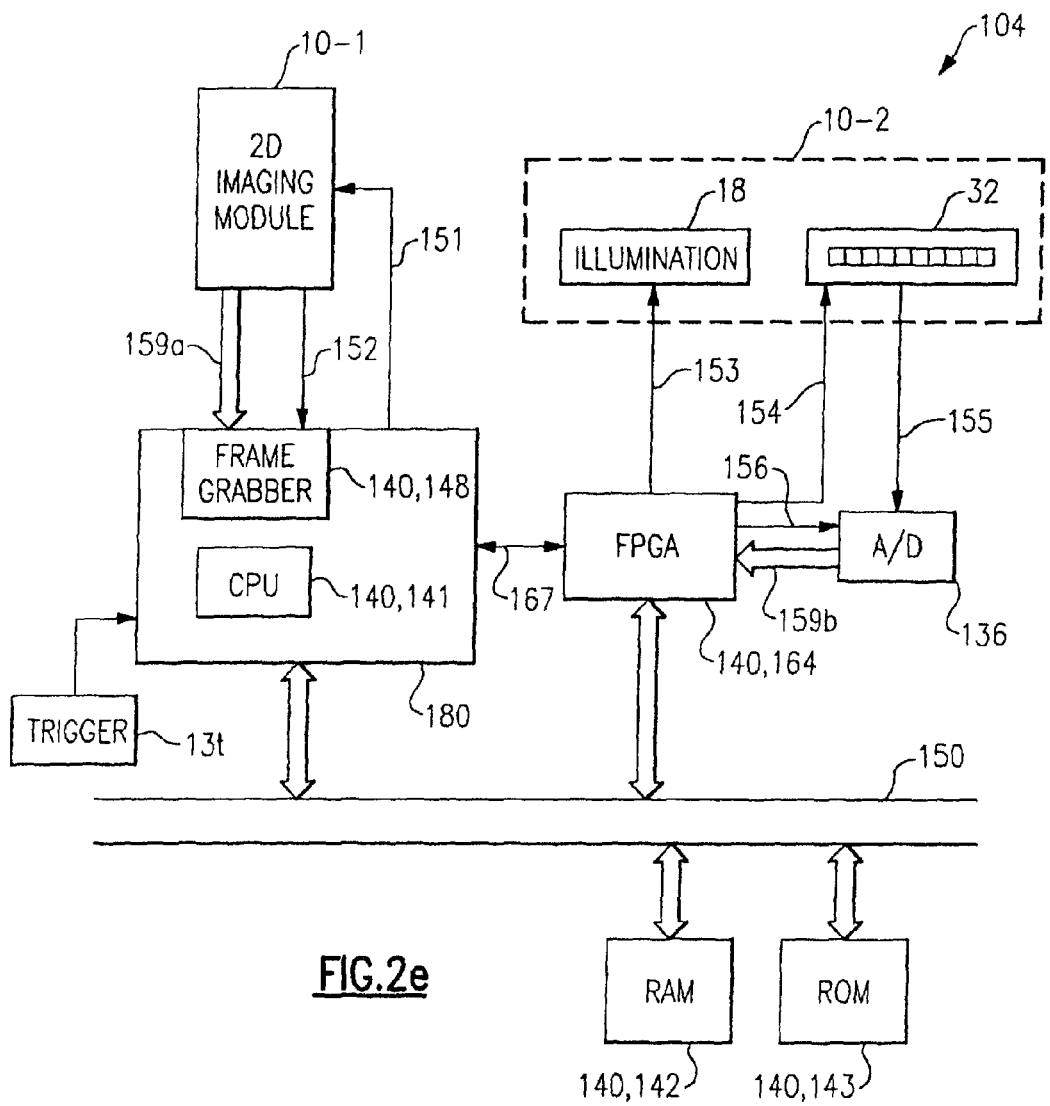
Figure 2J:
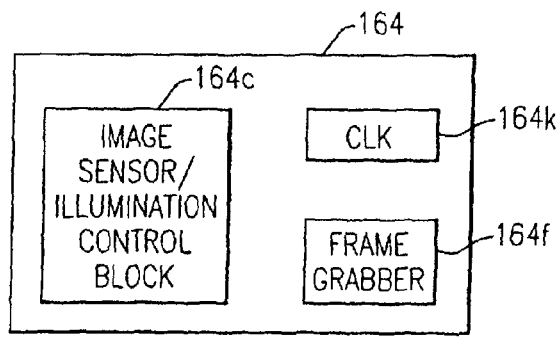
FIGS. 2h-2j illustrate additional exemplary embodiments of microprocessor-based decoder modules according to the invention.
Figure 2F:
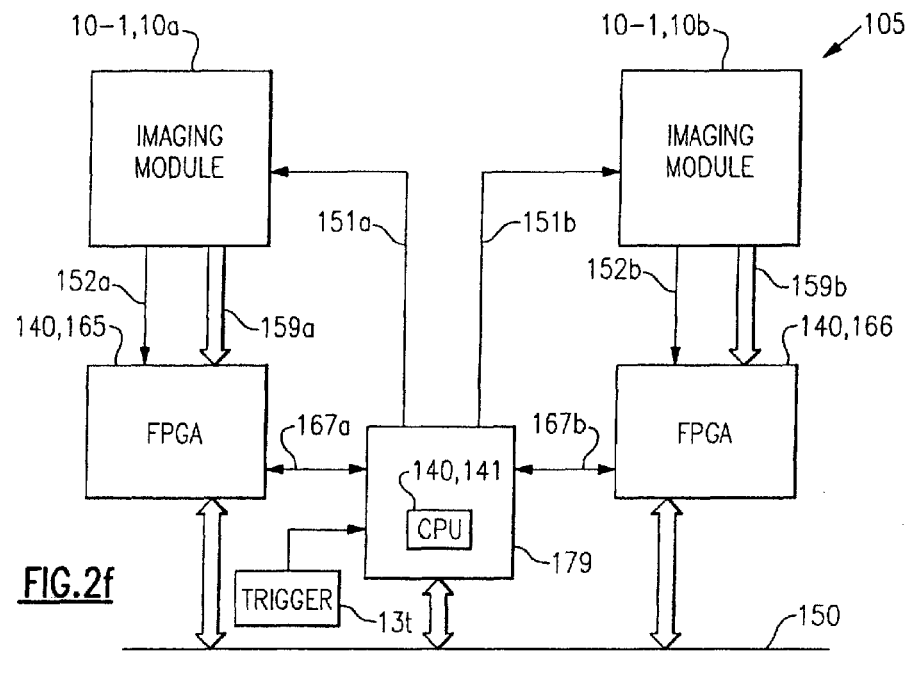
Figure 2G:
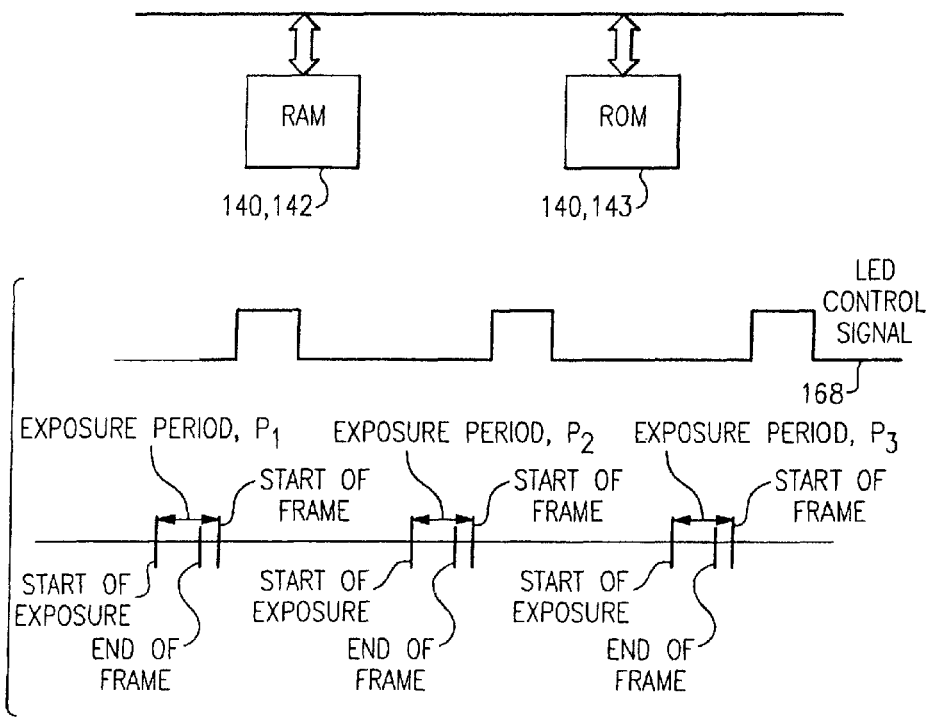
FIG. 2g is a timing diagram illustrating an exemplary relation for control signals, exposure periods and frame acquisition, according to the invention.
Figure 2H:
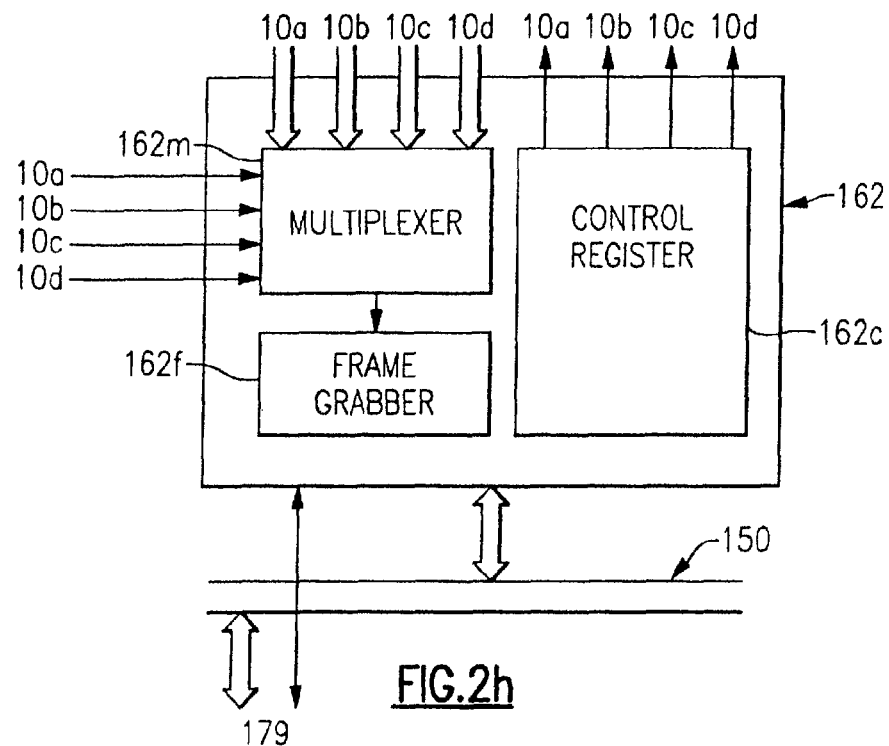
Figure 2I:
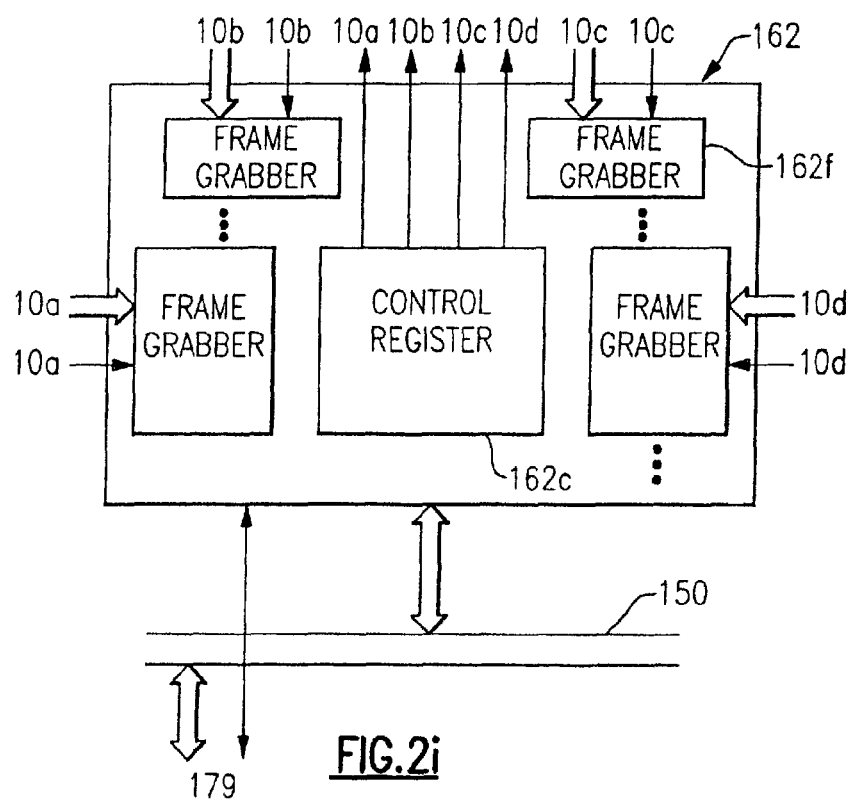

In the embodiment of FPGA 162 illustrated in FIG. 2i, multiplexer block 162m is deleted. FPGA 162 of FIG. 2i includes N frame grabber blocks 162f. With use of FPGA 162 configured as shown in FIG. 2i, electrical circuit 103 can be operated to capture several frames of image data contemporaneously by contemporaneous actuation of each of several imaging modules e.g. 10a and 10c. A selected frame of image data can be decoded to recover information encoded in the decodable indicia represented by the frame.

Referring to further aspects of electrical circuit 103, of FIG. 2d processor IC chip 179 can be provided by general purpose processor IC chip such as a Power PC IC chip of the type available from Motorola. Other suitable IC chips for providing the function of IC chip 179 of circuit 103 include, for example, an Intel SA1110 chip and an Xscale family of processor IC chips, also available from Intel.

Referring now to FIG. 2e, electrical circuit 104 controls a pair of imaging modules wherein a first imaging module 10-1 is a 2D imaging module and a second imaging module 10-2 is a 1D imaging module. Control circuit 140 includes CPU 141, 2D frame grabber block 148, FPGA 164, system RAM 142 and system ROM 143. Frame grabber block 148 and CPU 141 are both incorporated on multifunctional processor IC chip 180 (e.g. a Motorola Dragonball MX1 IC chip or Dragonball MXL IC chip), as described previously in connection with FIG. 2a. A main program executed by CPU 141 of multifunctional processor IC chip 180 controls operation of both first imaging module 10-1 and second imaging module 10-2.

For capture of a 2D image, processor IC chip 180 in response to actuation of trigger 13t sends an image capture enable signal to module 10-1 via a communication line 151. During image capture, 2D imaging module 10-1 sends synchronization and digital clocking signals to frame grabber block 148 via communication line 152 which as explained previously and like all lines represented herein may represent a plurality of physical lines. Further, 2D imaging module 10-1 sends digitized image data to frame grabber block 148 via data line 159a. Processor IC chip 180 stores image data in RAM 142 by writing image data stored in buffer memory locations of frame grabber block 148 to RAM 142 via system bus 150. An illumination control signal communication line is also typically interposed between IC chip 180 and module 10-1. Line 151 represents an illumination signal communication line.

For capture of a 1D "slice" image representation, processor IC chip 180 sends a 1D image capture enable signal to FPGA 164 via system bus 150. Processor IC chip 180 and FPGA 164 are further in communication via communication line 167 which carries bus handshaking (e.g. bus request and bus grant) signals. On receipt of an image capture enable signal from processor IC chip 180, FPGA 164 sends digital clocking signals to A/D converter 136 via line 156, to image sensor 32 via line 154, and illumination control signals to illumination LEDs 18 as shown in the physical form view of FIG. 3e via line 153. Image sensor 32 sends analog image signals to A/D converter 136 via output line 155 and A/D converter 136 in turn converts the signals into N (typically 8) bit gray scale pixel values. A/D converter 136 sends the digitized image data to FPGA 164 which stores the image data to RAM 142.

As indicated by the block diagram of FIG. 2j, FPGA 164 of electrical circuit 104 includes frame grabber block 164f for fast transfer of image data into system RAM 142, image sensor illumination and control block 164c for controlling LEDs 18 and for developing synchronization signals, and clock 164k for generating digital clocking pulses.

A computer program (software) recorded on a machine-readable medium is provided for use on a multi-functional processor IC Chip 180. When operating, individual modules of the computer program perform the steps of receiving a frame of image data acquired by a selected one of a 1D imaging module and a two-dimensional (2D) imaging module; determining the format of the frame of image data, for example by determining which of said selected imaging modules acquired said received frame of imaging data. Alternatively, one or more modules of the computer program use information about the frame of image data to determine the format of the frame of image data. The computer program comprises one or more modules that decode said frame of imaging data accordingly. The information about the imaging module that acquired the frame of imaging data can include, but is not limited to, at least one of a bus address of the imaging module, an ID code of the imaging module, the model of the imaging module, and an electrical parameter of the imaging module, such as the value of a resistance.

The software includes instructions that are performed only as necessary, comprising at least one command to prepare said microprocessor-based decoder module to decode said communicated frame of image data if the microprocessor-based decoder module is not already properly configured to perform the decoding process. As is described in greater detail in conjunction with FIGS. 4f-4i, FIGS. 6a-6d, FIGS. 7a-7b, and FIGS. 8a-8b, the process for receiving and decoding a frame of image data from a selected imaging module involves several operative steps. In one portion of the process, the microprocessor-based decoder module recognizes the format of the frame of image data by determining one or more of source of the frame of image data and a parameter associated with the frame of image data. As necessary, a module such as a dynamically linked library (for example, a .dll or an .ocx) module is invoked to translate the format of the incoming frame of image data provided by the selected imaging module into a format suitable for further processing. When a different imaging module is selected, the corresponding .dll file is located in memory (or if needed, is read from a machine-readable repository), and is activated. The frame of imaging data is then decoded according to a procedure that depends on the format of the frame of data. For example, a 2D frame of image data is decoded by converting the 2D data into a succession of 1D data segments having 8-bit resolution, converting each 1D data segment into transition location information having one bit resolution, and decoding the transition location information. The process can be programmed as an iterative process, as is explained in greater detail below. Transition location information is information that correlates a transition in reflected light to a position or location in the decodable indicia, such as a change from white to black or black to white at various positions within a conventional 1D bar code. The width or shape of a feature can be deduced from observing successive transition locations.

FIG. 2f depicts another electrical circuit for controlling a plurality of imaging modules. Electrical circuit 105 includes a pair of frame grabbing FPGAs 165, 166. First FPGA 165 is dedicated for frame capture of image data generated by first imaging module 10a while second frame grabbing FPGA 166 is dedicated for capture of image data generated by second imaging module 10b. The architecture of FIG. 2f is especially well suited for contemporaneous capture of multiple frames of image data via contemporaneous actuation of image sensors of two separate imaging modules 10a and 10b. The image data can be decoded from its location in memory.

Control circuit 140 of electrical circuit 105 includes CPU 141 which may be incorporated on a general purpose 32-bit processor IC chip 179, frame grabbing FPGAs 165 and 166, system RAM 142 and system ROM 143. Processor IC chip 179 may transmit image capture enable instruction via communication lines 151a and 151b. Processor IC chip 179 may also send illumination control signals via lines 151a and 151b. For example, in a mode of operation that will be described herein processor IC chip may send an image capture enable signal to module 10a over line 151a (and an illumination disabling signal over line 151a), and an illumination control signal to module 10b over line 151b with use of a specific image capture method wherein images are captured in such a manner so as to be substantially impervious to specular reflection decode failures.

In a further aspect of electrical circuit 105, imaging modules 10a and 10b send synchronization and digital clocking signals to FPGAs 165 and 166 respectively, via lines 152a and 152b, and image data to FPGAs 165 and 166 respectively over, data lines 159a and 159b. Processor IC chip 179 is in communication with frame grabbing FPGAs 165 and 166 via system bus 150 and via bus arbitration communication lines 167a and 167b over which bus handshaking signals (e.g. bus request, bus grant) are sent. While the invention in a major aspect relates to optical readers having multiple imaging modules, another commercial optical product according to another aspect of the invention is described with reference to FIGS. 5a-5e.

In FIG. 5a an optical reader is shown having an electrical circuit 100 as described in FIG. 2a wherein an imaging module 10 is incorporated on a compact flash card 510. Compact flash card 510 carrying circuit 100 as will be explained herein may be interfaced with a host processor assembly such as a personal data assistant (PDA) 540 or a personal computer (PC) 550. Other embodiments of optical readers can be produced as compact flash cards.

As best seen in FIG. 5c or 5d, PDA 540 can include a compact flash slot 544 for receiving a compact flash card 510, which incorporates an imaging module 10.

Various features of compact flash card 510 incorporating module 10 are described with reference to FIG. 5a. As seen in FIG. 5a, electrical circuit 100 including multifunctional frame grabbing IC chip 180, system RAM 142, and system ROM 143 are incorporated on compact flash card 510 which further carries imaging module 10. Imaging module 10 may be a 2D imaging module as described with reference to FIG. 3a-3c, or a 1D module, e.g. as described with reference FIG. 3e. Card 510 typically further comprises a protective cover (not shown).

Compact flash card 510 including electrical circuit 100 as indicated by block diagram FIG. 5b, is interfaced to a host processor system 68. As will be explained further herein, host processor system 68 can be included in e.g. a personal data assistant (PDA) 540 as shown in FIG. 5b or a personal computer (PC) 550 as shown in FIG. 5e.

Referring to further aspects of the block diagram of FIG. 5b, circuit 515 includes FPGA 520 which facilitates communication between electrical circuit 100 and host system 68. A physical form view of FPGA 520 is shown in physical form diagram of FIG. 5a. FPGA 520 may be programmed to perform a variety of functions. FPGA 520 may be programmed to (1) communicate with host 68 to inform host 68 that compact flash card 510 is connected to host 68 when it is first connected, (2) to perform all compact flash bus timing, and (3) to provide all buffer interfaces required to receive from circuit 100 data in a form supported by electrical circuit 100 and to allow that data to be received in a compact flash format as is required by host 68.

FPGA 520 can be connected via a communication line 504 to UART interface 108 of multifunctional processor IC chip 180. UART interface 108 may transmit data in e.g. an RS 232 format while FPGA 520, appropriately programmed, converts that data into a compact flash format. Further connected to FPGA 520 via line 526 is a compact flash female connector 530, which is formed on an edge of compact flash card 510, and comprises a plurality of sockets 530s as indicated in the exploded section view of FIG. 5a.

Compact flash card 510 including an electrical circuit 100 having imaging module 10 can operate in a first integrated mode or a second "free-standing" which in one specific embodiment can be considered a "tethered" mode. An integrated mode of operation of card 510 is described with reference to FIGS. 5c and 5d. In an integrated mode, card 510 is integrated into a device such as a PDA 540. To electrically and mechanically connect card 510 to a host, device female end 530 is connected to male end compact flash connector 531, comprising a plurality of pins, within a housing of the host device.

A free-standing mode of operation is illustrated with reference to FIG. 5e. In a free-standing mode of operation, compact flash card 510 including module 10 is positioned in a position spaced apart from a host device e.g. device 550. Compact flash card 510 may rest on a table top or else may be mounted to a fixed member spaced apart from the host device e.g. PC 550. In a free-standing mode, card 510 may be connected to a host device via a flexible cable connector 560. When card 510 is connected to a host assembly via a flexible connector, card 510 may be considered to be operating in a "tethered" mode. Card 510 may also be wirelessly connected to a host via an RF link, an IR link, or a link using a similar wireless connection like Bluetooth or 802.11 compatible hardware. In the embodiment of FIG. 5e cable connector 560 is interfaced to host device 550 on one end and to compact flash card 510 on another end. Cable connector 560 includes male compact flash connector 531 for facilitating communication between connector 560 and card 510. Card 510 can further include feet 565 of height substantially the same as connector 531 disposed on an under surface thereof so that card 510 can rest substantially horizontally on a table surface when operating in a free-standing mode. Host device 550 in the free-standing mode diagram illustrated by FIG. 5e is shown as a PC. It will be understood that a host device in a free-standing mode could also be provided by PDA 540 or another mobile or non-mobile computer device.

The multiple imaging module electrical circuits 102, 103, 104, and 105 described herein can be implemented for operation of imaging modules spread out over several housings or for operation of imaging modules incorporated in a housing 7 of multiple imaging module reader 5-1, 5-2, 5-3, 5-4, 5-5, 5-6, and 5-7, 5-8 and 5-9 as shown in physical form views 1*a*-1*i*.

Methods for operating a multiple imaging module optical reader according to the invention will now be described in greater detail. Flow diagrams of FIGS. 4*a*-4*c* and FIGS. 4*f*-4*i* illustrate operation of a multiple imaging module optical reader having at least two imaging modules 10*a*, 10*b*. The modules described in the illustrative example given herein are 1D and 2D imaging modules.

As will be recognized by practitioners of ordinary skill, any number of modules that provide image data in any of a plurality of formats, such as 1D imaging modules, 2D imaging modules, gray scale imaging modules, color imaging modules, and biometric imaging modules can be present in any combination, limited only by the ability to design and to build multiplexed input and output connections to the microprocessor-based decoder module, such as an N port by M line multiplexer that handles N imaging modules, each imaging module having a total of no more than M data and control lines, where N and M represent positive integers. As will be recognized, in a properly designed system, a programmed computer can select one of the plurality of imaging modules present by suitably driving the multiplexer. Alternatively, a user can select one of the plurality of available imaging modules, for example by activating a switch manually or connecting a cable to a cable connector.

In the reader methods described herein "actuation of an image sensor" generally refers to at least one step in the process of sending appropriate signals to an image sensor 32 to cause exposure of image sensor pixels to light and to cause clocking out of electrical signals corresponding to light received at pixels of the array. These steps are described in greater detail in for example, U.S. application Ser. No. 09/766,922, filed Jan. 22, 2001, entitled "Optical Reader Having Reduced Parameter Determination Delay," (now U.S. Patent Publication No. 2002/0125317) which application is incorporated herein by reference in its entirety. "Actuation of illumination" herein generally refers to the step of sending electrical current to a light source e.g. 16, 18 to turn on the light source.

Figure 4A:
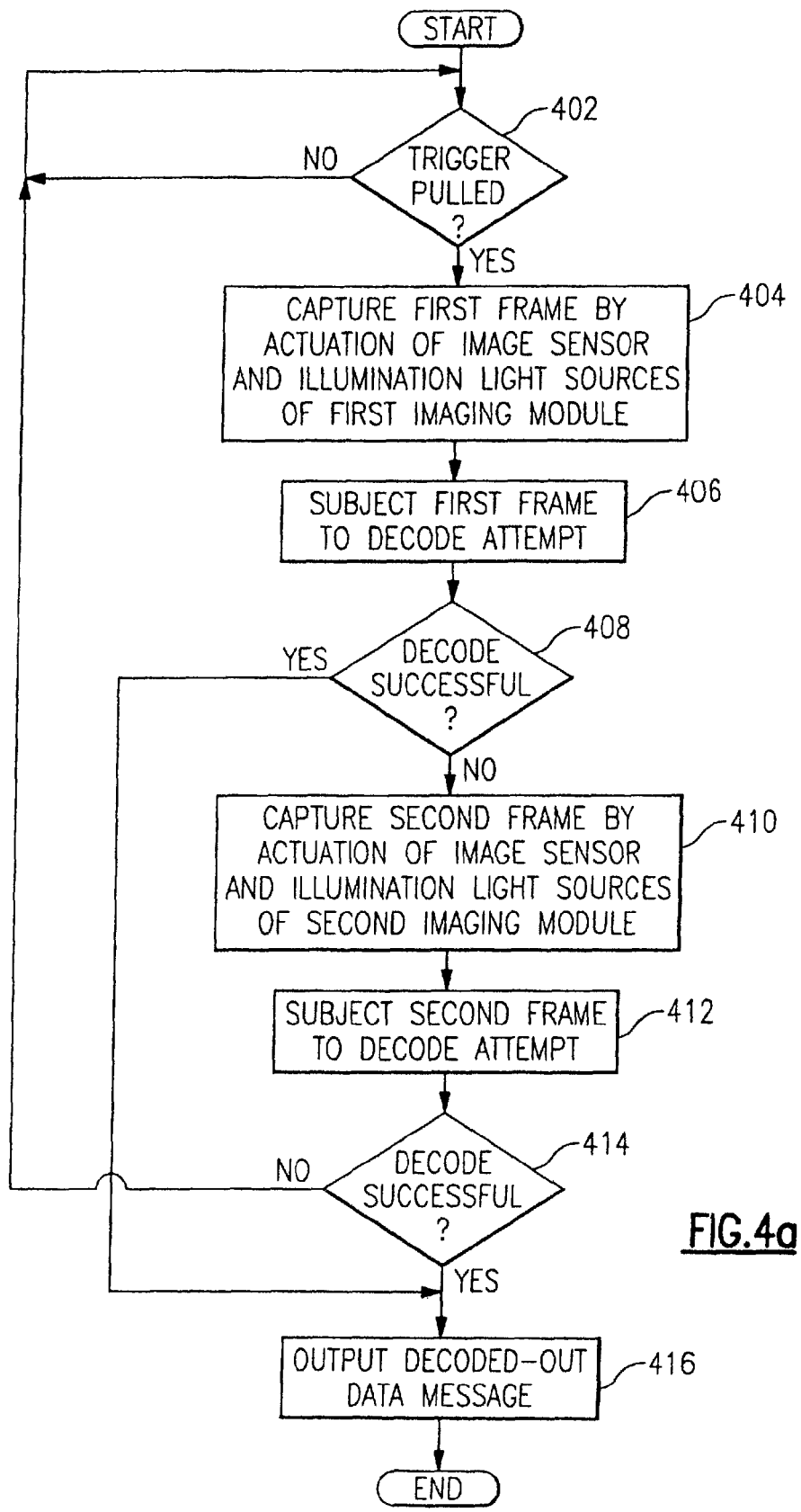

Referring to the reader operating method of FIG. 4*a*, at block 404 after a trigger 13*t* is pulled (block 402) control circuit 140 actuates image sensor 32 of first imaging module 10*a* and illumination light sources 16 of first imaging module 10*a* during a frame capture period in which a first frame of image data is captured. At block 406 control circuit 140 subjects the first captured frame of image data to a decode attempt. If the decode attempt is not successful (block 408), control circuit 140 executes block 410 to capture a second frame of image data. Control circuit 140 actuates image sensor 32 and illumination light sources 16 of second imaging module 10*b* when capturing a second frame of image data. Instead of capturing a second frame of image subsequent to subjecting a first frame to a decode attempt (406) control circuit 140 can capture a second frame as described in connection with block 410 prior to the decode attempt of block 406. Control circuit 140 can capture a first frame as described in connection with block 404 and a second frame as described in connection with block 410 in any order and can capture the frames contemporaneously. At block 412 control circuit 140 subjects the indicia representation of the second frame to a decode attempt, and at block 410 outputs a decoded out data message if decoding is successful (block 414). The attempt to decode a decodable indicia may be in accordance with a method for decoding decodable indicia such as are described in U.S. application Ser. No. 09/904,697, filed Jul. 13, 2001, entitled "Applying a Color Imager To A Hand Held Reader For Indicia Reading Image Capture," (now U.S. Pat. No. 6,772,569) which is incorporated herein by reference in its entirety. The reader control method described with reference to the flow diagram of FIG. 4*a* is highly useful wherein specular reflection decode failures can be expected. Referring to the example of two module reader 5-1 shown in FIGS. 1*a* and 1*b* note that if there may be a specular reflection decode failure when a first frame corresponding to a mirrored planar surface is captured via actuation of first module 10*a* then there likely will not be a specular reflection decode failure when a second frame captured via actuation of second module 10*b* is subjected to decoding.

Figure 4B:
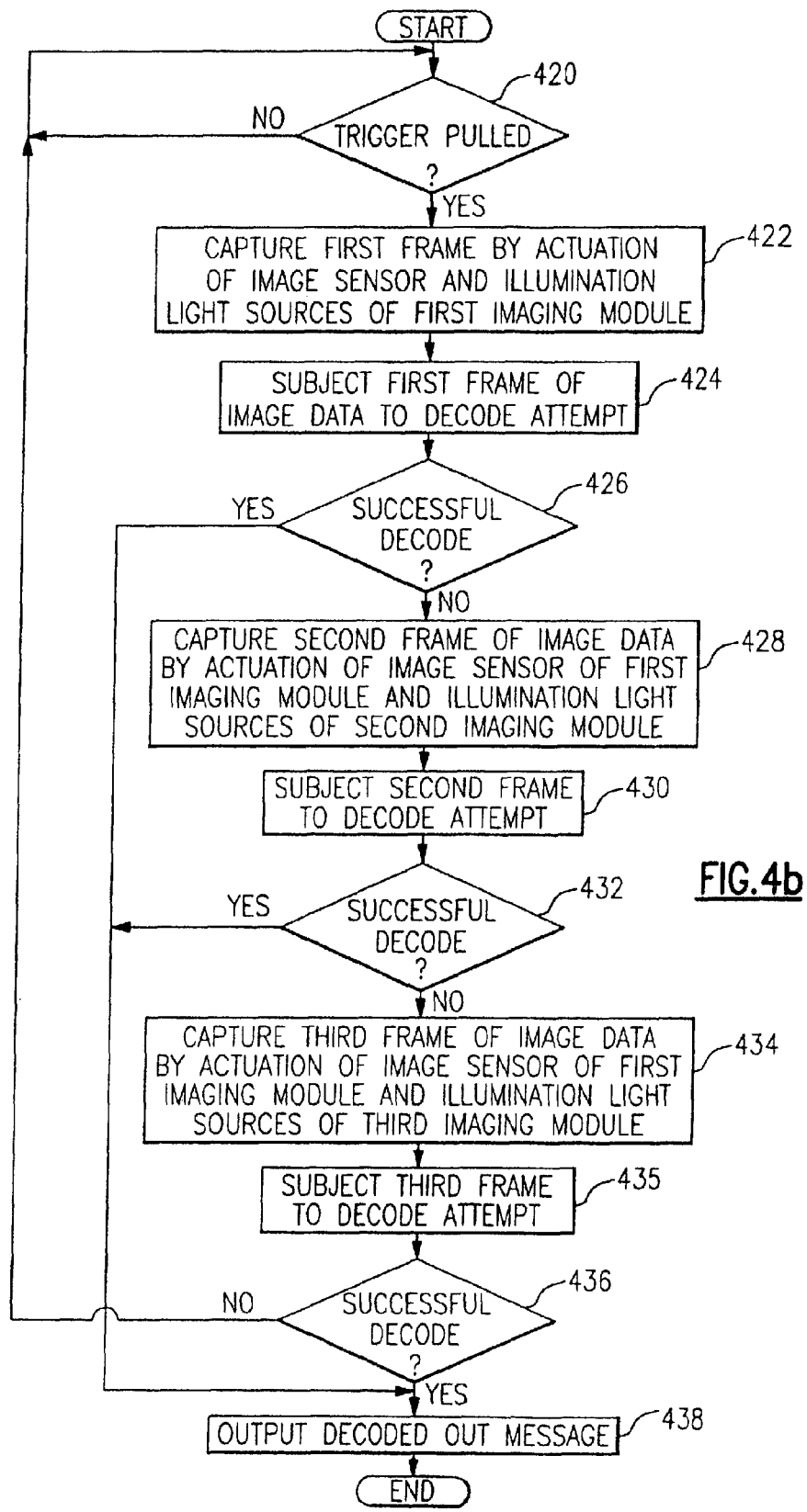

A "wait for trigger pull" control loop, as described in connection with block 402, FIG. 4*a*, block 420, FIG. 4*b*, block 444, FIG. 4*c* will now be described in greater detail. When a trigger 13*t* of reader 5 is actuated, control circuit 140 generates a trigger signal to cause branching of program control as described in FIGS. 4*a*, 4*b*, and 4*c*. According to the invention, a trigger signal can also be generated automatically in response to a decodable indicia being presented in a field of view of a module of reader 5. A method of automatically generating what can be considered a trigger signal based on detected edge transitions without a physical trigger pull is described in copending application Ser. No. 09/432,282 filed Nov. 2, 1999, entitled "Indicia Sensor System for Optical Reader," (now U.S. Pat. No. 6,585,159) which is incorporated herein by reference in its entirety. It will be understood that any of the control loops indicated by blocks 402, 420, and 440 can be substituted for by a control loop wherein control circuit 140 waits for trigger signal automatically generated when a decodable indicia 15 moved into a field of view of a module of reader 5.

In one possible variation of the invention, first and second imaging modules 10*a*, 10*b*, and possibly all N modules of an N imaging module optical reader are configured so that each module has a different best focus distance. For example, module 10*c* of reader 5-2 can be configured to a best focus distance of about 3 inches, module 10*a* can be configured to have a best focus distance of about 6 inches, while module 10*b* can be configured to have a best focus distance of about 9 inches. It will be seen that configuring a reader of the invention so that each of the modules has a different best focus distance increases the overall depth of field of the reader.

A multiple module reader of the invention wherein each module has a different best focus distance can be operated in accordance with the flow diagram of FIG. 4*a* to the end that the reader automatically reads target indicia disposed at a wide range of reader-to-target distance. If an object being read is disposed at a distance closer to the best focus distance of a second module but a substantial distance from a best focus distance of a first module, the reader operating in accordance with the flow diagram of FIG. 4*a* may successfully decode the indicia at block 412 (second frame decode attempt) after failing to decode the indicia at block 406 (first frame decode attempt).

While block 404 of the flow diagram of FIG. 4*a* and other operating blocks herein refers to capturing a "first" frame of image data, it will be understood that a "first" captured frame as referred to herein is not necessarily the initial frame captured by a reader subsequent to actuation of trigger 13*t*. For example, as explained in application Ser. No. 09/766,922, filed Jan. 22, 2001, entitled "Optical Reader Having Reduced Parameter Determination Delay," (now U.S. Patent Publication No. 2002/0125317) which application is incorporated herein by reference in its entirety, optical readers commonly process one or more "test" frames of image data to establish exposure levels and other operating parameters.

Another method for operating a multiple imaging module optical reader is described with reference to the flow diagram of FIG. 4b. After trigger 13t is pulled at block 420 control circuit 140 captures a first frame of image data at block 422. Control circuit 140 captures a first frame image data via actuation of an image sensor 32 of first module 10a and illumination light source 16 of first imaging module 10a. That is, image sensor 32 of first module 10a is actuated to generate image signals while a target is illuminated by illumination light sources 16 of first imaging module 10a. At block 424 control circuit 140 subjects the first frame of capture image data to a decoding attempt. If decoding is not successful (block 426), then control circuit 140 automatically proceeds to block 428 to capture a second frame of image data. Control circuit 140 can also capture a second frame of image data as described in connection with block 428 prior to subjecting a first frame of image data to a decode attempt (block 424). Control circuit 140 can capture a first frame as described in connection with block 422, a second frame as described in block 428, and a third frame (block 434) in any order. Control circuit 140 can capture first, second, and third frames of image data (blocks 422, 428 and 434) contemporaneously. When control circuit 140 captures a second frame of image data at block 428 control circuit 140 once again actuates image sensor 32 of first imaging module 10a as in the step of block 422. However, when capturing a second frame of image data via actuation of first image sensor, control circuit 140 actuates illumination light sources 16 of second imaging module 10b without actuating illumination sources 16 of first imaging module 10a. Because image sensor 32 of first module 10a and illumination sources 16 of second module 10b are substantially spaced apart, the frame of image data captured at block 428 is substantially impervious to specular reflection read failures. The operating method described with reference to FIG. 4b can be utilized with any use of readers 5-1, 5-2, 5-3, 5-4, 5-5, 5-6, 5-7, 5-8, and 5-9. As indicated by block 434 a reader having three imaging modules 10a, 10b, and 10c e.g. of reader 5-2 can be further configured so that the control circuit 140 captures a third frame of image by actuation of image sensor 32 of first module e.g., 10a together with actuation of illumination light sources of third module 10c.

A still further method for operating an optical reader having a plurality of imaging modules is described with reference to the flow diagram of FIG. 4c. Referring to the flow diagram of FIG. 4c control circuit 140 at block 446 captures first and second frames of image data. The first frame of image data captured at block 446 may be captured via actuation of image sensor and illumination light sources of first imaging module e.g., module 10a of reader 5, FIG. 1a. The second frame of image data captured at block 446 may be captured via actuation of image sensor 32 and illumination light sources 16 of second imaging module 10c. Referring to further aspects of image capture block 446, control circuit 140 may capture first and second frames at block 446 sequentially (the first frame is captured in its entirety and then the second frame is captured) or contemporaneously (the capture of the second frame begins before capture of the first frame is complete). At block 448 control circuit 140 subjects the first captured frame to a decode attempt. If decoding fails, control circuit 140 proceeds to block 456 to combine the first captured frame captured by actuation of an image sensor of a first module 10a with a second captured frame of image data captured via actuation of a second imaging module 10c to generate a third image representation. At block 458 control circuit 140 subjects the third image representation derived from the first and second frames to a decoding attempt. If decoding is successful, control circuit 140 outputs the decoded out message at block 462.

At several stages of the operating methods described herein, multiple imaging module reader 5 executes the steps of attempting to decode decodable indicia and branching control of an operating program if the decoding attempt is not successful. In a further aspect of the invention, the step of attempting to decode in any one of the operating programs described with reference to FIGS. 4a, 4b, and 4c can be substituted for or supplemented with the step of preliminarily evaluating image data to determine whether decoding will likely be successful. A step of preliminarily evaluating image data can eliminate the need to actually launch decoding processing to determine whether indicia representation(s) within a frame of image data can be decoded.

The step of preliminarily evaluating image data to determine whether decoding will be successful can take on a variety of forms. In one example of the preliminary image data evaluating step, a preliminary image data evaluating step can include the step of examining gray scale values of a frame of image data to determine if the image data has become saturated. If a saturation condition (sometimes referred to as a "white out" condition) is present there is a substantial likelihood of specular reflection misread or other type of misread attributable to excessive illumination. A saturated condition can be considered to be present for example if a sum total of all gray scale values exceeds a predetermined value, or if an average gray scale value exceeds a predetermined threshold white level. All pixel values may be evaluated during the preliminary evaluation step. More typically, however, a sample of pixel values comprising less than all pixel values of a frame are evaluated to speed processing. The sampling of pixels may be predetermined and/or adaptive.

The step of preliminarily evaluating image data to determine whether decoding will be successful can also include the step of estimating a module-to-target distance. If an estimated module-to-target distance exceeds a best focus distance by a threshold amount (which may be a predetermined threshold), control circuit 140 may preliminarily determine that decoding will likely not be successful without actually subjecting image data of a frame to a decode attempt. A method for generating a signal that varies with module to target distance is described in commonly assigned U.S. Pat. No. 5,773,810, entitled "Method of Generating Real Time Degree of Focus Signal For Hand Held Imaging Device," which is hereby incorporated herein by reference in its entirety.

The preliminary evaluation of a frame of image data to determine the format of the data, or to determine which imaging module acquired the frame of image data takes place as described above with regard to FIGS. 4f-4g.

Referring to the operating method described with reference to FIG. 4c in further detail, a number of different methods may be utilized to execute block 456 (combining the first and second frame of image data).

In one method for combining a first frame and a second frame of image data, cross correlation image combination methods can be utilized. In a cross correlation image combination method statistical analyses are executed to compare two or more frames of image data and frames of image data are shifted relative to one another until correlation is optimized.

Figure 4D:
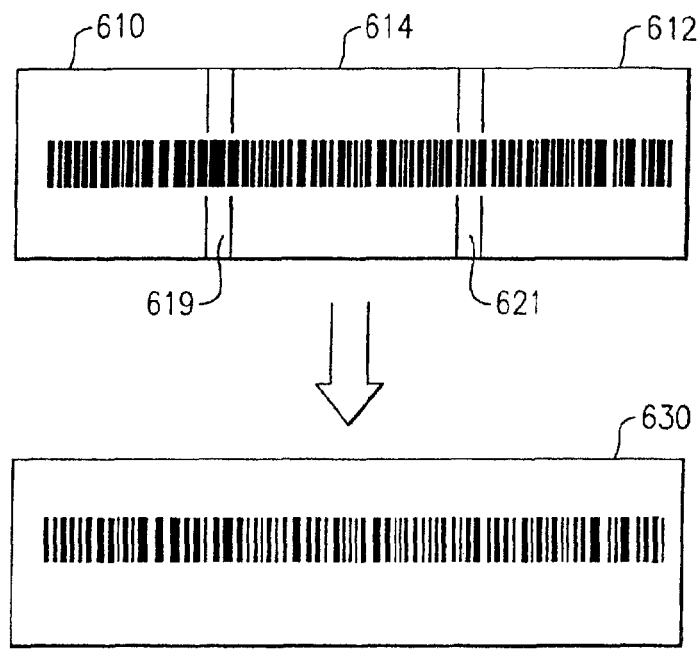
FIGS. 4d-4e illustrate examples of images captured using a plurality of imaging sensors.

In another method for combining first and second frames of image data, areas of overlap between two frames of image data e.g. 610, 614 are determined and then the image data contribution from one of the frames corresponding to the overlapping area is deleted or modified in a manner depending on the overlapping region image data of the other frame to generate a third image representation 630. In the example of FIG. 4*d*, showing first, second, and third frames of image data 610, 612, and 614, overlapping regions 619 and 621 are defined between the first and third frames 610 and 614 and between the third and second frames 614 and 612. Overlapping regions of image data 619, 621 are regions e.g. of image data from two separate frames of image data that correspond to a common region of a target substrate.

The area of overlap between frames of image data captured via actuation of the image sensors of neighboring imaging modules can be determined based on known characteristics of the neighboring imaging modules 10 of reader 5, such as the spacing between imaging modules of reader 5 (e.g. modules 10*a* and 10*c* of reader 5-3), power of imaging optics 40 of the particular imaging module 10, and the respective module-to-target distances of the neighboring modules. A distance of a module to a target can be estimated via analysis of captured image data, for example by a method for developing a degree of focus signal as is described in commonly assigned U.S. Pat. No. 5,773,810, entitled "Method For Generating Real Time Degree of Focus Signal For Hand Held Imaging Device," which is hereby incorporated herein by reference in its entirety. It can be seen that the image frame diagram of FIG. 4*d* may correspond to a parallel-axis reader 5 having a plurality of imaging modules comprising parallel imaging axes while the image frame diagram of FIG. 4*e* (wherein frames 652 and 654 are distorted) may correspond to a diverging axis three module reader 5.

Figure 4E:
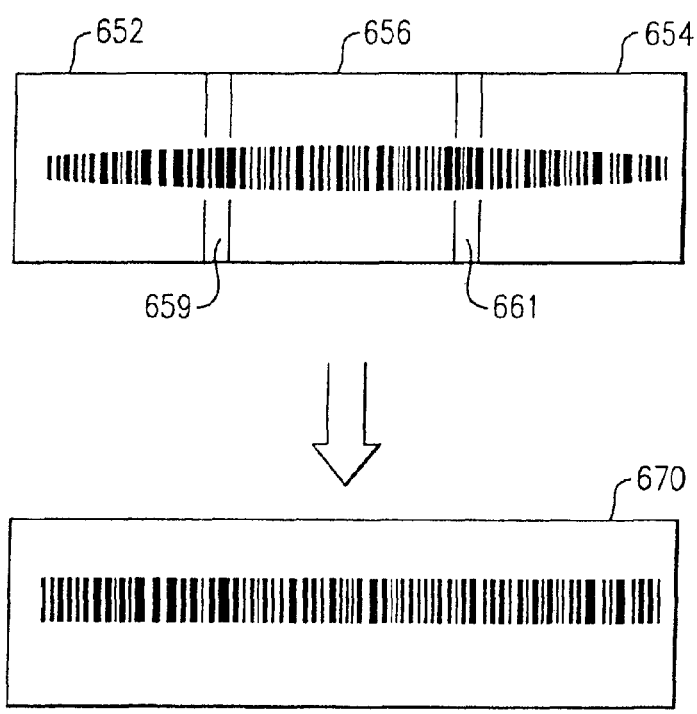

Referring to the frame diagram of FIG. 4*e* in further detail, overlapping regions 659 and 661 are defined between first frame 652 and third frame 656 and between third frame 656 and second frame 654. When combining two frames of image data in the example of FIG. 4*e*, it is particularly important to correct for skew errors (sometimes referred to as distortion errors) when combining frames of image data and when calculating regions of overlap between two frames of image data. In the example of FIG. 4*e*, skew errors can readily be corrected for by, in part, utilizing a skew correction factor determined from the known relative angles between two imaging axes of a multiple module reader such axes 11*a* and 11*b* of reader 5-1, and the spacing between modules of a multiple module reader such as reader 5-1. Further skew correction of a frame of image data can be carried out in a manner described in copending application Ser. No. 09/954,081, filed Sep. 17, 2001, entitled "Imaging Device Having Indicia-Controlled Image Parsing Mode," (now U.S. Pat. No. 6,561,428) which is hereby incorporated herein by reference in its entirety. In that application, a method is described wherein graphical analysis and interpolation processing are employed to determine a distortion factor affecting a frame of image data, and further wherein the determined distortion factor is utilized to back out distortion from an image.

Still further, graphical feature analysis can be utilized in combining frames of image data. If a common graphical feature (e.g. a straight line, a bullseye, a circle, a character) is found in two frames of image data, the common graphical feature can be utilized to establish a common orientation, spacing, and skew basis between the frames of image data to be combined.

Figure 4F:
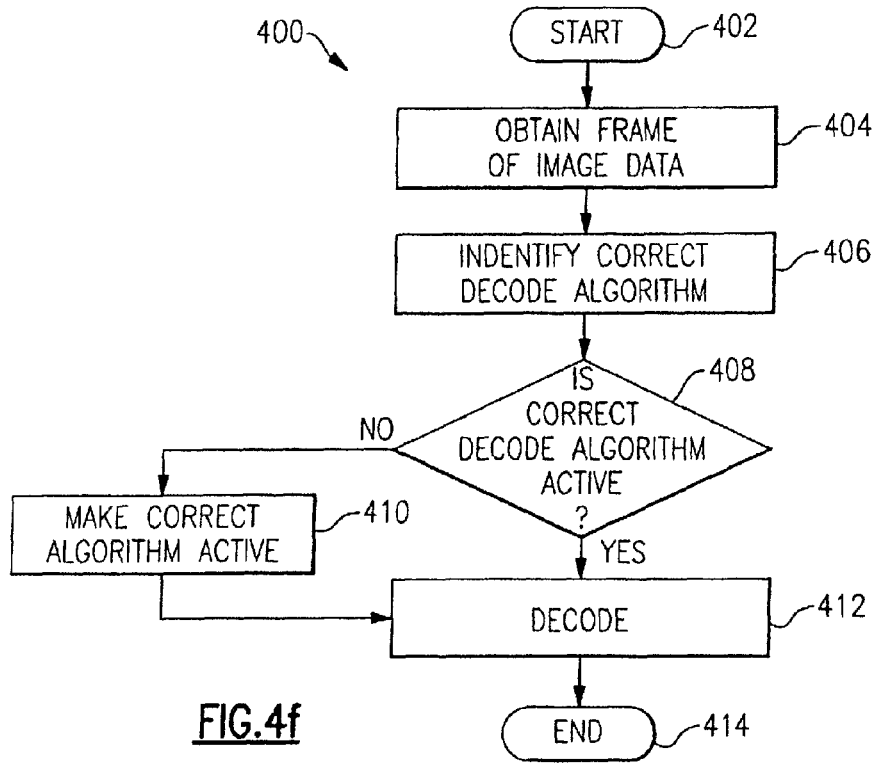
FIGS. 4f-4g are flow diagrams illustrating examples of the image data acquisition and decoding process according to the invention.

FIG. 4*f* is a flow diagram 400 that illustrates one embodiment of a data acquisition and decoding process of the invention. The process begins at the "start" oval 402. The process involves obtaining a frame of image data, as indicated by box 404. The correct decode algorithm for decoding the frame of image data is identified in response to the format of the frame of image data, as indicated at box 406. The format information used to determine the correct decode algorithm can be any information representing a frame size, information identifying a frame format, information identifying a word size, and information identifying a source of said frame. The process, which in one embodiment comprises computer instructions operating on the microprocessor-based decoder module, determines whether the correct decode algorithm is active, as indicated by decision diamond 408. If the correct decode algorithm is active, decoding proceeds as indicated at box 412. However, if the correct decode algorithm is not active, the process follows the "no" arrow from decision diamond 408 to box 410, which represents making the correct decode algorithm active. In one embodiment, the decode algorithm is embodied in a module (e.g., a dynamically linked library module, or .dll module). If the necessary .dll module is not loaded into memory, the .dll can be invoked, loaded, and linked thereby providing the necessary decoding module. Once the correct decode module is operational, the decoding step of box 412 is performed. The process ends at oval 414, labeled "end."

Figure 4G:
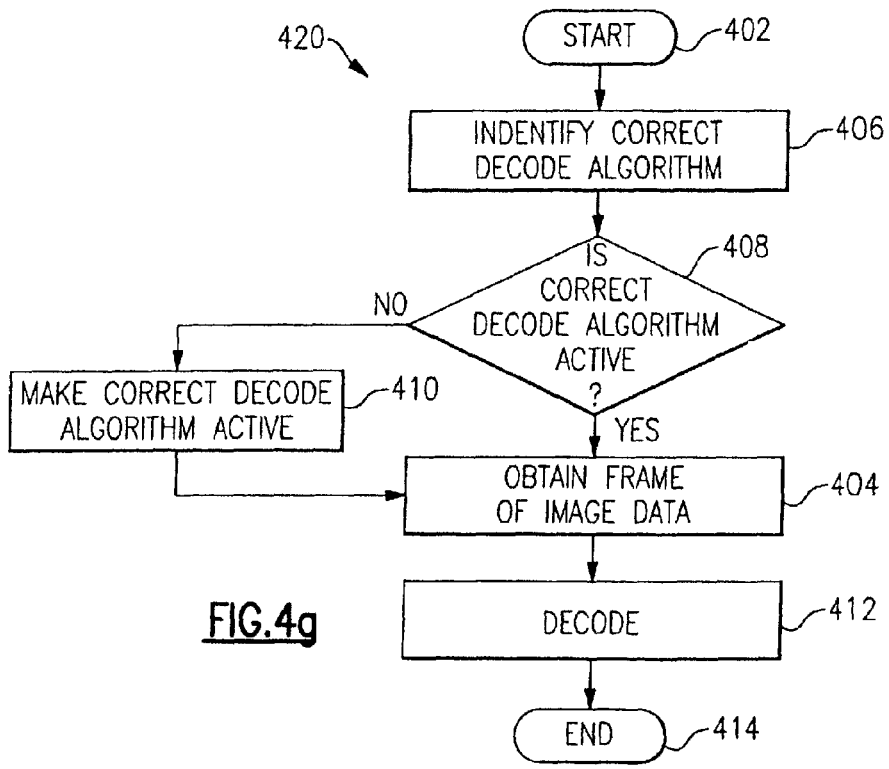

In an alternative decoding process, depicted in FIG. 4*g*, the same process steps are performed in an alternative sequence. As indicated in the flow diagram 420 of FIG. 4*g*, the process starts at the oval 402 labeled "start." The correct decode algorithm for decoding the frame of image data is identified in response to the format of the frame of image data, as indicated at box 406. The format information used to determine the correct decode algorithm can be any information representing a frame size, information identifying a frame format, information identifying a word size, and information identifying a source of said frame. The process, which in the alternative embodiment comprises computer instructions operating on the microprocessor-based decoder module, determines whether the correct decode algorithm is active, as indicated by decision diamond 408. If the correct decode algorithm is not active, the process follows the "no" arrow from decision diamond 408 to box 410, which represents making the correct decode algorithm active. In one embodiment, the decode algorithm is embodied in a module (e.g., a .dll module). If the necessary .dll module is not loaded into memory, the .dll can be invoked, loaded, and linked, thereby providing the necessary decoding module. Once the correct decode algorithm is active, the frame of image data to be decoded is obtained as indicated at box 404, and the decoding process is performed as indicated by box 412. The process is completed as indicated at the oval 414 labeled "end."

Figure 4H:
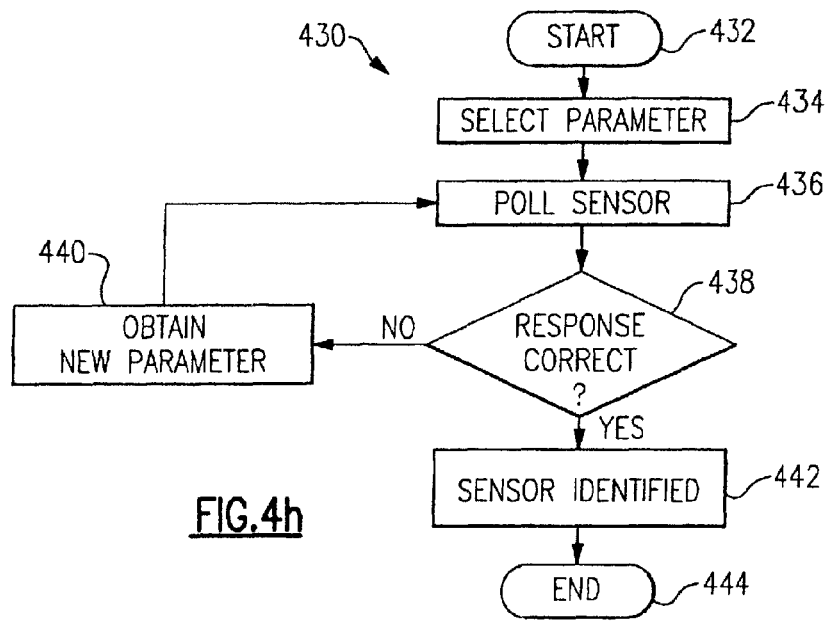
FIG. 4h is an exemplary flow diagram illustrating an example of identification of an imaging module according to the invention.

FIG. 4*h* is an exemplary flow diagram 430 illustrating an example of identification of an imaging module according to the invention. The identification process starts at the oval 432 labeled "start." A parameter is selected for use in identification of an imaging module, as indicated at box 434. The parameter is information that comprises at least one of a bus address of the module, an ID code of the module, a model identifier of the module, and an electrical characteristic of the module, such as a characteristic resistance. The process of identifying the imaging module, or sensor, involves polling the sensor to recover a responsive signal, as indicated at box

436. As indicated at decision diamond 438, the response is compared with the selected parameter, to determine if the correct parameter has been received. If the correct response is observed, as indicated by the arrow marked "yes," the sensor is identified as indicated at box 442. However, if an incorrect response is observed, as indicated by the arrow labeled "no," the process continues with the selection of a new parameter, as indicated at box 440. The sensor polled again, at box 436, and the response is tested at diamond 438. The steps of selecting a parameter, polling the sensor, and checking whether the correct response is obtained can be iterated until the sensor is identified.

Figure 4I:
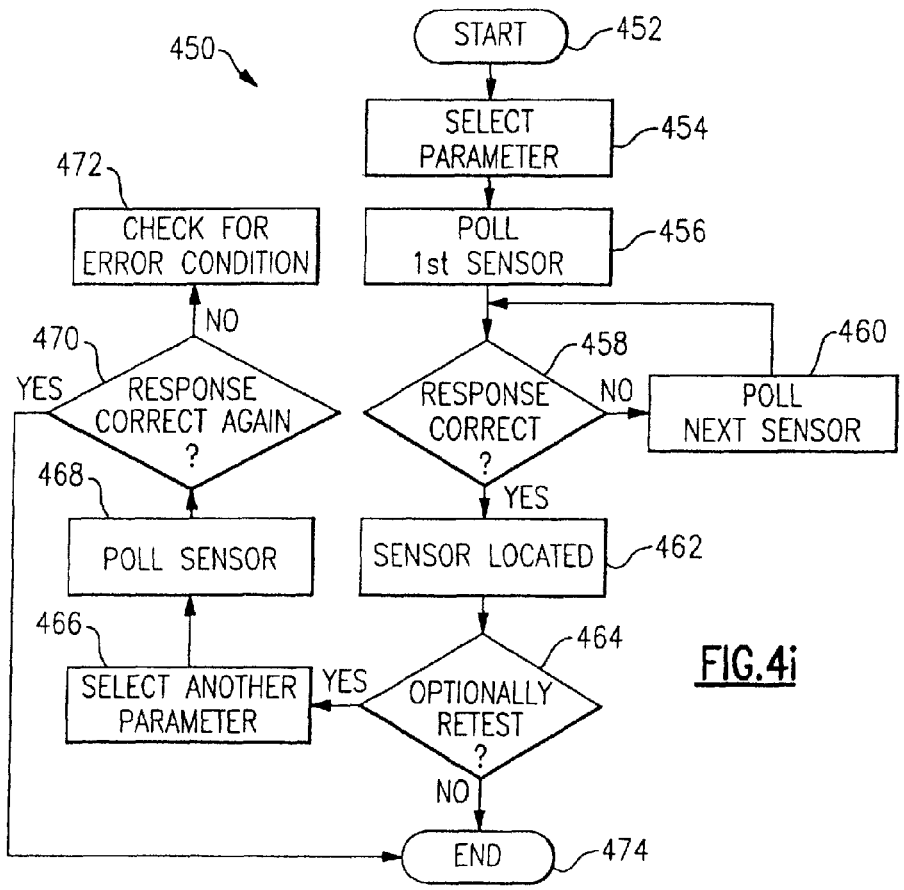
FIG. 4i is an exemplary flow diagram illustrating an example of locating a selected imaging module according to the invention.

FIG. 4i is an exemplary flow diagram 450 illustrating an example of locating a selected imaging module according to the invention. The imaging module location process is designed to identify a particular imaging module out of a plurality of imaging modules. The process starts at oval 452 labeled "start." A parameter is selected for use in identification of an imaging module, as indicated at box 454. The parameter is information that comprises at least one of a bus address of the module, an ID code of the module, a model identifier of the module, and an electrical characteristic of the module, such as a characteristic resistance. A first sensor or imaging module is polled, as indicated at box 456. The response from the sensor is evaluated at decision diamond 458. If the response indicates that the sensor that was polled is not the desired sensor, as indicated by the "no" arrow exiting the diamond 458, another sensor is polled with the same parameter, as indicated by box 460. A negative response to the polling can be a response that is not the desired or expected response, or the absence of a response after a suitable time period has elapsed.

In the circumstance where a negative response is observed, the cycle of polling another sensor and evaluating the response can be repeated, or iterated, as many times as desired, and in any event as many times as there are sensors to be polled. If the response from some sensor is the expected, or appropriate, response, the sensor is deemed to have been located, as indicated at box 462. The identification system can optionally retest the presumed known sensor, if high assurance of the correct identification is desired, as indicated at diamond 464. If the identification is deemed acceptable, the process proceeds to oval 474, marked "end."

If a higher level of confidence is desired, the process can select another parameter that is expected to be valid for the identified sensor, as indicated at box 466. The presumed known sensor is polled, as indicated at box 468. The response is tested, as indicated at diamond 470. If the response is appropriate, as indicated by the arrow marked "yes," the identity of the sensor is confirmed (e.g., the desired sensor is found with high confidence), and the process ends at the oval 474. However, if the second polling response is not correct, the system halts and indicates an error condition, as indicated at box 472.

Figure 6A:
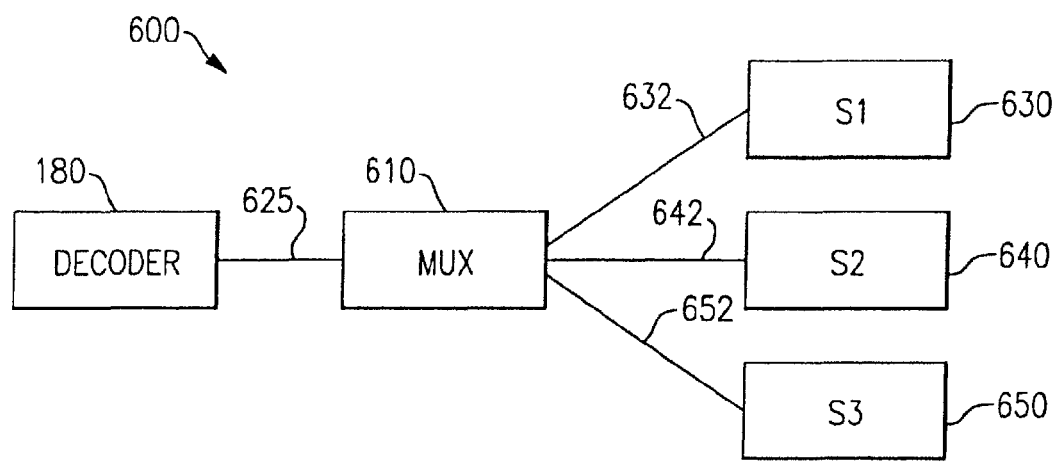
FIGS. 6a-6b are schematic diagrams illustrating exemplary means and methods of connecting a plurality of imaging modules to a microprocessor-based decoder module of the invention.

FIG. 6a is a schematic diagram 600 illustrating an exemplary means and method of connecting a plurality of imaging modules to a microprocessor-based decoder module of the invention using a multiplexer ("mux") 610. In some embodiments, the mux 610 can be operated under the control of a programmed microprocessor, such as the microprocessor 180 present on the microprocessor-based decoder module of the invention. In FIG. 6a the decoder 180 has a single data line 625 connected to the mux 610. The data line 625 can include as many bit lines as are needed for serial or parallel transmission of data from the mux 610 to the decoder 180, and can further include as many signal lines as are required for communication of control signals between the decoder 180 and the mux 610. In the illustrative embodiment, three sensors or imaging modules 630, 640, 650 are depicted. Each imaging module 630, 640, 650 has a respective connection line 632, 642, 652 connected to a respective input port of the mux 610. Each connection line 632, 642, 652 includes all the data and control lines necessary to operate a sensor and to obtain a frame of image data therefrom. The decoder 180 can command the mux 610 via the connection 625 as to which of the sensors is to be selected, for example by reducing a resistance of a switch connecting the mux 610 to each line of the data and control lines connecting the mux 610 with the selected sensor. In this manner, the decoder 180 can select any imaging module of the available imaging modules 630, 640, 650 by issuing a suitable command to the mux 610, which command may include instructions that are communicated to the selected sensor. Sensors 630, 640 and 650 can include at least two types of imaging modules that provide image data having formats that are different from one another.

Figure 6B:
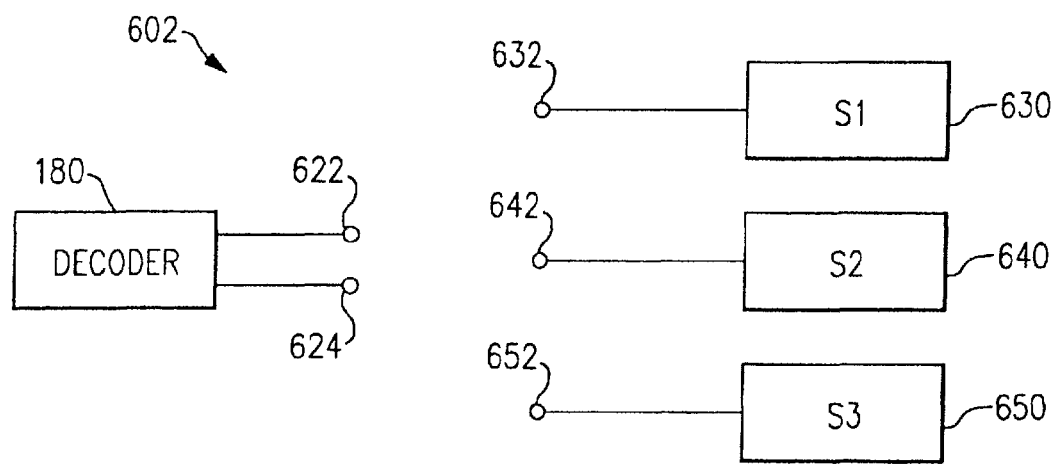

FIG. 6b is a schematic diagram 602 illustrating an exemplary means and methods of connecting a plurality of imaging modules to a microprocessor-based decoder module of the invention using manual connection by a user. Again, a decoder 180 is provided. The decoder 180 has at least two connection lines 622, 624. Each connection line 622, 624 includes all the data and control lines necessary to operate a sensor and to obtain a frame of image data therefrom. As in FIG. 6a, there are shown three sensors 630, 640, 650, having respective connection lines 632, 642, 652, which are initially unconnected to the decoder 180. Each connection line 632, 642, 652 includes all the data and control lines necessary to operate a sensor and to obtain a frame of image data therefrom. The user can connect a selected sensor of sensors 630, 640, 650 to a first connection line of the decoder 180, and can connect additional sensors selected from sensors 630, 640 and 650 to the remaining connection line of decoder 180. As those of ordinary skill will recognize, the decoder 180 can be provided with more than two connection lines, and there can be more than three sensors 630, 640, and 650. Sensors 630, 640 and 650 can include at least two types of imaging modules that provide image data having formats that are different from one another.

Figure 6C:
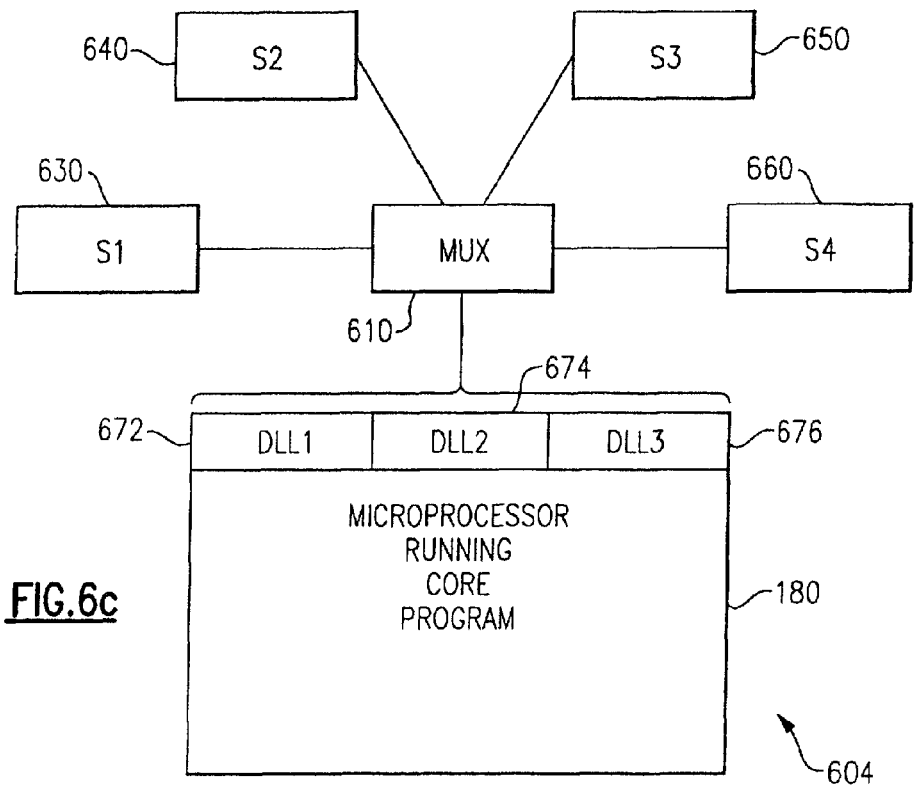
FIG. 6c is a schematic diagram of an illustrative hardware connection of a microprocessor-based decoder module of the invention with a plurality of imaging modules, and the relations of code modules present when the microprocessor is operating, according to principles of the invention.

FIG. 6c is a schematic diagram 604 of an illustrative hardware connection of a microprocessor-based decoder module 180 of the invention with a plurality of imaging modules 630, 640, 650, 660, and the relations of code modules 672, 674, 676 operating on the microprocessor 180, according to principles of the invention. In FIG. 6c there are four sensors, including sensors 630, 640, 650 and 660. The sensors are connected to the microprocessor-based decoder module via the mux 610 as described above. In an illustrative example of operation of the decoder 180, sensors 630, 640, 650 and 660 are all designed to provide frames of image data in formats that are mutually incompatible. The microprocessor-based decoder module 180 has resident in a memory thereof three dynamically linked library files (as .dll, .ocx or equivalent kinds of files), namely DLL1 672, DLL2 674 and DLL3 676. By way of illustration, DLL1 672 is a file that converts the input format of a frame of image data from one of the image modules, for example image module S2 640, into a format that microprocessor-based decoder module 180 can decode. Similarly, DLL2 674 is available to convert the input format of a frame of image data from one of the image modules, for example image module S3 650, into a format that microprocessor-based decoder module 180 can decode. Similarly as well, DLL3 676 coverts the input format of a frame of image data from a third module, for example S1 630, into a format that microprocessor-based decoder module 180 can decode.

In addition, in some embodiments, any of DLL1 672, DLL2 674 and DLL3 676 can communicate with the corresponding sensor to transmit instructions thereto. In yet another embodiment, other .dlls are provided for communication of instructions from the microprocessor-based decoder module to selected sensors, and DLL1 672, DLL2 674 and DLL3 676 are configured only to receive and convert information representing a frame of image data in a particular format or formats from a respective sensor, but not to communicate instructions to the sensor. In operation, if any of imaging modules 630, 640 or 650 are used to obtain image data, there is no problem to manipulate that data into a suitable format for decoding by activating the appropriate one of DLL3 676, DLL1 672 and DLL2 674, respectively when the corresponding imaging module is operational. The DLL that is required can be activated by setting a pointer in memory, by setting up the appropriate call, or by the use of an equivalent redirectable software command that can direct program flow to the necessary software module as needed. In the circumstance where imaging module S4 660 is activated, an additional DLL file, which has been prepared to convert frames of image data from the format provided by imaging module S4 660 to a format that microprocessor-based decoder module 180 can decode, is read into an available section of memory, and the core program running on the microprocessor is redirected to use the newly installed DLL. More information on the installation of DLLs (e.g., .dll or .ocx files) and redirection of program flow is discussed in conjunction with FIG. 6d.

Figure 6D:
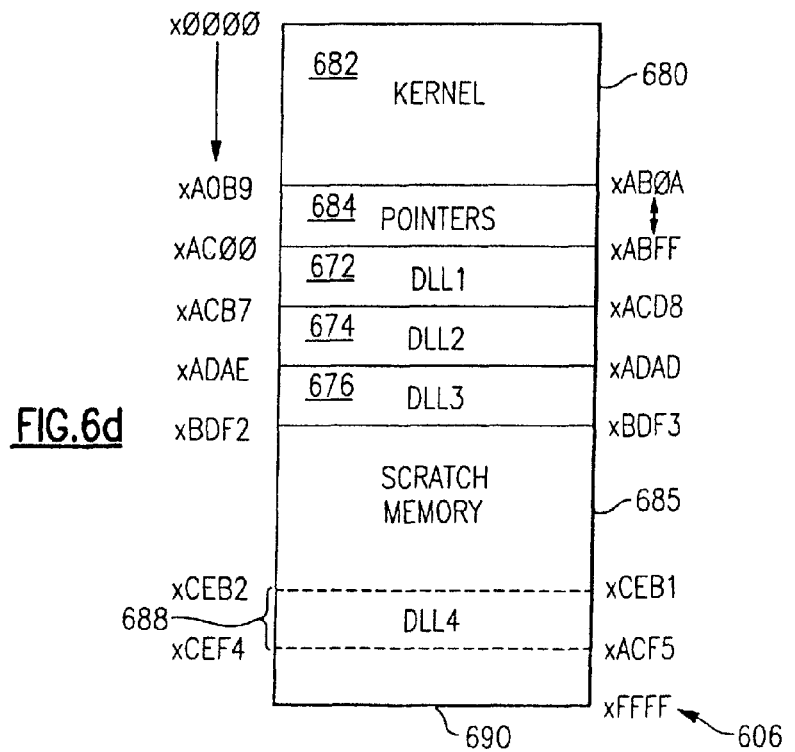
FIG. 6d is a schematic diagram of an illustrative memory map showing the relationships between and among computer code modules present in a microprocessor-based decoder module during operation, according to principles of the invention.

FIG. 6d is a schematic diagram 606 of an illustrative memory map 680 showing the relationships between and among computer code modules present and operating in a microprocessor-based decoder module according to principles of the invention. In FIG. 6d, all memory locations are expressed in hexadecimal notation, as is common in the programming arts; however, as is well known, other representations of memory location can be used. In FIG. 6d, the core program or "kernel" 682 is depicted as being present from memory location X0000 to memory location xA0B9. Pointers 684 are located from the memory location immediately following the kernel 682, e.g., xA0BA, to memory location xABFF. DLL1 672 resides in memory locations xAC00-xACD7. DLL2 674 resides in memory locations xACD8-xADAD. DLL3 676 resides in memory locations xADAE-xBDF2. Memory from xBDF3 and higher is available for computation memory (e.g., scratch memory 685) and other uses. By way of illustration, when a frame of image data from sensor 660 is to be manipulated, a new DLL, e.g., DLL4 686, needs to be made available. In this exemplary description, if the memory region from xBDF3 to xCEB1 is used for holding data or computational results, DLL4 686 can be loaded into memory in the memory area extending from xCEB2 to xCEF4 688 that is large enough to accommodate DLL4 686. A pointer in the pointer section 684 of memory 680 can be loaded with the location xCEB2 as the entry location for DLL4 686 when the core program needs to invoke DLL4. The remaining section 690 of memory 680, from xCEF5 to xFFFF, is available as for the use of the core program as needed. While the example described herein has been described for simplicity of exposition as an example for a memory of only $2^{16}$ bits, or 64K, those of ordinary skill will recognize that the use of memory of any convenient size is contemplated. Furthermore, while the present example describes the loading of a DLL into memory, those of ordinary skill will recognize that any convenient means of invoking the DLL, including the use of media such as non-volatile memory (e.g., hard or floppy disks, CR-ROM, ROMs, PROMs, EPROMs, EEPROMs, or other storage media) and even connections over networks such as LANs, WANs, and the Internet to allow the use of remotely stored DLL files, are all contemplated herein.

Figure 7A:
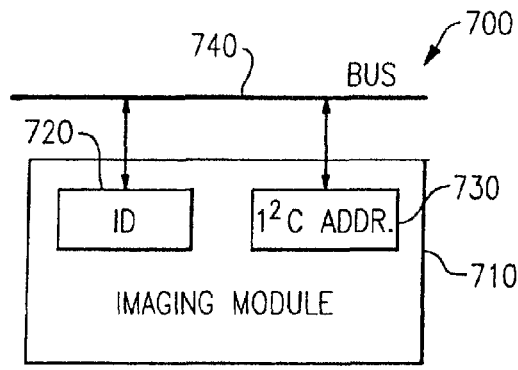
FIGS. 7a-7b schematically illustrate features of exemplary imaging modules useful for practicing the invention.

FIG. 7a is a drawing 700 that schematically illustrates some of the features of an exemplary imaging module 710 useful for practicing the invention. In the illustrative example, imaging module 710 include two memory locations ID 720 and I$^2$C Address 730. In the example shown, the memory location ID 720 is a nonvolatile memory that can be programmed to contain a unique identification symbol, such as a number or an alphanumeric string. The ID 720 location of imaging module 710 is connected to a bus 740. The microprocessor-based decoder module 180 of the invention can interrogate ID 720 by way of the bus 740. An exemplary command that can be issued includes a request to transmit the contents of the ID 720 memory location over the bus for the use of the microprocessor-based decoder module 180. I$^2$C Address 730 is a memory location that contains an address for the imaging module 710 on the bus 740. Imaging module 710 responds when the address corresponding to the contents of I$^2$C Address 730 is applied to the bus 740, and does not respond when a different address is applied to the bus, according to the I$^2$C protocol. The microprocessor-based decoder module 180 can issue any of several commands to obtain information about imaging module 710, including requests to have imaging module 710 perform actions, to have imaging module 710 report the start and/or the completion of the requested action, and reporting the address in I$^2$C Address 730 memory.

Figure 7B:
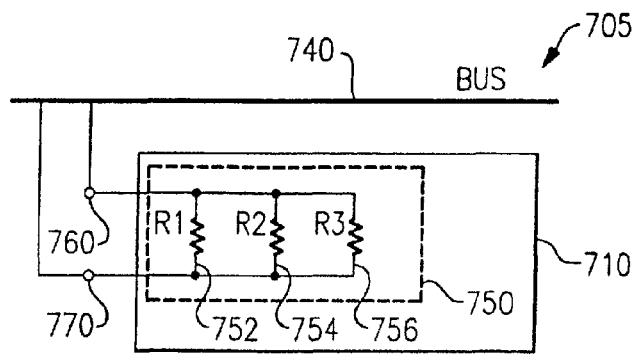

FIG. 7b depicts an alternative embodiment of an imaging sensor 710 that has a resistance 750 present therein. The resistance 750 is in communication with the bus 740 via a switching mechanism (not shown) to avoid having multiple imaging modules applying resistance to the bus. The microprocessor-based decoding module 180 can interrogate the resistance 750 by activating the switching mechanism. Resistance 750 is depicted as a group of resistances R1 752, R2 754, and R3 756 that are connected in parallel. In one embodiment, R1 752, R2 754, and R3 756 are precision resistors having fixed resistance relationships, such as R1 is twice the resistance of R2 and four times the resistance of R3. One can program the resistance seen between terminals 760 and 770 of imaging module 710 by cutting conductors so as to disconnect one or more of R1, R2 and R3. For example, one can obtain values of 1×R3, 2×R3 (by leaving only R2 in the circuit) and 4×R3 (by leaving only R1 in the circuit) as well as 4/3 R3 (R1 and R2 in parallel), 2/3 R3 (R2 and R3 in parallel), 4/5 R3 (R1 and R3 in parallel), and 4/7 R3 (all three resistors in parallel). The value of infinite resistance (all resistors disconnected) can also be used, but leaves as a possibility that no module 710 is connected at all. One can measure the resistance and determine which resistors were left in the circuit, thereby identifying a particular imaging module 710.

Figure 8A:
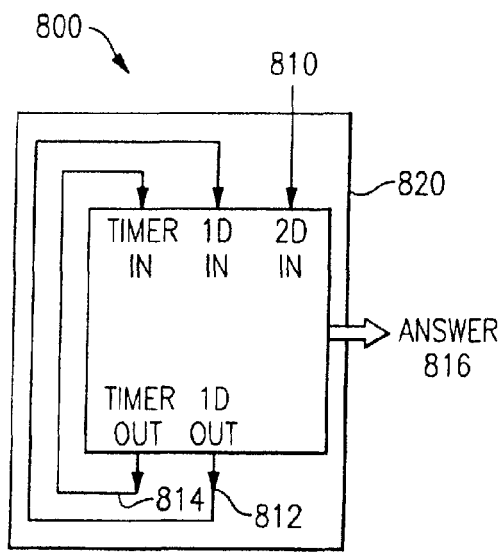
FIGS. 8a-8b schematically illustrate features of an illustrative decoding algorithm and an equivalent decoder circuit embodiment that operate according to principles of the invention.

Referring to FIG. 8a, which shows an illustrative flow diagram of an embodiment of an iterative decoding process 800, a frame of image data 810 is provided to the microprocessor-based decoding module 820 upon which a suitable computer program 830 is running. The microprocessor-based decoding module 820 is programmed to handle the data of the format provided, as explained above. In the illustrative flow diagram 800, the frame of image data is a frame of image data from a 2D imaging module 10, such as those of FIGS. 1a-1i. The microprocessor-based decoding module 820 converts the 2D data 810 into a series of P 1D data segments 812, where P is an integer greater than 1. Each of the P 1D data segments 812 is further converted into a transition location information sequence 814. In an illustrative embodiment, the conversion of data from an N-bit format (for example, N=8) to a 1-bit format occurs according to a prescriptive rule, or algorithm. For example, one rule could be that data greater than 50% of full scale (e.g., greater than or equal to 128) is by definition translated to a "1" or "on," and data less than 50% of full scale (e.g., less than or equal to 127) is by definition translated to "0" or "off." Other rules can equally well be implemented. The decoding is iterative in that at least the decoding at the lowest level (N-bit to 1-bit) is performed repeatedly for each segment of 1D data 812. The decoding is recursive in that data of higher than 1D format requires a plurality of passes through the decoding algorithm, wherein at each pass each decoding level above the N-bit to 1-bit level invokes a decoding step one level below itself, which ultimately ends at the lowest N-bit to 1-bit decoding. Finally, decoded information 816 is provided as output by the decoding module 830.

Figure 8B:
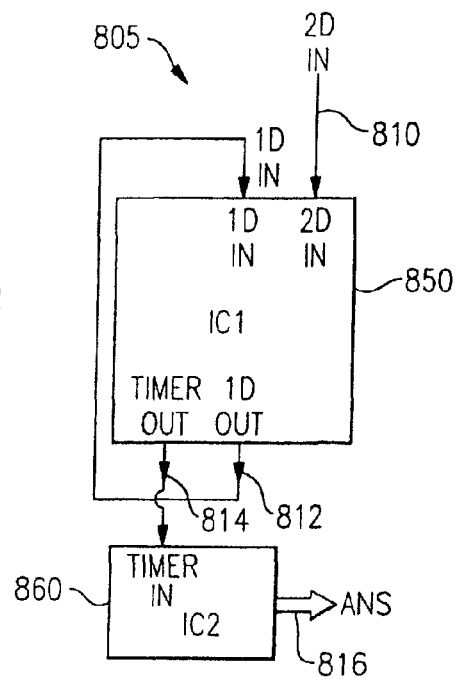

In an alternative embodiment shown in schematic diagram 805 of FIG. 8b, the same decoding process can be performed using hard wired logic in integrated circuit chips IC1 850 and IC2 860. The integrated circuit chips can be FPGAs programmed to perform the required logic, or the integrated circuit chips can be ASICs. As in the embodiment of FIG. 8a, a frame of image data 810 is provided by a 2D imaging module 10, such as those of FIGS. 1a-1i. IC1 850 performs the same conversion functions that are performed by the microprocessor-based decoding module 820 of FIG. 8a, that is, IC1 850 converts the 2D data 810 into a series of P 1D data segments 812, where P is an integer greater than 1. Each of the P 1D data segments 812 is further converted into a transition location information sequence 814. In an illustrative embodiment, the conversion of data from an N-bit format (for example, N=8) to a 1-bit format occurs according to a prescriptive rule, or algorithm. The rule can be the same rule as given above with regard to the microprocessor-based decoder module. Finally, IC2 860 decodes the converted data 814 to obtain decoded information 816 as output. As will be apparent to those of skill in the programming arts, it is also possible to perform the decoding process using some functions that are described as being provided in a microprocessor-based system in conjunction with other functions provided in hard wired logic to accomplish the necessary end.

As more powerful processors (e.g., faster processors or ones using more bits of data per operation) become available, it is possible that one or more of the decoding steps can be omitted. For example, with sufficient processing power, the necessity to convert 1D data segments having 8-bits of resolution to transition location information having only 1-bit of resolution may cease. The conversion of 8-bit data to one bit data in fact implies the loss of the majority of the information content of the 8-bit data. Therefore, with sufficient processing power (e.g., wider data width and/or shorter cycle time) it is possible, and in fact is advantageous, not to convert the 8-bit data to 1-bit data, but rather to provide improved performance (e.g., higher resolution, better color rendition, and/or higher confidence in a match). As yet more processing power becomes available, the conversion of 2D data to a sequence of 1D data segments may become unnecessary without causing an undue increase in the time to decode information encoded in decodable indicia.

Figure 9A:
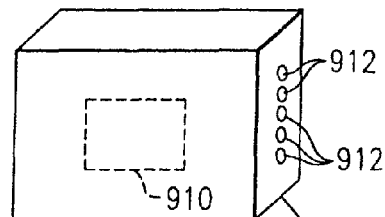
FIGS. 9a-9d illustrate embodiments of microprocessor-based decoder modules and products comprising the same, according to principles of the invention.

FIG. 9a illustrates an embodiment of a microprocessor-based decoder module 920 in the form of a PC card. In another embodiment, the microprocessor-based decoder module 920 is provided in the form of a PCMCIA module. Other specific embodiments will be apparent to those of skill in the circuitry arts. Microprocessor-based decoder module 920 contains therein the microprocessor 910 which is illustrated in phantom as a region in the interior of module 920. Module 920 has a plurality of electrical contacts 912 for demountable connection of the module 920 to a product that employs the module, such as a digital camera 960 as is shown in FIG. 9c and that is described in greater detail below. The module 920 may receive power from the device in which it is demountably mounted, by way of two or more of the contacts 912. Module 920 may be "keyed" or otherwise mechanically indexed to allow insertion into the device in which it is demountably mounted in only the correct orientation. As one form of keying or indexing, the contacts 912 may be disposed in a pattern that permits seating of the module 920 within the device, such as digital camera 960, only in the proper orientation, e.g., the contacts may be asymmetrically disposed with regard to a mirror plane or rotation axis of the module 920.

Figure 9B:
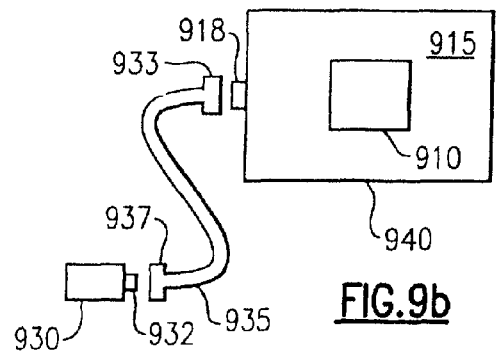
Figure 9C:
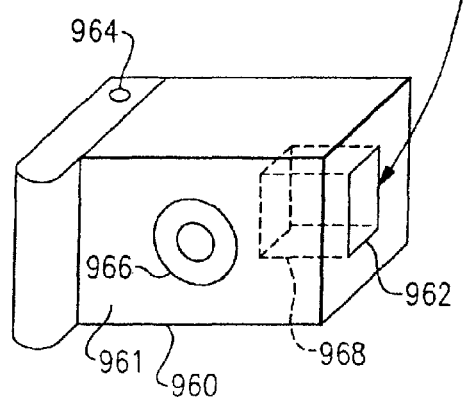

FIG. 9b illustrates an embodiment of a microprocessor-based decoder module 940 in the form of a circuit board. For simplicity of exposition, only the substrate 915 of the circuit board 940 is depicted, with a microprocessor-based decoder 910 mounted to a surface of the substrate. The electrical traces common to printed circuit boards are not depicted. However, as is well known in the circuitry arts, electrical traces on one or more surface are provided to connect the microprocessor-based decoder 910 to a connector 918. The connector 918 is conveniently disposed on a peripheral edge of module 940, for convenient demountable connection of module 940 to an imaging module 930. The connector 918 can take any convenient form, such as a card edge connector comprising a plurality of plated metallic "fingers," a "D" connector having a plurality of metal pins, or a plug connector. In one embodiment, the module 940 is connected to an imaging module 930 by a connector 932 that is the mate for connector 918. In other embodiments, a multiple conductor cable 935 is used to connect module 940 with imaging module 930. The cable 935 has at a first end thereof a first connector 933 that mates to connector 918 and at a second end thereof a connector 937 that is the mate to connector 932 of the imaging module 930. In some embodiments, the connectors 918 and 932 are not mating connectors, and a cable such as cable 935 is required to accomplish the connection, the cable having two dissimilar connectors 933, 937 that respectively mate to connectors 918 and 932. Module 940 may include additional connections (not shown) for provision of power and to provide decoded information for the benefit of a user. Circuit board module 940 is adapted to be housed semi-permanently within a device such as hand held optical reader 980, as shown and described in more detail below with regard to FIG. 9d.

FIG. 9c illustrates an embodiment of a digital camera 960 comprising the microprocessor-based decoder module 920. The camera 960 comprise a body 961 that houses and supports a optical imaging device 966 which can be activated by a user-activated switch, such as button 964. An entryway 962 is defined within the body 961 for insertion of the microprocessor-based decoder module 920 of FIG. 9a into the camera 960, as indicated by the phantom 968. The camera 960 further comprises a power supply, such as a battery (not shown) and mating connectors (not shown) to power and electrically connect to module 920 when it is present within camera 960.

Figure 9D:
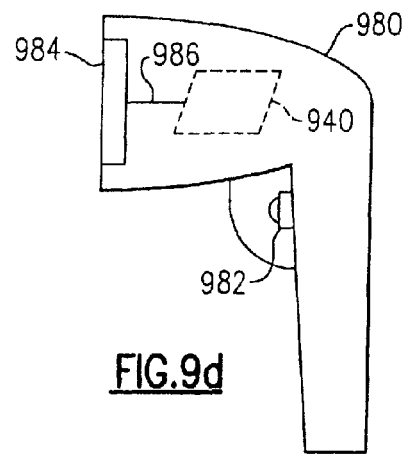

FIG. 9d illustrates an embodiment of a hand-held optical reader 980 comprising the microprocessor-based decoder module 940, which is shown in phantom. The module 940 may be connected to the reader 980, as has been described in conjunction with FIGS. 1a-1g above. The optical reader 960 further comprises an imaging module 984 that is electrically connected to the module 940 by way of cable 986. Cable 986 is similar to cable 935 described above. A switch 982 is provided for use by a user in activating optical reader 980 including its various components. Optical reader 980 may be powered by a battery (not shown) or may be powered by a remote power supply via a power cable (not shown), as may be convenient for the intended method of use of optical reader 980. Optical reader 980 further comprises an output, which may be a display, an enunciator, or a means of recording results for later examination by a user. The output may be local to optical reader 980, or may be remote from optical reader 980. In embodiments where the output is remote, the output data may be transmitted via cable, via wireless or RF connection, via infrared or optical technology, by being recorded on a disk or other medium for later physical transfer, or by any other convenient means.

Another embodiment of the invention involves providing speech capability to the microprocessor-based decoder module. In one embodiment, the module is capable of recognizing commands provided in spoken form, and is capable of providing a response to a user in conventional spoken language. In the examples that are presented herein, the language is English. It will be understood that any language can be implemented that is capable of being spoken by a user or understood by a user.

Technology that can convert material presented in the form of a decodable indicium, such as a bar code, to vocalized information provides many advantageous opportunities, ranging from convenience, to permitting the "hands-free" operation of a process, to providing information to individuals who are poorly literate, illiterate, sight-impaired or otherwise have problems reading. In the case of a decodable indicium, which is expressed in a format that decodes into alphanumeric values, there is the possibility of enunciating the result in whatever language would benefit the user. In principle, the same symbol, such as a barcode, can be vocally expressed in any language of choice. For example, a bar code on a package of food could be read, and the symbol could be used to enunciate the contents, the weight or volume, the price and other relevant information in a language selected by the user. Alternatively, a symbol could be encoded with information such as text, so as to compress the space required to convey a quantity of information compared to the space required to print the information in a format readable directly by the user. In some embodiments, the conversion of the textual content into an encoded symbol also renders the textual information more secure or less readily available to individuals who are not authorized to access the information.

One embodiment involves the decoding of a symbol such as a barcode into text, and the conversion of the text into audible speech. Examples of systems that can perform such data manipulation include a reader/decoder for the bar code, in conjunction with text to speech capability. Examples of applications for such technology include a spoken response to a user of a reader for encoded indicia such as the indication that the symbol was correctly read; vocalization of identification information, such as material read from a document such as a license, a ticket, an identification badge or tag, or other printed material, for such purposes as indicating permission for entry to a theater, sporting event or the like, enunciation of permission to engage in an activity having an age requirement (e.g., drinking alcoholic beverages or buying tobacco), law enforcement purposes, enunciation of a security access authorization, or enunciation of information (e.g., instructions or the like) printed in the form of a decodable indicium. The technology can be applied in various settings, such as in a retail setting, in a warehouse, factory, or assembly and/or repair facility, and in settings involving visually handicapped individuals or individuals with poor literacy skills.

Figure 10A:
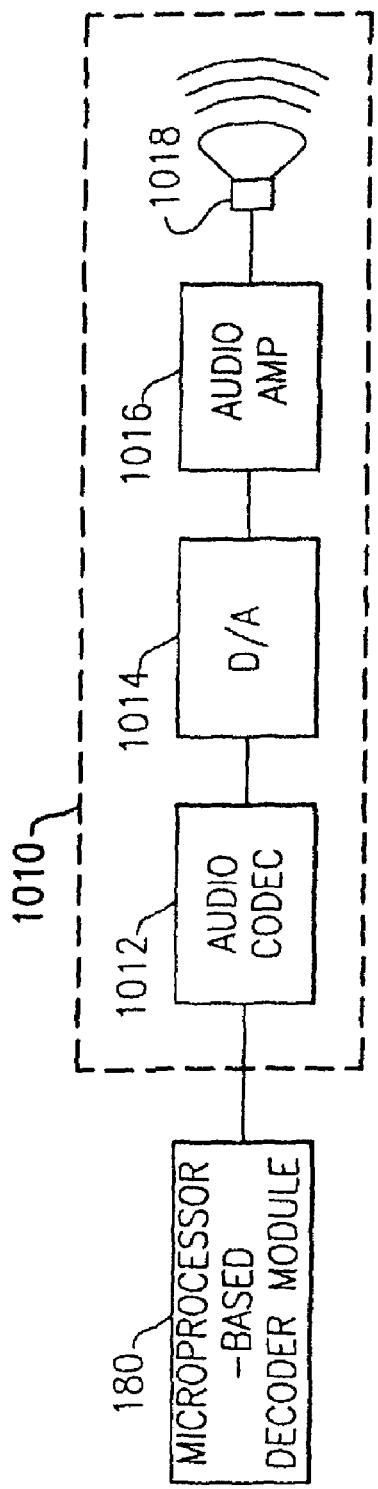
FIG. 10a illustrates an embodiment of a microprocessor-based decoder module that includes an audio output module that allows the microprocessor-based decoder module to communicate with a user in natural language, according to principles of the invention.

Turning to FIG. 10a, in a first embodiment, the microprocessor-based decoder module 180 includes an audio output module 1010. An output terminal or port of the microprocessor-based decoder module 180 is connected to an input terminal or port of the audio output module 1010. The audio output module 1010 can be powered by way of the output terminal of the microprocessor-based decoder module 180, or it can be powered by an auxiliary conventional source of power (not shown) such as a power supply using a battery or a mains-connected power supply. In an exemplary embodiment, the audio output module 1010 comprises an audio codec (e.g., audio coder/decoder) 1012 connected to an output channel of the microprocessor-based decoder module 180, a D/A converter 1014 having an input terminal connected to an output terminal of the audio codec 1012, an audio amplifier 1016 having an input terminal connected to an output terminal of the D/A converter 1014, and a speaker 1018 connected to an output terminal of the audio amplifier 1016. The operation of the audio codec 1012, the D/A converter 1014, the audio amplifier 1016 and the speaker 1018 are all conventional and will not be described herein in detail. The microprocessor-based decoder module 180 can use as input to the audio output module 1010 a message recorded in a memory as digital information, such as a code corresponding to a prerecorded message stored in a memory in the audio output module 1010, or as the digital message that the audio output module 1010 can decode. In other embodiments, the message is recorded as a wav. file, or in another audio file format. The message can be a digitized version of a prerecorded message spoken by a person. The microprocessor-based decoder module 180 provides a signal in response to a condition that it determines. The signal activates the audio output module 1010 to provide an aural response to a user. When the microprocessor-based decoder module 180 is configured to operate with audio output, audible spoken responses can be provided to a user in response to actions or conditions that the microprocessor-based decoder module 180 encounters. As a non-exhaustive set of exemplary audible responses, the microprocessor-based decoder module 180 can cause the audio output module 1010 to enunciate such messages as: "Good read" (or alternatively "Read good") in response to an acceptable reading of a decodable indicium; "No symbol found" in response to the apparent lack of a readable symbol within the region examined by a reader; "Image too dark" or "Image too light" in response to aberrant illumination conditions, faulty symbols or a combination of both; "Symbology is code 3 of 9," "Symbology is Aztec," or any other recognized symbology format in response to a determination of a symbology format; and "Download complete" in response to the completion of a download, as well as other similar audible responses.

Figure 10B:
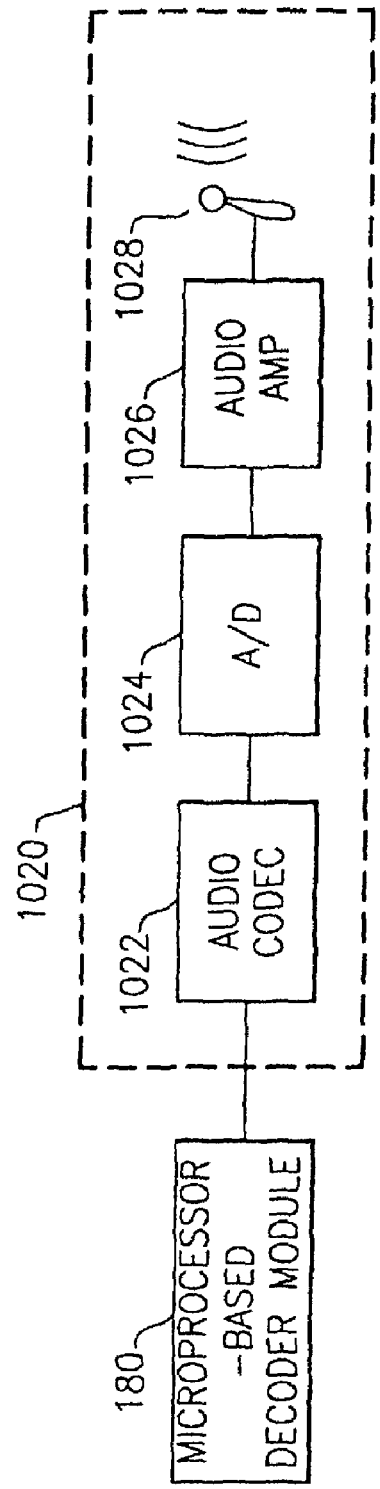
FIG. 10b illustrates an embodiment of a microprocessor-based decoder module that includes an audio input module that permits a user using natural language to communicate commands to the microprocessor-based decoder module, according to principles of the invention.

In a second embodiment, shown in FIG. 10b, the microprocessor-based decoder module 180 includes an audio input module 1020. An input terminal or port of the microprocessor-based decoder module 180 is connected to an output terminal or port of the audio input module 1020. The audio input module 1020 can be powered by way of the input terminal of the microprocessor-based decoder module 180, or it can be powered by an auxiliary conventional source of power (not shown) such as a power supply using a battery or a mains-connected power supply. In an exemplary embodiment, the audio input module 1020 comprises an audio codec (e.g., audio coder/decoder) 1022 having an output terminal connected to an input channel of the microprocessor-based decoder module 180, an A/D converter 1024 having an output terminal connected to an input terminal of the audio codec 1020, an audio amplifier 1026 having an output terminal connected to an input terminal of the A/D converter 1024, and a microphone 1028 having an output terminal connected to an input terminal of the audio amplifier 1026. The operation of the audio codec 1022, the A/D converter 1024, the audio amplifier 1026 and the microphone 1028 are all conventional and will not be described herein in detail. The microprocessor-based decoder module 180 can use input from the audio input module 1020 to recognize a command by comparing the input signal to a message recorded in a memory as digital information, such as a digitized version of a pre-recorded message spoken by a person. In other embodiments, the microprocessor-based decoder module 180 uses conventional voice recognition software and or hardware, such as is used by other voice recognition systems. The microprocessor-based decoder module 180 causes the performance of a function in response to a command that it recognizes. A user activates the microprocessor-based decoder module 180 by speaking a command. When the command is recognized by the microprocessor-based decoder module 180, it controls an imaging module or an entire reader in response to the command. The signal activates the audio input module 1020 to provide an aural response to a user. When the microprocessor-based decoder module 180 is configured to operate with audio input, audible spoken command from a user can initiate actions or conditions that the microprocessor-based decoder module 180 carries out. As a non-exhaustive set of exemplary audible command that a user can give, and that the microprocessor-based decoder module 180 can respond to are such commands as: "Scan", which causes a response comprising the initiation of the scanning of a decodable indicium; "Trigger," which causes the same behavior as the mechanical depression of a trigger switch; "Capture" or "Capture image," which causes the initiation of image capture; "snap shot", which causes the initiation of a snapshot image capture; "Menu," which activates a menu routine, and which can then be followed by further commands that cause the navigation of a logical sequence of menu commands; "Sleep," which initiates a sleep cycle; "Send image," which initiates the transfer of an image in memory to another piece of hardware; "Decode," which initiates the decode cycle of an image analysis routine; as well as other similar commands.

As will be apparent to those of ordinary skill in the decoder arts, a sequence of audible interactions between a user and a microprocessor-based decoder module 180 having both an audio input module 1020 and an audio output module 1010 can occur. As an exemplary interaction, the user can issue the commands "Scan" and "Trigger." The microprocessor-based decoder module 180 might respond "Good read." The user could then issue the command "Capture image." The microprocessor-based decoder module 180 might then respond "Symbology is . . . (UPC) . . . . " The user could command "Decode." Upon successful decoding of the image and enunciation of the result, if no further images need to be decoded, the user could issue the command "Sleep." In such a manner, the user operates the microprocessor-based decoder module 180 and the imaging hardware connected to it without the need to touch or manipulate anything, simply by issuing voice commands and by receiving audible responses that inform the user of the status and outcome of actions the user has commanded, as well as notification of error conditions that arise or the like.

Figure 10C:
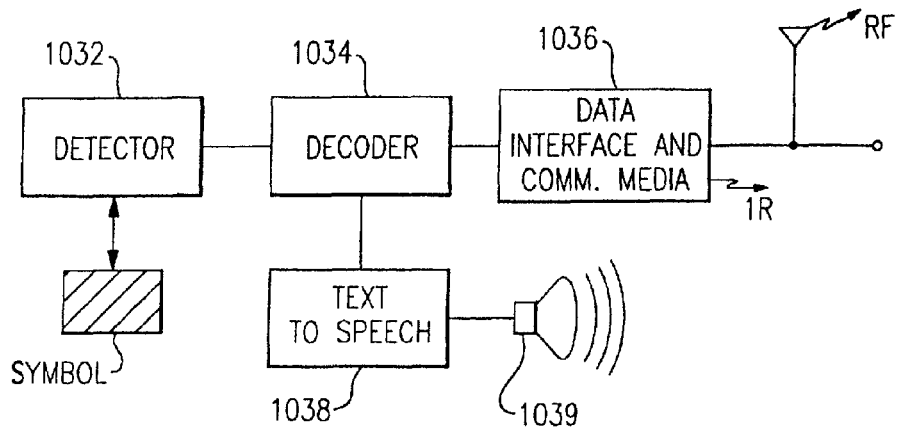
FIG. 10c illustrates interconnections that exist among components of an illustrative system providing bar code to text to speech functionality, according to principles of the invention.

Turning to FIG. 10*c*, there are illustrated interconnections that exist among components of an illustrative system providing bar code to speech or bar code to text to speech functionality. In general a detector 1032 acquires an image of the encoded indicium, and provides the encoded information therein to a decoder 1034. The decoder 1034 analyses the encoded information. Based at least in part on the analysis, the decoder 1034 can obtain text or other information from a local memory or from a remote memory, using such data interface and communication media 1036 as RF, infrared, computer or telephone networks, and/or hardwire connections. The decoder 1034 communicates the information to be enunciated by way of serial or parallel communication channels, such as a bus, to a text to speech converter 1038, which drives a speaker 1039, thereby enunciating the information as audible speech.

Figure 10D:
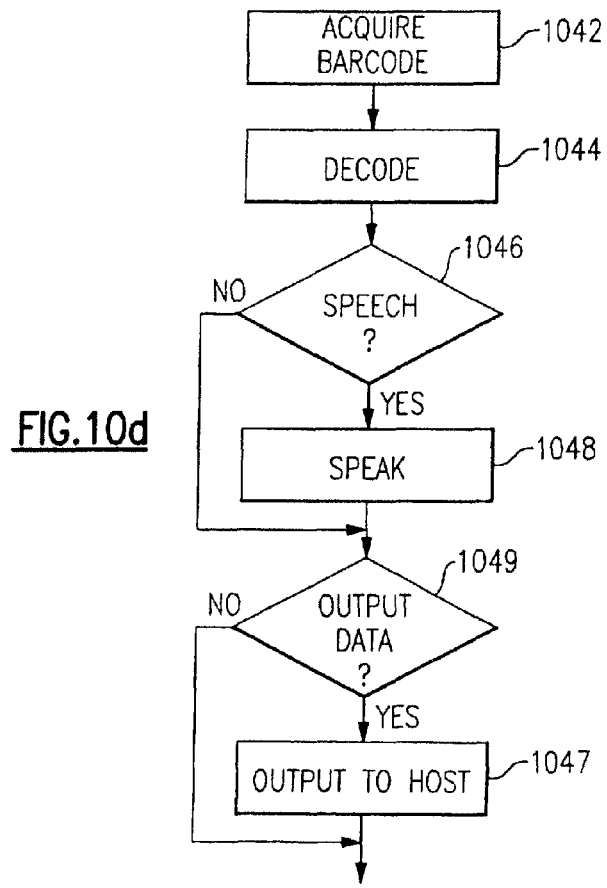
FIGS. 10d-10f illustrate flow diagrams that show methods of speech enunciation that embody the invention.
Figure 10E:
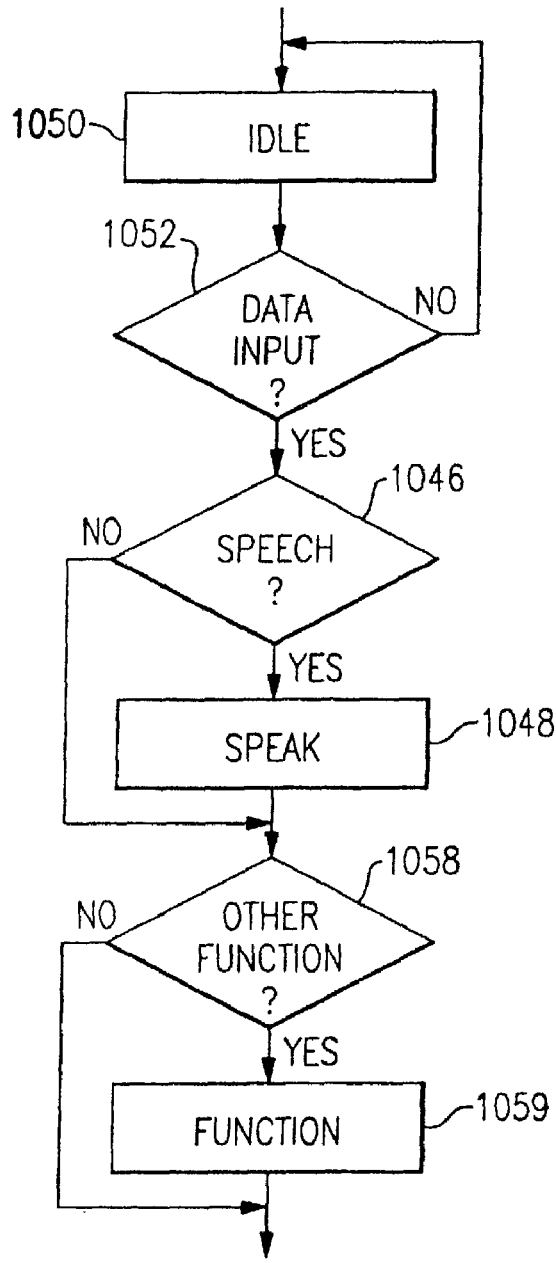
Figure 10F:
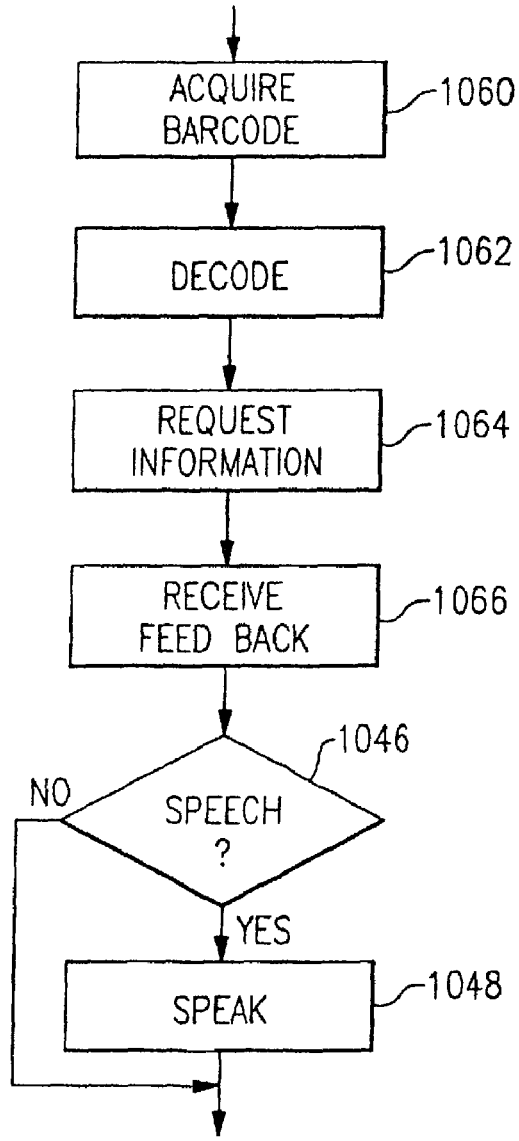

FIGS. 10*d*-10*f* illustrate flow diagrams that show methods of speech enunciation that embody the invention. In FIG. 10*d*, the detector 1032 acquires a bar code or other decodable indicium, as indicated in box 1042. The decoder 1034 decodes the information, as indicated by box 1044. In one embodiment, based at least in part on the content of the decoded information, a decision is made as to whether a spoken message is to be provided, as indicated at diamond 1046. If a spoken message is required, the message is expressed is indicated by box 1048. However, if no spoken message is required, the action taken at box 1048 is suppressed, as indicated by the arrow that bypasses box 1048. The determination whether the information will be enunciated as speech can be based in part of the content of the information as compared to a test criterion. The test criterion can be the presence or absence of a particular string or symbol in the decoded information, the presence or absence of a decodable symbol of a particular symbology type (e.g., UPC) or the presence or absence of a particular type of information (e.g., a menu, an instruction, or the like), the source of the information (e.g., speak so as to convey the bar code, or so as to convey information provided as an alternative input, such as the current price, whether and how many of an item are in stock, colors, sizes, or other features of the item, and the like), and criteria such as speak everything (e.g., "chatterbox"), or speak nothing (e.g., silence). After the decision whether or not to provide spoken information is decided and acted upon, the system can perform other tasks, such as determining whether data should be presented in another format (e.g., printed, recorded, and so forth) at decision diamond 1047, and the system then acts on the decision at box 1047.

In FIG. 10*e* a system loops until data is obtained (e.g., idle 1050, followed by data input test diamond 1052 and return arrow if the test returns negative). Once data is available, a test for a spoken response occurs (e.g., diamond 1046). If a spoken message is required, the message is expressed is indicated by box 1048. However, if no spoken message is required, the action taken at box 1048 is suppressed, as indicated by the arrow that bypasses box 1048. The criteria for making the decision are described above with regard to FIG. 10*d*. Thereafter, another function can be tested, as indicated at diamond 1058, and can be performed at indicated at box 1059, or can be bypassed as indicated by the arrow that bypasses box 1059, depending on the outcome of the test. The order of the spoken response and the other function can be interchanged as needed, which would be represented by a flow diagram similar to FIG. 10*e*, in which the sequence of diamond 1058, box 1059 and the corresponding bypassing arrow are positioned after the input loop and before diamond 1046 and box 1048.

FIG. 10*f* depicts a flow diagram that illustrates yet another method of the invention, in which the detector 1032 observes a decodable indicium, as indicated in the box 1060 labeled "acquire bar code." The decoder 1034 decodes the bar code, as indicated schematically in the box 1062 labeled "decode." Based on the content of the decoded information, or on a type of bar code, or in response to another feature of the decoded information, the decoder requests information by communicating by way of data interface and communication media 1036, as indicated in box 1064 labeled "request information."

The decoder 1034 receives a response as indicated by box 1066 labeled "receive feedback." The system determines at diamond 1046 labeled "speech?" whether a spoken communication is required. If a spoken message is required, the message is expressed is indicated by box 1048. However, if no spoken message is required, the action taken at box 1048 is suppressed, as indicated by the arrow that bypasses box 1048. The criteria for making the decision are described above with regard to FIG. 10*d*.

Those of ordinary skill will recognize that many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope of the following claims.

What is claimed is:

1. A method of manufacturing an optical reader utilizing a selected one of a one-dimensional (1D) imaging module and a two-dimensional (2D) imaging module, comprising:
   providing a microprocessor based decoder module that, when operative, decodes a frame of image data provided by a selected one of said one-dimensional (1D) imaging module and said two-dimensional (2D) imaging module as a component of said optical reader, wherein said decoding is responsive to information selected from one of information relating to said selected imaging module and information relating to said frame of image data;
   providing an imaging module for communication with said microprocessor based decoder module, said imaging module being either of a one-dimensional (1D) imaging module or a two-dimensional (2D) imaging module; and
   assembling a reader product comprising the microprocessor based decoder module and the imaging module.

2. The method of claim 1, wherein said microprocessor based decoder module is configured to be reprogrammed to accept and decode frames of image data having different formats from a plurality of different sensors.

3. The method of claim 1, wherein said microprocessor based decoder module is configured to be reprogrammed by installation and activation of a dynamically linked library module that provides at least one of communicating information from a computer program operating on the microprocessor based decoder module to the imaging module, and communicating image data from the imaging module to a module of the computer program operating on the microprocessor based decoder module that receives a frame of image data.

4. The method of claim 1, wherein said microprocessor based decoder module is configured to allow switching operation from a first sensor providing a frame of image data of a first format to a second sensor providing a frame of image data of a second format by redirecting the microprocessor based decoder module to use a different computer program for said first sensor than is used for said second sensor.

5. The method of claim 1, wherein said microprocessor based decoder module is configured to allow switching operation from a first sensor providing a frame of image data of a first format to a second sensor providing a frame of image data of a second format by redirecting the microprocessor based decoder module to use a different dynamically linked library module for said first sensor than is used for said second sensor.

6. The method of claim 1, wherein the decoding is responsive to information relating to said selected imaging module.

7. The method of claim 1, wherein the decoding is responsive to information relating to said frame of image data.

8. The method of claim 1, wherein the providing a microprocessor based decoder module includes providing a main processor IC chip having an integrated frame grabber unit.

9. The method of claim 1, wherein the providing a microprocessor based decoder module includes providing a main processor IC chip having an integrated frame grabber unit of sufficient capacity to capture 2D frames of image data.

10. An optical reader comprising:
   a one dimensional image sensor;
   a light source for use in illuminating a target area;
   an analog to digital converter for converting analog voltage levels output by the one dimensional image sensor into gray scale pixel values;
   a multifunctional IC chip, the multifunctional IC chip having an integrated frame grabber unit having sufficient capacity to capture 2D frames of image data, the optical reader being configured so that the gray scale pixel values are transmitted to the frame grabber unit, wherein the optical reader is operative to attempt to decode a decodable indicia represented in captured image data; and
   a hand held housing in which the one dimensional image sensor is disposed.

\* \* \* \* \*